US010002536B2

(12) United States Patent
Kim et al.

(10) Patent No.: US 10,002,536 B2
(45) Date of Patent: Jun. 19, 2018

(54) APPARATUS AND METHOD FOR PROVIDING SERVICE IN VEHICLE TO EVERYTHING COMMUNICATION SYSTEM

(71) Applicant: Samsung Electronics Co., Ltd, Gyeonggi-do (KR)

(72) Inventors: Kyung-Kyu Kim, Gyeonggi-do (KR); Hyun-Jeong Kang, Seoul (KR); Sang-Wook Kwon, Gyeonggi-do (KR); Young-Joong Mok, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/210,808

(22) Filed: Jul. 14, 2016

(65) Prior Publication Data
US 2017/0018187 A1 Jan. 19, 2017

Related U.S. Application Data

(60) Provisional application No. 62/192,199, filed on Jul. 14, 2015.

(30) Foreign Application Priority Data

Jul. 14, 2015 (KR) ........................ 10-2015-0100118

(51) Int. Cl.
*G08G 1/16* (2006.01)
*H04L 29/08* (2006.01)
(Continued)

(52) U.S. Cl.
CPC ............ *G08G 1/166* (2013.01); *B60W 30/09* (2013.01); *G08G 1/005* (2013.01); *G08G 1/095* (2013.01);
(Continued)

(58) Field of Classification Search
CPC ............ G08G 1/164; G08G 1/16; G08G 1/08; G08G 1/087; B60W 30/00;
(Continued)

(56) References Cited

U.S. PATENT DOCUMENTS 6,326,903 B1 * 12/2001 Gross ..................... G08G 1/087
340/902
6,985,089 B2 1/2006 Liu et al.
(Continued)

FOREIGN PATENT DOCUMENTS

| KR | 1020130068159 | 6/2013 |
|---|---|---|
| KR | 1020130068626 | 6/2013 |
| KR | 101354049 B1 | 2/2014 |

OTHER PUBLICATIONS

International Search Report dated Oct. 20, 2016 in connection with International Application No. PCT/ KR2016/007679, 3 pages.
(Continued)

*Primary Examiner* — George Bugg
*Assistant Examiner* — Munear Akki

(57) ABSTRACT

The present disclosure relates to a pre-5th-generation (5G) or 5G communication system to be provided for supporting higher data rates beyond 4th-generation (4G) communication system such as a long term evolution (LTE). A method for providing a service in a first device in a vehicle to everything (V2X) communication system is provided. The method includes transmitting a first message related to the service; receiving, from a second device, a second message notifying that the second device enters a zone related to the service; and transmitting, to the second device, a third message indicating that the first device confirms that the second device enters the zone.

23 Claims, 38 Drawing Sheets

(51) Int. Cl.
*H04W 76/04* (2009.01)
*G08G 1/005* (2006.01)
*G08G 1/095* (2006.01)
*G08G 1/0962* (2006.01)
*B60W 30/09* (2012.01)
*H04W 4/02* (2018.01)
*H04W 52/02* (2009.01)
*H04W 8/00* (2009.01)
*H04W 4/04* (2009.01)

(52) U.S. Cl.
CPC ........... *G08G 1/0962* (2013.01); *G08G 1/164* (2013.01); *H04L 67/12* (2013.01); *H04W 4/021* (2013.01); *H04W 52/0229* (2013.01); *H04W 76/043* (2013.01); *H04W 4/046* (2013.01); *H04W 8/005* (2013.01); *Y02D 70/12* (2018.01); *Y02D 70/124* (2018.01); *Y02D 70/126* (2018.01)

(58) Field of Classification Search
CPC ............ B60W 30/0956; G05D 1/0214; G05D 1/0011; G05D 1/02; G01C 21/12; H04W 72/048; B60R 25/08

USPC ........ 340/961, 903, 435, 902, 906; 701/301; 370/332; 380/270

See application file for complete search history.

(56) References Cited

U.S. PATENT DOCUMENTS

| | | | |
|---|---|---|---|
| 2010/0100324 A1* | 4/2010 | Caminiti | G08G 1/0104 701/301 |
| 2015/0035685 A1 | 2/2015 | Strickland et al. | |
| 2015/0084791 A1 | 3/2015 | Jang | |
| 2016/0253905 A1* | 9/2016 | Sawato | H04W 4/046 340/902 |
| 2016/0285935 A1* | 9/2016 | Wu | H04L 65/4076 |
| 2017/0008486 A1* | 1/2017 | Atoche | B60R 25/01 |

OTHER PUBLICATIONS

Written Opinion of the International Searching Authority dated Oct. 20, 2016 in connection with International Application No. PCT/KR2016/007679, 7 pages.

* cited by examiner (a)

(b)

APPARATUS AND METHOD FOR PROVIDING SERVICE IN VEHICLE TO EVERYTHING COMMUNICATION SYSTEM

CROSS-REFERENCE TO RELATED APPLICATION(S) AND CLAIM OF PRIORITY

The present application is related to and claims the benefit under 35 U.S.C. § 119(e) of a U.S. Provisional application filed on Jul. 14, 2015 in the U.S. Patent and Trademark Office and assigned U.S. Provisional Application No. 62/192,199, and under 35 U.S.C. § 119(a) of a Korean patent application filed on Jul. 14, 2015 in the Korean Intellectual Property Office and assigned Serial No. 10-2015-0100118, the entire disclosure of all each of which is hereby incorporated by reference.

TECHNICAL FIELD

The present disclosure relates to a method and apparatus for providing a service in a vehicle to everything (V2X) communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system may be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul network, a moving network, a cooperative communication, coordinated multi-points (CoMP) transmission and reception, reception-end interference cancellation, and the like.

In the 5G communication systems, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A V2X communication system supports a service between a vehicle and other object based on direct communication or a cellular communication system through a base station. Here, the other object may be other vehicle, an infrastructure, a pedestrian, a driver, a passenger, and/or the like.

The service includes a safety service, a vehicle information service, a traffic information service, and/or the like. For example, the safety service may support an incident notification, a collision pre-warning, an emergency vehicle notification, a pedestrian warning, and/or the like, the vehicle information service may support a parking notification, navigation, vehicle diagnostic, and/or the like, and the traffic information service may support a lane change notification, a road change notification, a speed limit notification, and/or the like.

So, various requirements such as a periodic transmission, a low-latency transmission and high-reliability transmission for information related to the service may be necessary for providing the service. So, there is a need for providing services thereby these various requirements in a V2X communication system.

SUMMARY

To address the above-discussed deficiencies, it is a primary object to provide an apparatus and method for providing a service in a vehicle to everything (V2X) communication system.

Another aspect of the present disclosure is to propose an apparatus and method for providing a service thereby filtering terminals to which the service is provided in a V2X communication system.

Another aspect of the present disclosure is to propose an apparatus and method for providing a service based on a beamforming scheme in a V2X communication system.

Another aspect of the present disclosure is to propose an apparatus and method for providing a service thereby decreasing power consumption in a V2X communication system.

In accordance with an aspect of the present disclosure, a method for providing a service in a first device of a vehicle to everything (V2X) communication system is provided. The method includes transmitting a first message related to the service; receiving, from a second device, a second message notifying that the second device enters a zone related to the service; and transmitting, to the second device, a third message indicating that the first device confirms that the second device enters the zone.

In accordance with another aspect of the present disclosure, a method for providing a service of a second device in a vehicle to everything (V2X) communication system is provided. The method includes receiving, from a first device, a first message related to the service; transmitting, to the first device, a second message notifying that the second device enters a first zone related to the service; and receiving, from the first device, a third message indicating that the first device confirms that the second device enters the first zone.

In accordance with yet another aspect of the present disclosure, a method for providing a service of a third device in a vehicle to everything (V2X) communication system is provided. The method includes receiving, from a first device, a first message related to the service; and receiving, from a second device, a second message notifying that a first zone related to the service exists.

In accordance with yet another aspect of the present disclosure, a first device in a vehicle to everything (V2X) communication system is provided. The first device includes a processor configured to transmit a first message related to a service, receive, from a second device, a second message notifying that the second device enters a zone related to the service, and transmit, to the second device, a third message indicating that the first device confirms that the second device enters the zone to the second device.

In accordance with yet another aspect of the present disclosure, a second device in a vehicle to everything (V2X)

communication system is provided. The second device includes a processor configured to receive, from a first device, a first message related to the service, transmit, to the first device, a second message notifying that the second device enters a first zone related to the service, and receive, from the first device, a third message indicating that the first device confirms that the second device enters the first zone.

In accordance with yet another aspect of the present disclosure, a third device in a vehicle to everything (V2X) communication system is provided. The third device includes a processor configured to receive, from a first device, a first message related to the service, and receive, from a second device, a second message notifying that a first zone related to the service exists.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1A:
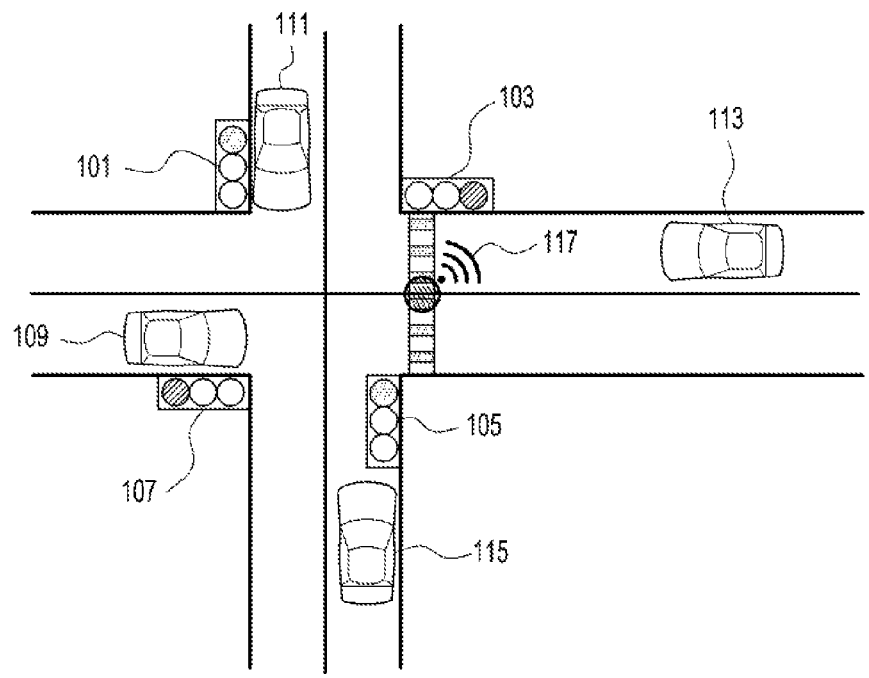
FIGS. 1A to 1B illustrate an example of a safety service provided in a vehicle to everything (V2X) communication system according to an embodiment of the present disclosure.

FIGS. 1A through 38, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, a device which is installed at a vehicle, and attachable and detachable from the vehicle, a device which is installed at a vehicle, and impossible to remove from the vehicle, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a terminal may be an electronic device.

According to various embodiments of the present disclosure, a terminal may be a transmitting apparatus or a receiving apparatus.

According to various embodiments of the present disclosure, it will be assumed that the term terminal may be interchangeable with the term mobile station (MS), wireless terminal, mobile device, user equipment (UE), and/or the like.

An embodiment of the present disclosure proposes an apparatus and method for providing a service in a vehicle to everything (V2X) communication system.

An embodiment of the present disclosure proposes an apparatus and method for providing a service thereby filtering terminals to which the service is provided in a V2X communication system.

An embodiment of the present disclosure proposes an apparatus and method for providing a service based on a beamforming scheme in a V2X communication system.

An embodiment of the present disclosure proposes an apparatus and method for providing a service thereby decreasing power consumption in a V2X communication system.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

In an embodiment of the present disclosure, for convenience, it will be assumed that a service is a safety service, and the safety service may be a service related to pedestrian safety.

In various embodiments of the present disclosure, it will be noted that a speed of a vehicle terminal (VT) may be equal to a speed of a vehicle, and a speed of a pedestrian terminal (PT) may be equal to a pedestrian's speed.

In various embodiments of the present disclosure, it will be noted that a location of a VT may be identical a location of a vehicle, and a speed of a PT may be identical to a pedestrian's location.

In various embodiments of the present disclosure, it will be noted that a moving direction of a VT may be identical a traveling direction of a vehicle, and a moving direction of a PT may be identical to a pedestrian's moving direction.

In various embodiments of the present disclosure, it will be noted that the term area may be interchangeable with the term zone.

In various embodiments of the present disclosure, it will be noted that the term an identifier of a VT may be interchangeable with the term VT identifier, the term an identifier of a PT may be interchangeable with the term PT identifier, and the term an identifier of a road side unit (RSU) may be interchangeable with the term RSU identifier.

An example of a safety service provided in a V2X communication system according to an embodiment of the present disclosure will be described with reference to FIGS. 1A to 1B.

Figure 1B:
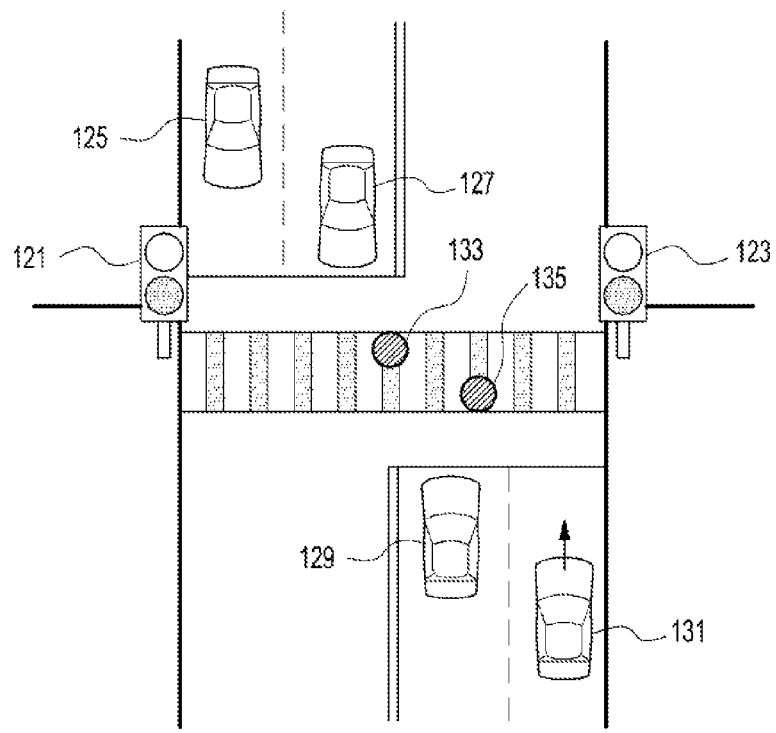

FIGS. 1A to 1B illustrate an example of a safety service provided in a V2X communication system according to an embodiment of the present disclosure.

Referring to FIG. 1A, it may be noted that a safety service in FIG. 1A is a safety service for a pedestrian which cross a crosswalk.

In FIG. 1A, a plurality of devices, e.g., RSUs, e.g., a plurality of traffic lights 101, 103, 105, and 107 may be installed at a road. Vehicles 109, 111, 113, and 115 may travel on a rood, and a pedestrian 117 may cross a crosswalk. In FIG. 1A, it may be assumed that the RSUs 101, 103, 105, and 107, a VT of each of the vehicles 109, 111, 113, and 115, and a PT of the pedestrian 117 may support a V2X function. Here, a VT denotes a terminal related to a vehicle, and the VT is mounted on the vehicle or located at the vehicle. A PT denotes a terminal which a pedestrian carries.

Referring to FIG. 1B, there is a crosswalk where a plurality of RSUs, e.g., a plurality of traffic lights 121 and 123 are installed, and pedestrians 133 and 135 may cross the crosswalk. Some vehicles 127 and 129 are stopped at a stop line of the crosswalk, and other vehicles 125 and 131 travels towards the crosswalk. In FIG. 1B, it will be assumed that the RSUs 121 and 123, a PT of each of the pedestrians 133 and 135, and a VT of each of the vehicles 125, 127, 129, and 131 may support a V2X function.

An example of a safety service provided in a V2X communication system according to an embodiment of the present disclosure has been described with reference to FIGS. 1A to 1B, and another example of a safety service provided in a V2X communication system according to an embodiment of the present disclosure will be described with reference to FIG. 2.

Figure 2:
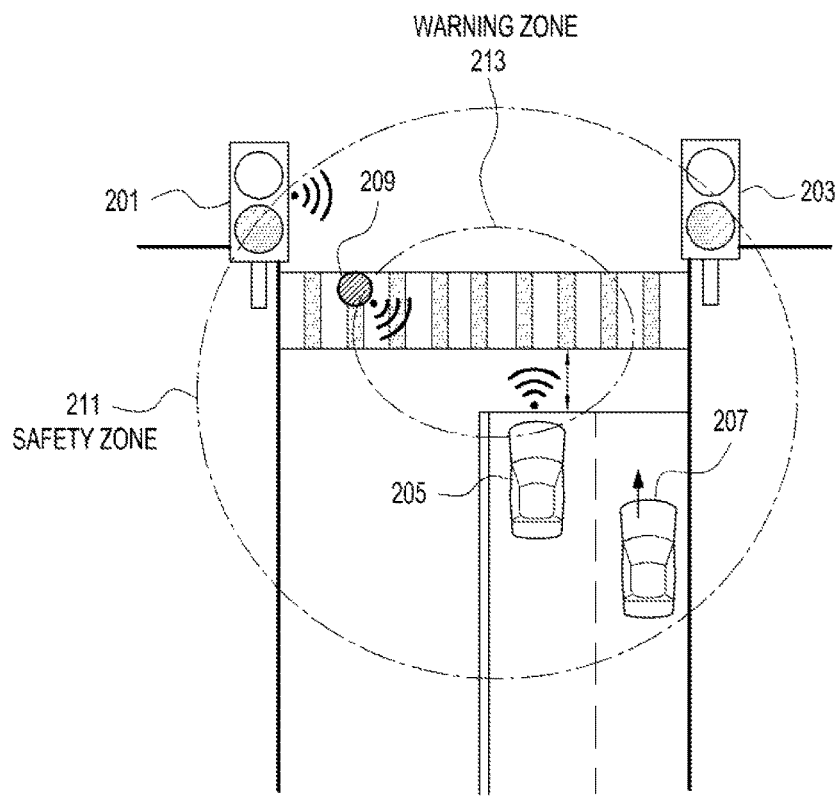
FIG. 2 illustrates another example of a safety service provided in a V2X communication system according to an embodiment of the present disclosure.

FIG. 2 illustrates another example of a safety service provided in a V2X communication system according to an embodiment of the present disclosure.

Referring to FIG. 2, there is a crosswalk on a road. RSUs 201 and 203 which notify a pedestrian light, e.g., a green light may be installed at the crosswalk. Each of the RSUs 201 and 203 may be a traffic light, and/or the like. When a pedestrian light is on, the RSUs 201 and 203 may transmit a pedestrian light notification message. Here, the pedestrian light notification message notifies that a pedestrian light is on. The pedestrian light notification message may be transmitted in a specific direction or an omni-direction. The pedestrian light notification message may be transmitted using power that a VT and a PT related to the crosswalk at which the RSUs 201 and 203 are located may receive. The pedestrian light notification message may be transmitted by an environment such as weather, and/or the like, this will be described below, and so a detailed description thereof will be omitted herein.

When the pedestrian light is on, a pedestrian may cross the crosswalk. So, a PT 209 may receive pedestrian light notification messages transmitted by the RSUs 201 and 203.

When the pedestrian light is on, a vehicle which is traveling towards the crosswalk may stop at a stop line of the crosswalk. So, a VT 205 may receive the pedestrian light notification messages transmitted by the RSUs 201 and 203 and recognize that the VT 205 is located at a safety zone 211. In this case, the VT 205 transmits a safety zone notification message which notifies that there is a vehicle which approaches a safety zone. Here, a safety zone denotes a zone which is set by an RSU, and related to safety for a pedestrian. A detailed description of a scheme of setting the safety zone may be omitted herein.

Meanwhile, a vehicle at which a VT 207 is located is traveling towards the crosswalk, so the VT 207 may receive the pedestrian light notification messages transmitted by the RSUs 201 and 203. When the pedestrian light notification messages are received, the VT 207 may recognize that the VT 207 is located at a safety zone 211. The VT 207 does not need to transmit a safety zone notification message according to instructions of the RSUs 201 and 203.

The vehicles at which the VTs 205 and 207 are located may approach a location at which the vehicles at which the VTs 205 and 207 are located endangers a pedestrian which carries a PT 209. Here, a zone which endangers the pedestrian that carries the PT 209 may be referred to as warning zone 213. That is, a zone that the VTs 205 and 207 are located at the safety zone 211 and move with a speed which is greater than 0 corresponds to the warning zone 213. Here, a warning zone is set by an RSU, and included in a safety zone, a scheme of setting the warning zone will be described below, and so a detailed description thereof will be omitted herein. In an embodiment of the present disclosure, it may be assumed that a speed of a VT is equal to a speed of a vehicle at which the VT is located. A speed of a VT is equal to a speed of a vehicle. So, for convenience, it may be noted that the term speed of VT may be interchangeable with the term speed of vehicle. A VT located at the warning zone 213 may transmit a warning zone notification message to a PT 209. The warning zone notification message notifies that there is a vehicle which approaches a warning zone. If a speed of the VT is zero (0), the VT may stop transmission of the warning zone notification message.

Upon receiving the safety zone notification message transmitted by the VT 205, the PT 209 may run a vehicle to pedestrian (V2P) safety service application. After running the V2P safety service application, the PT 209 monitors whether a warning zone notification message is received. After receiving warning zone notification messages from the VTs 205 and 207, the V2P safety service application run in the PT 209 may generate vehicle warning through a user interface (UI) included in the PT 209. Here, the vehicle warning is warning indicating that there is a vehicle, and the vehicle warning generated through the UI may be implemented with various formats such as a message, a sound, vibration, a light, and/or the like.

Another example of a safety service provided in a V2X communication system according to an embodiment of the present disclosure has been described with reference to FIG. 2, and a criterion for setting a warning zone in a V2X communication system according to an embodiment of the present disclosure will be described with reference to FIG. 3.

Figure 3:
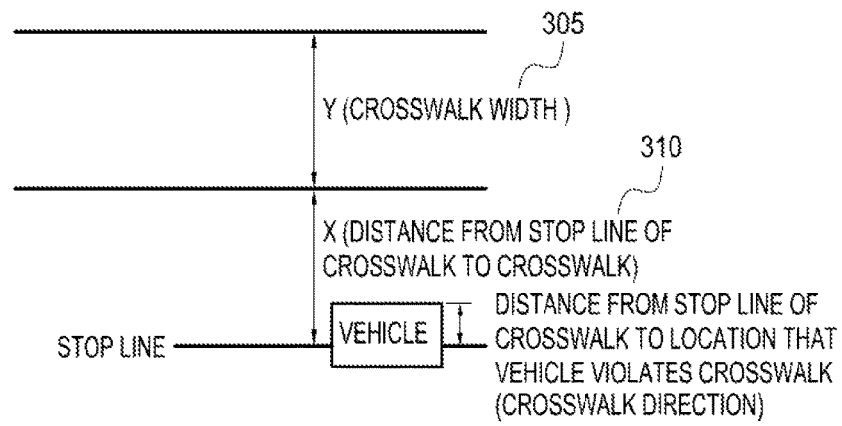
FIG. 3 illustrates a criterion for setting a warning zone in a V2X communication system according to an embodiment of the present disclosure.

FIG. 3 illustrates a criterion for setting a warning zone in a V2X communication system according to an embodiment of the present disclosure.

Referring to FIG. 3, a warning zone may be calculated based on a stop line of a crosswalk, a crosswalk according to map information, or a speed of a VT. A VT which is located at a safety zone may be a target for activating a warning zone. For example, a VT may set a warning zone as expressed in Equation (1).

$$\text{Warning zone} = \text{width of crosswalk}(Y)305 + 2\times(\text{distance from stop line of crosswalk to crosswalk }(X)310 - \text{distance from stop line of crosswalk to location that vehicle violates crosswalk}) \quad \text{Equation (1)}.$$

The warning zone may be determined based on Equation (1) or a range which may endanger a pedestrian which crosses a crosswalk. The VT may determine whether a vehicle is within a warning zone based on the number of wheel revolutions, a location on a map, a timer, a moving distance of the vehicle, a speed of the vehicle, and/or the like.

After setting the warning zone, the VT may activate the warning zone if a speed is not zero. If the warning zone is activated, the VT may transmit a warning zone notification message. The VT may periodically transmit a warning zone notification message. After setting the warning zone, the VT may deactivate the warning zone if the speed is zero. If the warning zone is deactivated, the VT does not need to transmit a warning zone notification message. That is, the VT may transmit the warning zone notification message if a speed is not zero within the warning zone.

For example, upon determining that a VT may not stop before a stop line of a crosswalk after recognizing a safety zone, the VT sets a warning zone. The VT may transmit a warning zone notification message if a speed is not zero within the set warning zone.

For another example, upon determining that a vehicle may stop before a stop line of a crosswalk after recognizing a safety zone, a VT does not need to set a warning zone.

For another example, upon detecting that a vehicle stops before a stop line of a crosswalk after recognizing a safety zone, violates the stop line of the crosswalk, and travels, a VT may set a warning zone. In this case, the VT may transmit a warning zone notification message if a speed is not zero within the warning zone.

For another example, upon determining that a vehicle may not stop before a stop line of a crosswalk after recognizing a safety zone, a VT may set a warning zone. In this case, the VT may transmit a warning zone notification message if a speed is not zero within the warning zone. Upon determining that the speed is zero within the warning zone, the VT may stop transmission of the warning zone notification message. The VT may release the warning zone upon detecting that a vehicle gets out of the warning zone.

A criterion for setting a warning zone in a V2X communication system according to an embodiment of the present disclosure has been described with reference to FIG. 3, and an example of a process of providing a safety service in a V2X communication system according to an embodiment of the present disclosure will be described with reference to FIG. 4.

Figure 4:
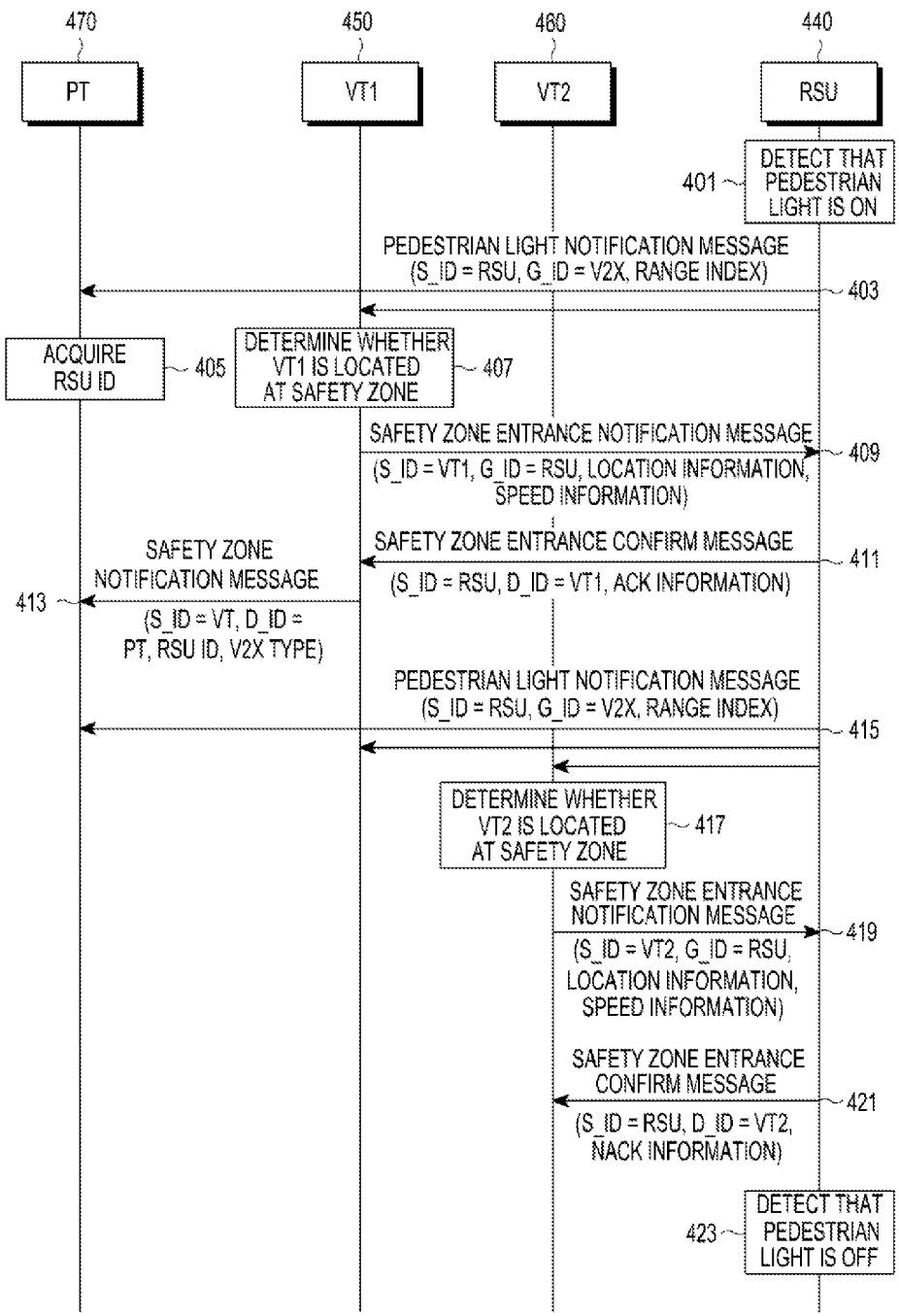
FIG. 4 illustrates an example of a process of providing a safety service in a V2X communication system according to an embodiment of the present disclosure.

FIG. 4 illustrates an example of a process of providing a safety service in a V2X communication system according to an embodiment of the present disclosure.

Referring to FIG. 4, upon detecting a pedestrian light is on, an RSU 440 starts transmitting a pedestrian light notification message at operations 401 and 403. The pedestrian light notification message includes at least one of a source identifier (S_ID), a group identifier (G_ID), and a range index. Here, an S_ID denotes an identifier of a source which transmits a message, and a G_ID denotes an identifier of a group which receives a message. So, the S_ID and the G_ID included in the pedestrian light notification message are set to an identifier of the RSU 440 and V2X, respectively. Here, a G_ID which is set to V2X indicates that a group which may receive a message is a group including a VT and a PT. The range index may indicate one of a plurality of ranges, e.g., three ranges, e.g., a long range, a middle range, and a short range. A VT or a PT which receives the range index may determine a power level to be applied to a message which the VT or the PT intends to transmit based on the range index. For example, when it is raining, the range index indicates the long range. In this case, the VT or the PT may increase the power level to be applied to the message which the VT or the PT intends to transmit. For example, when it is raining, the range index may be set to the long range. In this case, the VT or the PT may increase the power level to be applied to the message which the VT or the PT intends to transmit thereby extending a range that the message transmitted by the VT or the PT may be received. As described above, the long range, the middle range, and the short range are indicated by changing a value of the range index. However, a long range index, a middle range index, and a short range index may be implemented. For convenience, even though the range index is not included in the pedestrian light notification, the range index may be included in the pedestrian light notification, if necessary. The pedestrian light notification message may be transmitted in a specific direction or an omni-direction. The pedestrian light notification message may be transmitted periodically or aperiodically. For example, the pedestrian light notification message may be a V2X signal which a VT and a PT related to a crosswalk related to the RSU 440 may receive. The pedestrian light notification message may include at least one of an identifier of an RSU, a V2X type V2V, V2I, and V2P, and V2X group information.

A PT 470 receives the pedestrian light notification message transmitted by the RSU 440 and acquires the identifier of the RSU 440 from the received pedestrian light notification message at operation 405.

Further, a VT1 450 receives the pedestrian light notification message transmitted by the RSU 440 and acquires the identifier of the RSU 440 from the received pedestrian light notification message. The VT1 450 may determine whether the VT1 450 is located at a safety zone based on the acquired identifier of the RSU 440 at operation 407. Upon recognizing that the VT1 450 is located at the safety zone, the VT1 450 may transmit a safety zone entrance notification message to the RSU 440 at operation 409. Here, a safety zone entrance notification message indicates that a vehicle enters a safety zone. The safety zone entrance notification message includes at least one of an S_ID, a G_ID, location information of the VT1 450, and speed location of the VT1 450. The S_ID and the G_ID included in the safety zone entrance notification message are set to an identifier of the VT1 450 and an identifier of the RSU 440, respectively. For example, the safety zone entrance notification message may be a V2X message transmitted based on a broadcast scheme, a unicast scheme, or a groupcast scheme.

The RSU 440 may determine whether the VT1 450 may transmit a safety zone entrance notification message. For example, a VT which may transmit a safety zone entrance notification message may be a VT which firstly transmits the safety zone entrance notification message to the RSU 440. For another example, if the RSU 440 receives safety zone entrance notification messages from a plurality of VTs, a VT which is the closest to a stop line of crosswalk may be a VT which may transmit the safety zone entrance notification message.

The RSU 440 may transmit a safety zone entrance notification message to the VT1 450 at operation 411. The safety zone entrance notification message may be a V2X message including at least one of an S_ID, a destination identifier (D_ID), and acknowledgement (ACK) information. The ACK information indicates that the VT1 450 needs to transmit the safety zone entrance notification message. The S_ID and the D_ID included in the safety zone entrance notification message are set to an identifier of the RSU 440 and the identifier of the VT1 450, respectively. For example, the safety zone entrance notification message may be transmitted based on one of a broadcast scheme, a unicast scheme, or a groupcast scheme.

The VT1 450 starts transmitting a safety area notification message based on the safety zone entrance notification message at operation 413. The safety area notification message may include at least one of an S_ID, a D_ID, an RSU identifier (RSU ID), and a V2X type. The S the D_ID, and the RSU ID included in the safety area notification message are set to the identifier of the VT1 450, an identifier of the PT 470, and the identifier of the RSU 440, respectively. The V2X type included in the safety area notification message may be set to a V2P alarm message. The V2P alarm message indicates that a transmitted message is an alarm message transmitted from a VT to a PT.

The RSU 440 may transmit a pedestrian light notification message periodically or aperiodically at operation 415.

Meanwhile, a VT2 460 receives the pedestrian light notification message transmitted by the RSU 440 to acquire the identifier of the RSU 440 from the received pedestrian light notification message. The VT2 460 may determine whether the VT2 460 is located within a safety zone based on the acquired identifier of the RSU 440 at operation 417. Upon recognizing that the VT2 460 is located within the safety zone, the VT2 460 may transmit a safety zone entrance notification message to the RSU 440 at operation 419. The safety zone entrance notification message includes at least one of an S_ID, a G_ID, location information of the VT2 460, and speed information of the VT2 460. The S_ID and the G_ID included in the safety zone entrance notification message are set to the identifier of the VT2 460 and the identifier of the RSU 440, respectively.

The RSU 440 determines whether the VT2 460 may transmit a safety zone notification message, and may transmit a safety zone entrance confirm message which is based on the determined result to the VT2 460 at operation 421. The safety zone entrance confirm message may be a V2X message including at least one of an S_ID, a D_ID, and non-acknowledgement (NACK) information. The NACK information indicates that the VT2 460 does not need to transmit the safety zone notification message. The S_ID and the D_ID included in the safety zone entrance confirm message are set to the identifier of the RSU 440 and the identifier of the VT2 460, respectively.

The VT2 460 is located at a safety zone, and monitors the pedestrian light notification message transmitted from the RSU 440. Upon detecting that the pedestrian light is off, the RSU 440 may stop transmitting the pedestrian light notification message at operation 423. Upon recognizing that the RSU 440 stops transmitting the pedestrian light notification message, the VT1 450 may stop transmitting the safety zone notification message.

Meanwhile, upon detecting that a vehicle related to each of the VT1 450 and the VT2 460 violates a stop line of a crosswalk and travels, each of the VT1 450 and the VT2 460 may set a warning zone. In this case, if a speed within the warning zone is not zero, each of the VT1 450 and the VT2 460 may transmit a warning zone notification message. The warning zone notification message may be a V2X message including at least one of an identifier of a VT, an identifier of a PT, an identifier of an RSU, and a V2X type. The warning zone notification message may be transmitted based on a broadcast scheme, a unicast scheme, or a groupcast scheme. The warning zone notification message may be transmitted periodically or aperiodically. Upon detecting that each of the VT1 450 and the VT2 460 gets out of the warning zone, each of the VT1 450 and the VT2 460 may stop transmitting the warning zone notification message.

Upon receiving the safety zone notification message including an identifier of an RSU, the PT 470 may recognize presence of a vehicle based on information included in the received safety zone notification message. The PT 470 runs a V2P safety service application, and monitors whether a warning zone notification is received. Upon receiving a warning zone notification transmitted by the VT1 450 or the VT2 460, the PT 470 may generate vehicle warning through a UI supported in the run V2P safety service application. The vehicle warning through the UI may be implemented with various formats such as a message, a sound, vibration, a light, and/or the like.

Each of a VT identifier, a pedestrian identifier, and an RSU identifier included in a V2X message proposed in various embodiments of the present disclosure may be an identifier indicating each entity or an identifier indicating each group (e.g., a VT group, a PT group, and an RSU group). If the identifier indicating each group is used, a target for a V2X message may be a general VT, not a specific VT, a general PT, not a specific PT, and a general RSU, not a specific RSU.

An example of a process of providing a safety service in a V2X communication system according to an embodiment of the present disclosure has been described with reference to FIG. 4, and yet another example of a safety service provided in a V2X communication system according to an embodiment of the present disclosure will be described with reference to FIG. 5.

Figure 5:
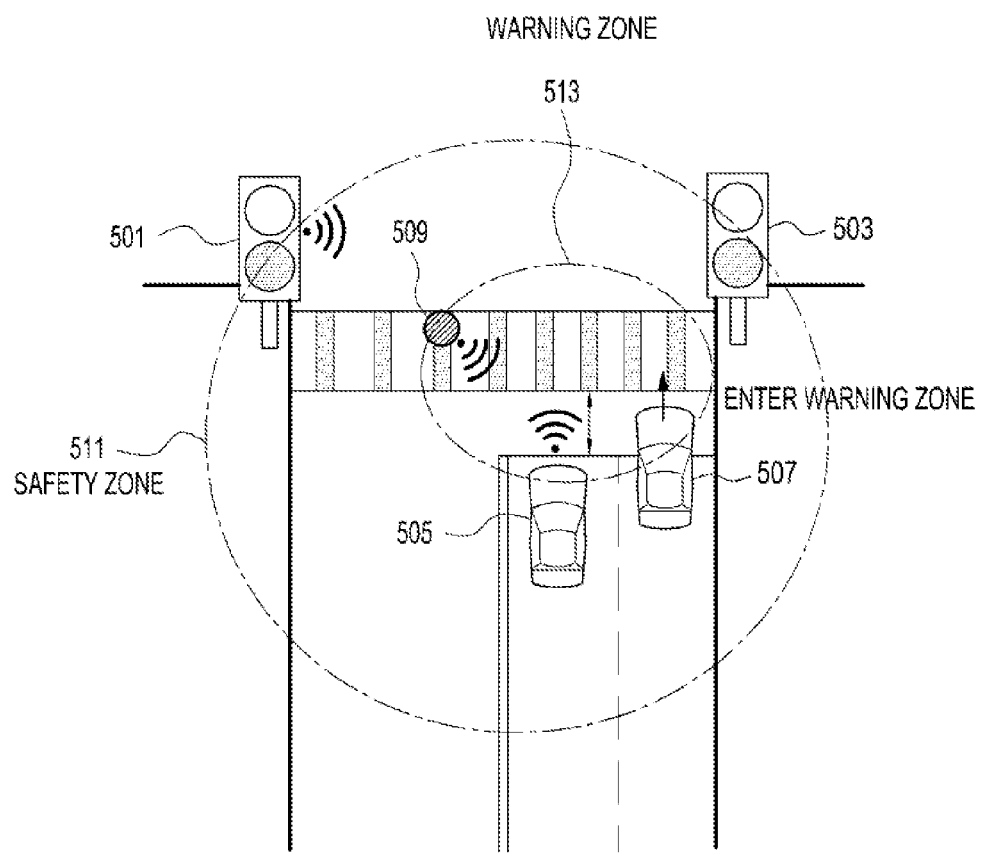
FIG. 5 illustrates yet another example of a safety service provided in a V2X communication system according to an embodiment of the present disclosure.

FIG. 5 illustrates yet another example of a safety service provided in a V2X communication system according to an embodiment of the present disclosure.

Referring to FIG. 5, there is a crosswalk on a road. RSUs 501 and 503 which notify a pedestrian light may be installed at the crosswalk. When a pedestrian light is on, the RSUs 501 and 503 may transmit a pedestrian light notification message. The pedestrian light notification message may be transmitted in a specific direction or an omni-direction. The pedestrian light notification message may be transmitted using power that a VT and a PT related to the crosswalk at which the RSUs 501 and 503 are located may receive.

When the pedestrian light is on, a pedestrian may cross the crosswalk. So, a PT 509 may receive pedestrian light notification messages transmitted by the RSUs 501 and 503.

When the pedestrian light is on, a vehicle which is traveling towards the crosswalk may stop at a stop line of the crosswalk. So, a VT 505 may receive the pedestrian light notification messages transmitted by the RSUs 501 and 503 and recognize that the VT 505 is located at a safety zone 511. In this case, the VT 505 may transmit a safety zone notification message which notifies that there is a vehicle which approaches a safety zone.

Meanwhile, a vehicle at which a VT 507 is located is traveling towards the crosswalk, so the VT 507 may receive the pedestrian light notification messages transmitted by the RSUs 501 and 503. When the pedestrian light notification messages are received, the VT 507 may recognize that the VT 507 is located at the safety zone 511. There may be no need for transmitting a safety zone notification message in the VT 507 according to instructions of the RSUs 501 and 503.

After recognizing that the VT 507 is located at the safety zone 511, the VT 507 calculates a warning zone 513 upon determining that a vehicle at which the VT 507 is located may not stop before a stop line of a crosswalk. The VT 507 determines whether a speed of the vehicle is zero at the warning zone 513. Upon recognizing that the speed of the vehicle is zero at the warning zone 513, the VT 507 monitors whether the pedestrian light notification message transmitted by the RSU 503 is received. Upon recognizing that the speed of the vehicle is greater than zero at the warning zone 513, the VT 507 may transmit a warning zone notification message. The VT 507 may calculate the warning zone 513 based on a speed and a distance of the VT 507 without exchange of a safety zone entrance notification message and a safety zone entrance confirm notification message among the VT 507 and the RSUs 501 and 503, and start transmitting the warning zone notification message based on the calculated result.

Upon receiving the safety zone notification message transmitted by the VT 505, the PT 509 may run a V2P safety service application. After running the V2P safety service application, the PT 509 monitors whether a warning zone notification message is received. After receiving a warning zone notification message from the VT 507, the PT 509 may generate vehicle warning through a UI provided from the run V2P safety service application. The vehicle warning may be implemented with various formats such as a message, a sound, vibration, a light, and/or the like.

Upon receiving the warning zone notification message, the PT 509 may transmit a pedestrian notification message to VTs 505 and 507. The pedestrian notification message indicates that there is a pedestrian. In this case, the VTs 505 and 507 may generate pedestrian warning through a UI provided in the run V2P safety service application. The pedestrian warning is warning indicating that there is a pedestrian, and may be implemented with various formats such as a message, a sound, a light, a location notification of navigation, and/or the like. The pedestrian notification message may be transmitted based on a broadcast scheme, a unicast scheme, or a groupcast scheme. The pedestrian notification message may be transmitted periodically or aperiodically.

Yet another example of a safety service provided in a V2X communication system according to an embodiment of the present disclosure has been described with reference to FIG. 5, and another example of a process for providing a safety service in a V2X communication system according to an embodiment of the present disclosure will be described with reference to FIG. 6.

Figure 6:
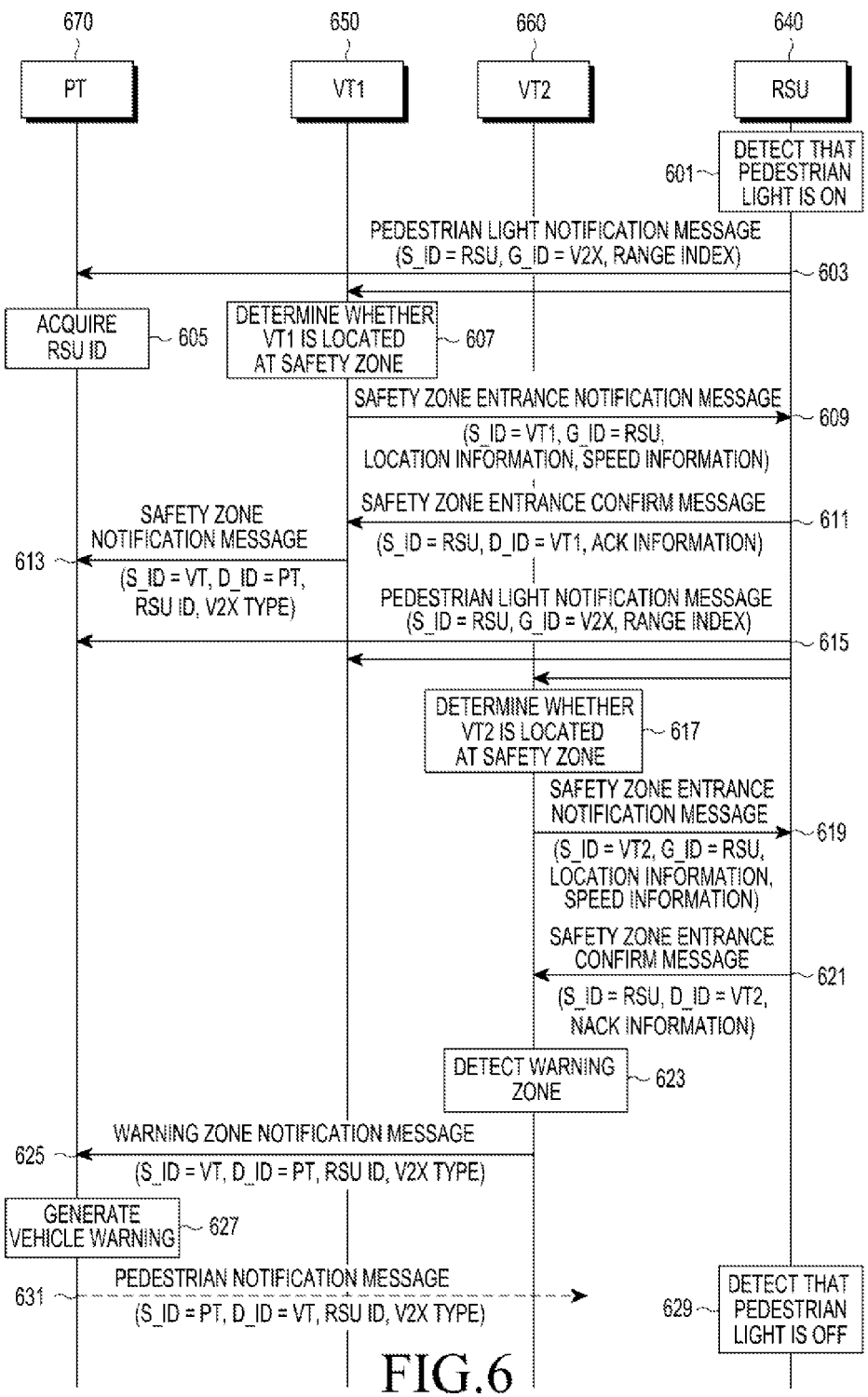
FIG. 6 illustrates another example of a process for providing a safety service in a V2X communication system according to an embodiment of the present disclosure.

FIG. 6 illustrates another example of a process for providing a safety service in a V2X communication system according to an embodiment of the present disclosure.

Referring to FIG. 6, upon detecting a pedestrian light is on, an RSU 640 starts transmitting a pedestrian light notification message at operations 601 and 603. The pedestrian light notification message includes at least one of an S_ID, a G_ID, and a range index. The S_ID and the G_ID are set to an identifier of the RSU 640 and V2X, respectively. The range index has been described with reference to FIGS. 2 and 4, and a detailed description thereof will be omitted herein. The pedestrian light notification message may be transmitted in a specific direction or an omni-direction. The pedestrian light notification message may be transmitted periodically or aperiodically. For example, the pedestrian light notification message may be a V2X signal which a VT and a PT related to a crosswalk related to the RSU 640 may receive. The pedestrian light notification message may include at least one of an RSU ID, a V2X type, and V2X group information. Meanwhile, a PT 670 receives the pedestrian light notification message transmitted by the RSU 640 to acquire the identifier of the RSU 640 from the received pedestrian light notification message at operation 605.

Further, a VT1 650 receives the pedestrian light notification message transmitted by the RSU 640 and acquires the identifier of the RSU 640 from the received pedestrian light notification message. The VT1 650 may determine whether the VT1 650 is located at a safety zone based on the acquired identifier of the RSU 640 at operation 607. Upon recognizing that the VT1 650 is located at the safety zone, the VT1 650 may transmit a safety zone entrance notification message to the RSU 640 at operation 609. The safety zone entrance notification message includes at least one of an S_ID, a G_ID, location information of the VT1 650, and speed location of the VT1 650. The S_ID and the G_ID included in the safety zone entrance notification message are set to an identifier of the VT1 650 and an identifier of the RSU 640, respectively. For example, the safety zone entrance notification message may be a V2X message transmitted based on a broadcast scheme, a unicast scheme, or a groupcast scheme.

The RSU 640 may determine whether the VT1 650 may transmit a safety zone notification message. The RSU 640 may transmit a safety zone entrance confirm message to the VT1 650 based on the determined result at operation 611. The safety zone entrance confirm message may be a V2X message including at least one of an S_ID, a D_ID, or ACK information. The S_ID and the D_ID included in the safety zone entrance confirm message may be set to an identifier of the RSU 640 and the identifier of the VT1 650, respectively. For example, the safety zone entrance confirm message may be transmitted based on a broadcast scheme, a unicast scheme, or a groupcast scheme. The VT1 650 starts transmitting the safety zone notification message at operation 613. The safety zone notification message may include at least one of an S_ID, a D_ID, an RSU ID, and a V2X type. The S_ID, the D_ID, and the RSU ID included in the safety zone notification message are set to the identifier of the VT1 650, the identifier of the PT 670, and the identifier of the RSU 640, respectively. The V2X type included in the safety zone notification message may be set to a V2P alarm message.

The RSU 640 may transmit a pedestrian light notification message periodically or aperiodically at operation 615.

Meanwhile, a VT2 660 may receive the pedestrian light notification message transmitted by the RSU 640 to acquire the identifier of the RSU 640 from the received pedestrian light notification message. The VT2 660 may determine whether the VT6 660 is located at the safety zone based on the acquired identifier of the RSU 640 at operation 617. Upon recognizing that the VT2 660 is located at the safety zone, the VT2 660 may transmit a safety zone entrance notification message to the RSU 640 at operation 619. The safety zone entrance notification message includes at least one of an S_ID, a G_ID, location information of the VT2 660, and speed location of the VT2 660. The S_ID and the G_ID included in the safety zone entrance notification message are set to an identifier of the VT2 660 and an identifier of the RSU 640, respectively.

The RSU 640 may determine whether the VT2 660 may transmit a safety zone notification message, and transmit a safety zone entrance confirm message including a result according to the determination to the VT2 660 at operation 621. The safety zone entrance confirm message may be a V2X message including at least one of an S_ID, a D_ID, or NACK information. The S_ID and the D_ID included in the safety zone entrance confirm message may be set to the identifier of the RSU 640 and the identifier of the VT2 660, respectively.

The VT2 660 is located at a safety zone, and monitors the pedestrian light notification message transmitted by the RSU 640. Upon determining that a vehicle at which the VT2 660 is located may not stop before a stop lone of a crosswalk, the VT2 660 recognizes a warning zone, and calculates the warning zone at operation 623. The VT2 660 starts transmitting a warning zone notification message at operation 625. The warning zone notification message may be a V2X message including at least one of an S_ID, a D_ID, an RSU ID, and a V2X type. The S the D_ID, and the RSU ID included in the warning zone notification message may be set to an identifier of the VT2 660, the identifier of the PT 670, and the identifier of the RSU 640, respectively. The V2X type included in the warning zone notification message may be set to a V2P alarm message. The warning zone notification message may be transmitted periodically or aperiodically based on a broadcast scheme, a unicast scheme, or a groupcast scheme.

In FIG. 6, a procedure of exchanging the safety zone entrance notification message and the safety zone entrance confirm message between the VT2 660 and the RSU 640, i.e., operation 619 and operation 621 are performed. However, if the VT2 660 recognizes the warning zone based on a speed and a distance of the VT2 660, the VT2 660 may calculate the warning zone and start transmitting the warning zone notification message without operation 619 and operation 621.

Upon receiving the safety zone notification message including an RSU ID, the PT 670 may recognize presence of a vehicle based on the received safety zone notification message. The PT 670 runs a V2P safety service application and monitors whether a warning zone notification message is received. After receiving the warning zone notification message from the VT2 660, the PT 670 may generate vehicle warning through a UI supported in the run V2P safety service application at operation 627. The vehicle warning may be implemented with various formats such as a message, a sound, vibration, a light, and/or the like.

Upon receiving the warning zone notification message, the PT 670 may transmit a pedestrian notification message at operation 631. The pedestrian notification message may be a V2X message including at least one of an S_ID, a D_ID, an RSU ID, and a V2X type. The S_ID, the D_ID, and the RSU ID included in the pedestrian notification message are set to an identifier of the PT 670, an identifier of the VT 660, and an identifier of the RSU 640, respectively. The V2X type included in the pedestrian notification message are set to a P2V alarm message. Here, a P2V alarm message denotes an alarm message transmitted from a PT to a VT.

The pedestrian notification message may include at least one of a PT identifier of the PT 670, a VT identifier of the VT2 660, an RSU identifier of the RSU 640, and a V2X type. The pedestrian notification message may be transmitted based on a broadcast scheme, a unicast scheme, or a groupcast scheme. The pedestrian notification message may be transmitted periodically or aperiodically. If the PT 670 does not receive the pedestrian light notification message from the RSU 640 or a warning zone notification message from a VT, the PT 670 may stop transmitting the pedestrian notification message.

Upon receiving the pedestrian notification message, the VTs 650 and 660 may generate pedestrian warning through a UI supported in the run V2P safety service application. The pedestrian warning through the UI may be implemented with various formats such as a message, a sound, a light, a location notification of navigation, and/or the like.

If the VT2 660 recognizes that a speed of a vehicle at which the VT2 660 is located is zero while receiving the pedestrian light notification message transmitted by the RSU 640, the VT2 660 may stop transmitting the warning zone notification message.

Upon detecting that the pedestrian light if off, the RSU 640 may stop transmitting the pedestrian light notification message at operation 629. Upon recognizing the stopping of the transmission of the pedestrian light notification message, the VT1 650 may stop transmitting the safety zone notification message.

Meanwhile, upon detecting that the vehicle at which the VT1 650 is located violates the stop line of the crosswalk and travels, the VT1 650 may set a warning zone, and transmit a warning zone notification message if the speed of the vehicle is not zero at the set warning zone.

If the vehicle at which each of the VT1 650 and the VT2 660 is located gets out of the warning zone, each of the VT1 650 and the VT2 660 may stop transmitting the warning zone notification message.

Another example of a process for providing a safety service in a V2X communication system according to an embodiment of the present disclosure has been described with reference to FIG. 6, and yet another example of a safety service provided in a V2X communication system according to an embodiment of the present disclosure will be described with reference to FIG. 7.

Figure 7:
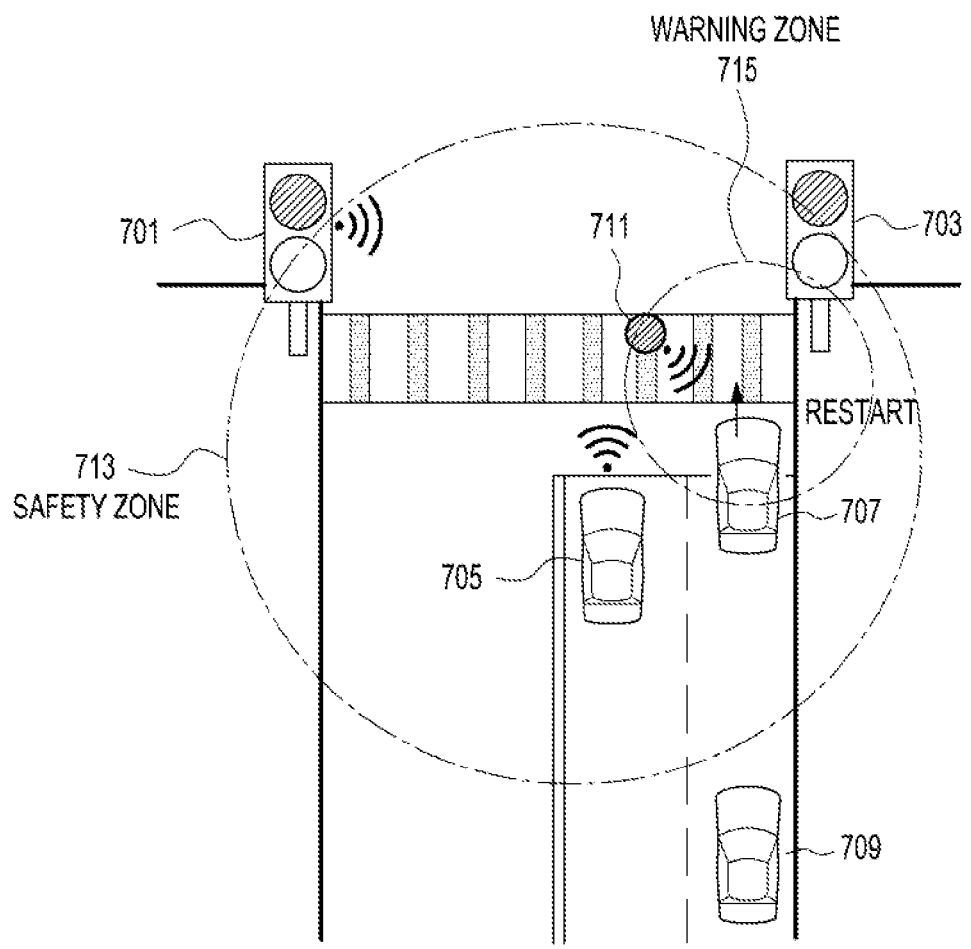
FIG. 7 illustrates yet another example of a safety service provided in a V2X communication system according to an embodiment of the present disclosure.

FIG. 7 illustrates yet another example of a safety service provided in a V2X communication system according to an embodiment of the present disclosure.

Referring to FIG. 7, there is a crosswalk on a road. RSUs 701 and 703 which notify a pedestrian light may be installed at the crosswalk. When a pedestrian light is on, the RSUs 701 and 703 may transmit a pedestrian light notification message. The pedestrian light notification message may be transmitted in a specific direction or an omni-direction. The pedestrian light notification message may be transmitted using power that a VT and a PT related to the crosswalk at which the RSUs 701 and 703 are located may receive.

When a pedestrian light is on, a pedestrian may cross a crosswalk. So, a PT 711 may receive a pedestrian light notification message transmitted by RSUs 701 and 703.

When the pedestrian light is on, a vehicle which is traveling towards the crosswalk may stop at a stop line of the crosswalk. So, a VT 705 may receive the pedestrian light notification messages transmitted by the RSUs 701 and 703 and recognize that the VT 705 is located at a safety zone 713. In this case, the VT 705 may transmit a safety zone notification message which notifies that there is a vehicle which approaches a safety zone.

Meanwhile, a vehicle at which a VT 707 is located is traveling towards the crosswalk, so the VT 707 may receive the pedestrian light notification messages transmitted by the RSUs 701 and 703. When the pedestrian light notification messages are received, the VT 707 may recognize that the VT 707 is located at a safety zone 713. There may be no need for transmitting a safety zone notification message in the VT 707 according to instructions of the RSUs 701 and 703.

After recognizing that the VT 707 is located at the safety zone 713, the VT 707 calculates a warning zone 715 upon determining that a vehicle at which the VT 707 is located may not stop before the stop line of the crosswalk. Upon recognizing that a speed of the VT 707 is zero at the warning zone 715, the VT 707 monitors whether the pedestrian light notification messages transmitted by the RSUs 701 and 703 are received. Upon recognizing that the speed is greater than zero at the warning zone 715, the VT 707 may transmit a warning zone notification message. The VT 707 may calculate the warning zone 715 based on a speed and a distance of the VT 707 without exchange of a safety zone entrance notification message and a safety zone entrance confirm message among the VT 707 and the RSUs 701 and 703, and start transmitting the warning zone notification message based on the calculated result.

If the speed of the VT 707 is zero, the VT 707 may stop transmitting the warning zone notification message. In a case that the RSUs 701 and 703 stop transmitting the pedestrian light notification message since the pedestrian light is off, the VT 707 detects that the speed is not zero within the warning zone, and may transmit warning zone notification message.

Upon receiving the safety zone notification message transmitted by the VT 705, the PT 711 may run a V2P safety service application. After running the V2P safety service application, the PT 711 may monitor whether a warning zone notification message is received. After receiving warning zone notification messages from the VT 707, the PT 711 may generate vehicle warning through a UI provided in the run V2P safety service application. The vehicle warning may be implemented with various formats such as a message, a sound, vibration, a light, and/or the like.

Upon receiving the warning zone notification message, the PT 711 may transmit a pedestrian notification message to the VTs 705 and 707. The pedestrian notification message indicates that there is a pedestrian. In this case, the VTs 705 and 707 may generate pedestrian warning through a UI provided in the run V2P safety service application. The pedestrian warning may be implemented with various formats such as a message, a sound, a light, a location notification of navigation, and/or the like. The pedestrian notification message is transmitted based on a broadcast scheme, a unicast scheme, or a groupcast scheme. The pedestrian notification message may be transmitted periodically or aperiodically.

The VT 709 which does not receive the pedestrian light notification messages transmitted by the RSUs 701 and 703 may not recognize the safety zone 713. In this case, the VT 709 does not set the warning zone, and join a V2X message transmitting/receiving procedure for the VT 711.

Yet another example of a safety service provided in a V2X communication system according to an embodiment of the present disclosure has been described with reference to FIG.

7, and yet another example of a process for providing a safety service in a V2X communication system according to an embodiment of the present disclosure will be described with reference to FIGS. 8A to 8B.

Figure 8A:
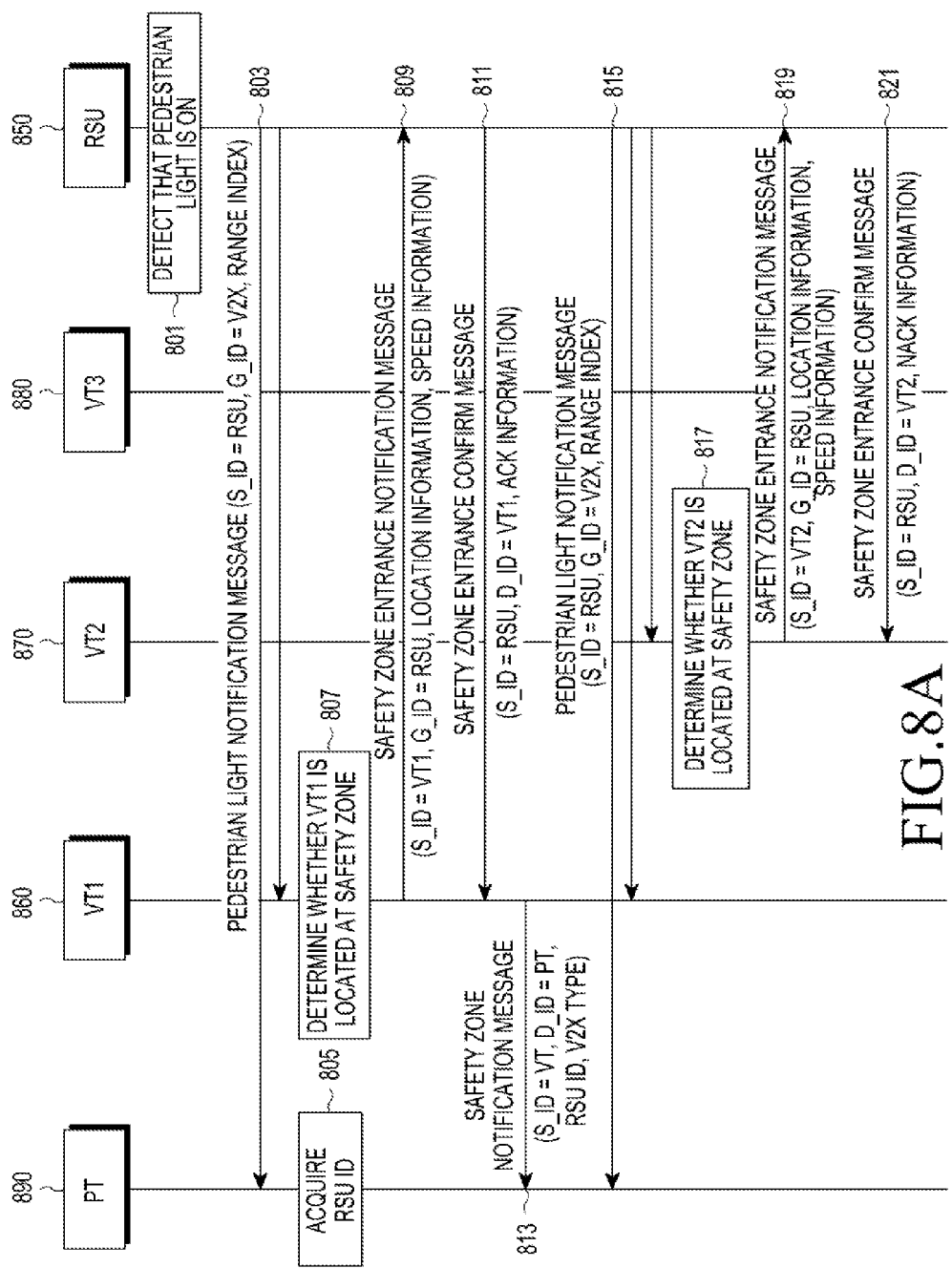
FIGS. 8A and 8B illustrate yet another example of a process for providing a safety service in a V2X communication system according to an embodiment of the present disclosure.
Figure 8B:
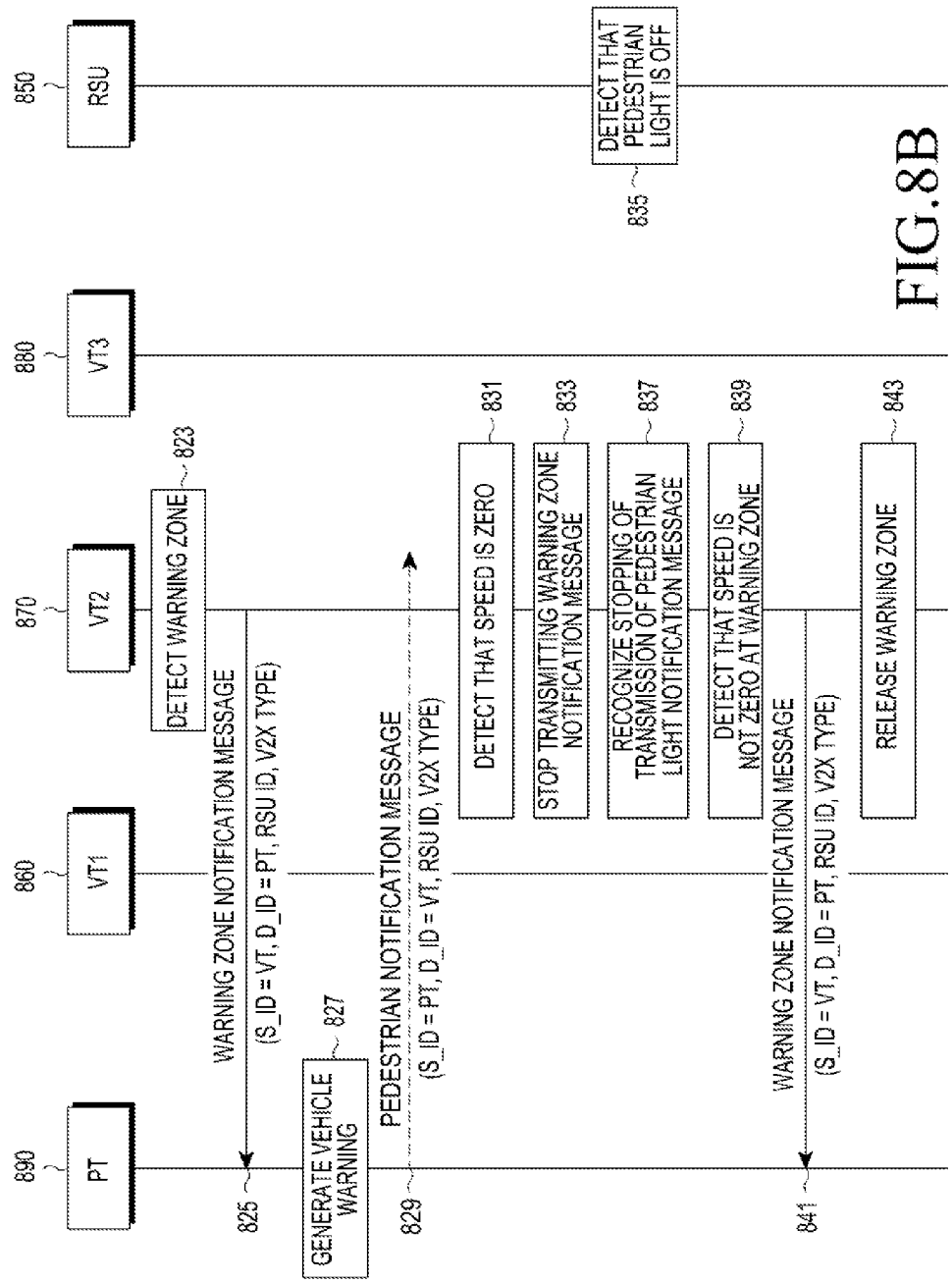

FIGS. 8A to 8B illustrate yet another example of a process for providing a safety service in a V2X communication system according to an embodiment of the present disclosure.

Referring to FIGS. 8A to 8B, upon detecting that a pedestrian light is on, an RSU 850 starts transmitting a pedestrian light notification message at operations 801 and 803. The pedestrian light notification message includes at least one of an S_ID, a G_ID, and a range index, and the S_ID and the G_ID are set to an identifier of the RSU 850 and V2X, respectively. The range index has been described with reference to FIGS. 2 and 4, and a detailed description thereof will be omitted herein. The pedestrian light notification message may be transmitted in a specific direction or an omni-direction. The pedestrian light notification message may be transmitted periodically or aperiodically. The pedestrian light notification message may be a V2X signal which a VT and a PT related to a crosswalk of the RSU 850 may receive. The pedestrian light notification message may include at least one of an RSU ID, a V2X type, and V2X group information.

Meanwhile, a PT 890 receives the pedestrian light notification message transmitted by the RSU 850 to acquire an identifier of the RSU 850 from the received pedestrian light notification message at operation 805.

A VT1 860 receives the pedestrian light notification message transmitted by the RSU 850 to acquire the identifier of the RSU 850 from the received pedestrian light notification message. The VT1 860 may determine whether the VT1 860 is located at a safety zone based on the identifier of the RSU 850 at operation 807. Upon recognizing that the VT1 860 is located at the safety zone, the VT1 860 may transmit a safety zone entrance notification message to the RSU 850 at operation 809. The safety zone entrance notification message includes at least one of an S_ID, a G_ID, location information of the VT1 860, and speed information of the VT1 860. The S_ID and the G_ID included in the safety zone entrance notification message are set to the identifier of the VT1 860 and the identifier of the RSU 850, respectively. For example, the safety zone entrance notification message may be a V2X message transmitted based on a broadcast scheme, a unicast scheme, or a groupcast scheme. The RSU 850 may determine whether the VT1 860 may transmit a safety zone notification message. The RSU 850 may transmit a safety zone entrance confirm message to the VT1 860 based on the determined result at operation 811. The safety zone entrance confirm message may be a V2X message including at least one of an S a D_ID, or ACK information. The S_ID and the D_ID included in the safety zone entrance confirm message may be set to the identifier of the RSU 850 and the identifier of the VT1 860, respectively. The safety zone entrance confirm message may be transmitted based on a broadcast scheme, a unicast scheme, or a groupcast scheme. The VT1 860 starts transmitting the safety zone notification message at operation 813. The safety zone notification message may include at least one of an S_ID, a D_ID, an RSU ID, and a V2X type. The S_ID, the D_ID, the RSU ID included in the safety zone notification message are set to the identifier of the VT1 860, the identifier of the PT 890, and the identifier of the RSU 850, respectively. The V2X type included in the safety zone notification message may be set to a V2P alarm message.

The RSU 850 may transmit a pedestrian light notification message periodically or aperiodically at operation 815.

Meanwhile, upon receiving the pedestrian light notification message transmitted by the RSU 850, a VT2 870 may acquire the identifier of the RSU 850 from the pedestrian light notification message. The VT2 870 may determine whether the VT2 870 is located at the safety zone based on the acquired identifier of the RSU 850 at operation 817. Upon recognizing that the VT2 870 is located at the safety zone, the VT2 870 may transmit a safety zone entrance notification message to the RSU 850 at operation 819. The safety zone entrance notification message may include at least one of an S_ID, a G_ID, location information of the VT2 870, and speed information of the VT2 870. The S_ID and the G_ID included in the safety zone entrance notification message are set to the identifier of the VT2 870 and the identifier of the RSU 850, respectively.

The RSU 850 may determine whether the VT2 870 may transmit a safety zone notification message, and transmit a safety zone entrance confirm message including the determined result to the VT2 870 at operation 821. The safety zone entrance confirm message may be a V2X message including at least one of an S_ID, a D_ID, or NACK information. The S_ID and the D_ID included in the safety zone entrance confirm message may be set to the identifier of the RSU 850 and the identifier of the VT2 870, respectively.

The VT2 870 is located at a safety zone, and may monitor the pedestrian light notification message transmitted by the RSU 850. Upon determining that a vehicle at which the VT2 870 is located may not stop before the stop line of the crosswalk, the VT2 870 may recognize a warning zone and calculate the warning zone at operation 823. The VT2 870 starts transmitting a warning zone notification message at operation 825. The warning zone notification message may be a V2X message including at least one of an S_ID, a D_ID, an RSU ID, and a V2X type. The S_ID, the D_ID, the RSU ID included in the warning zone notification message are set to the identifier of the VT2 870, the identifier of the PT 890, and the identifier of the RSU 850, respectively. The V2X type included in the warning zone notification message may be set to a V2P alarm message. The warning zone notification message may be transmitted based on a broadcast scheme, a unicast scheme, or a groupcast scheme. The warning zone notification message may be transmitted periodically or aperiodically.

Meanwhile, the VT2 870 may generate a warning zone based on a speed and a distance of the VT2 870 and start transmitting a warning zone notification message without a procedure of exchanging a safety zone entrance notification message and a safety zone entrance confirm message between the VT2 870 and the RSU 850, i.e., operation 819 and operation 821.

Upon receiving the safety zone notification message, the PT 890 may recognize presence of a vehicle based on an RSU ID included in the received safety zone notification message. In this case, the PT 890 may run a V2P safety service application and monitor whether a warning zone notification message is received. After receiving the warning zone notification message from the VT2 870, the PT 890 may generate vehicle warning through a UI supported in the run V2P safety service application at operation 827. The vehicle warning may be implemented with various formats such as a message, a sound, vibration, a light, and/or the like.

Upon receiving the warning zone notification message, the PT 890 may transmit a pedestrian notification message at operation 829. The pedestrian notification message may be a V2X message including at least one of an S_ID, a D_ID, an RSU ID, and a V2X type. The S_ID, the D_ID, and the RSU ID included in the pedestrian notification message are set to an identifier of the PT 890, an identifier of the VT2 870, and an identifier of the RSU 850, respectively. The V2X type included in the pedestrian notification message are set to a P2V alarm message. The pedestrian notification message may be transmitted based on a broadcast scheme, a unicast scheme, or a groupcast scheme. The pedestrian notification message may be transmitted periodically or aperiodically. If the PT 890 does not receive the pedestrian light notification message from the RSU 850 or a warning zone notification message from a VT, the PT 890 may stop transmitting the pedestrian notification message.

Upon receiving the pedestrian notification message, the VTs 860 and 870 may generate pedestrian warning through a UI supported in the run V2P safety service application. The pedestrian warning through the UI may be implemented with various formats such as a message, a sound, a light, a location notification of navigation, and/or the like.

If the VT2 870 recognizes that a speed is zero while receiving the pedestrian light notification message transmitted by the RSU 850, the VT2 870 may stop transmitting the warning zone notification message at operations 831 and 833.

Upon detecting that the pedestrian light if off, the RSU 850 may stop transmitting the pedestrian light notification message at operation 835. Upon recognizing the stopping of the transmission of the pedestrian light notification message, the VT1 860 may stop transmitting the safety zone notification message. The VT2 870 may recognize the stopping of the transmission of the pedestrian light notification message by the VT1 860 at operation 837.

Meanwhile, upon detecting that the vehicle at which the VT1 860 is located violates the stop line of the crosswalk and travels, the VT1 860 may set a warning zone, and transmit a warning zone notification message if the speed of the vehicle is not zero at the set warning zone.

The VT2 870 detects that a speed is not zero at the warning zone at operation 839 and transmit a warning zone notification message according to this at operation 841. The warning zone notification message may be a V2X message including at least one of an S_ID, a D_ID, an RSU ID, and a V2X type. The S_ID, the D_ID, and the RSU ID included in the warning zone notification message are set to the identifier of the VT2 870, the identifier of the PT 890, and the identifier of the RSU 850, respectively. The V2X type included in the warning zone notification message may be set to a V2P alarm message. If the vehicle at which each of the VT1 860 and the VT2 870 is located gets out of the warning zone, each of the VT1 860 and the VT2 870 may stop transmitting the warning zone notification message.

A VT3 880 may not detect a safety zone since the VT3 880 does not receive the pedestrian light notification message transmitted by the RSU 850. In this case, the VT3 880 does not set the warning zone, so the VT3 880 does not perform an operation like the operation of the VT1 860 or the VT2 870 as described in FIGS. 8A and 8B.

Yet another example of a process for providing a safety service in a V2X communication system according to an embodiment of the present disclosure has been described with reference to FIGS. 8A to 8B, and yet another example of a safety service provided in a V2X communication system according to an embodiment of the present disclosure will be described with reference to FIGS. 9A and 9B.

Figure 9A:
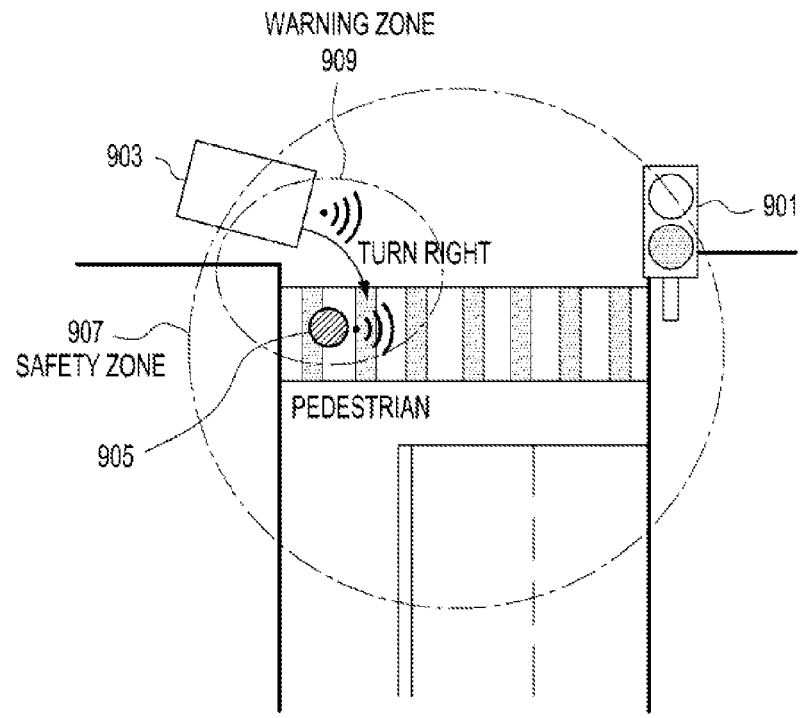
FIGS. 9A and 9B illustrate yet another example of a safety service provided in a V2X communication system according to an embodiment of the present disclosure.
Figure 9B:
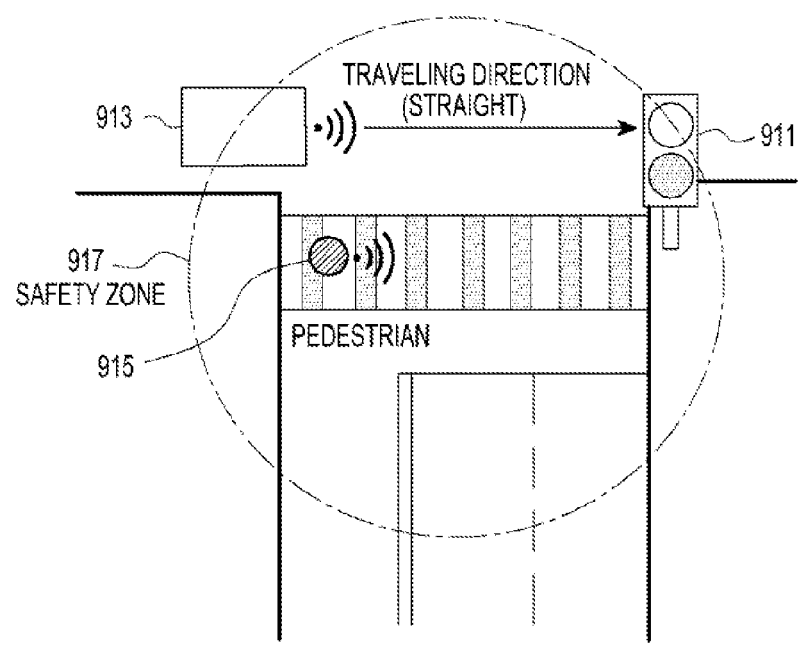

FIGS. 9A and 9B illustrate yet another example of a safety service provided in a V2X communication system according to an embodiment of the present disclosure.

Referring to FIGS. 9A and 9B, it may be assumed that a VT located at a vehicle which is traveling from a right road already knows information for an RSU which is front of a direction of the vehicle, e.g., information about a traffic light, and/or the like based on map data which the VT already has. The VT may receive an RSU message transmitted by an RSU while the vehicle is traveling. In this case, the VT performs a procedure according to the detection of the safety zone. For example, the RSU message transmitted by the RSU may be beacon information. However, the RSU message may be implemented as various formats.

The VT determines whether the RSU is an RSU related to a crosswalk which is located at a direction perpendicular to the direction of the vehicle at which the VT is located or an RSU related to a crosswalk which is located at a direction parallel to the direction of the vehicle at which the VT is located based on information included in the RSU message received from the RSU, e.g., the RSU ID and map information.

A procedure performed in the VT may vary according to whether the RSU is the RSU related to the crosswalk which is located at the direction perpendicular to the direction of the vehicle or the RSU related to the crosswalk which is located at the direction parallel to the direction of the vehicle.

It may be noted that the safety service in FIG. 9A is a safety service provided in a situation that a vehicle at which a VT 903 is located may turn right and travel in a crosswalk, and the safety service in FIG. 9B is a safety service provided in a situation that the vehicle at which the VT 903 is located may travel parallel with the crosswalk.

In the situation, as illustrated in FIG. 9A, that the vehicle at which the VT 903 is located may turn right and travel in the crosswalk, a safety protection procedure for the pedestrian 905 needs to be performed. In the situation, as illustrated in FIG. 9B, that the vehicle at which the VT 903 is located may travel parallel with the crosswalk, the safety protection procedure for the pedestrian 905 does not need to be performed.

Yet another example of a safety service provided in a V2X communication system according to an embodiment of the present disclosure has been described with reference to FIGS. 9A to 9B, and an example of an operating process of a VT in a V2X communication system according to an embodiment of the present disclosure will be described with reference to FIG. 10.

Figure 10:
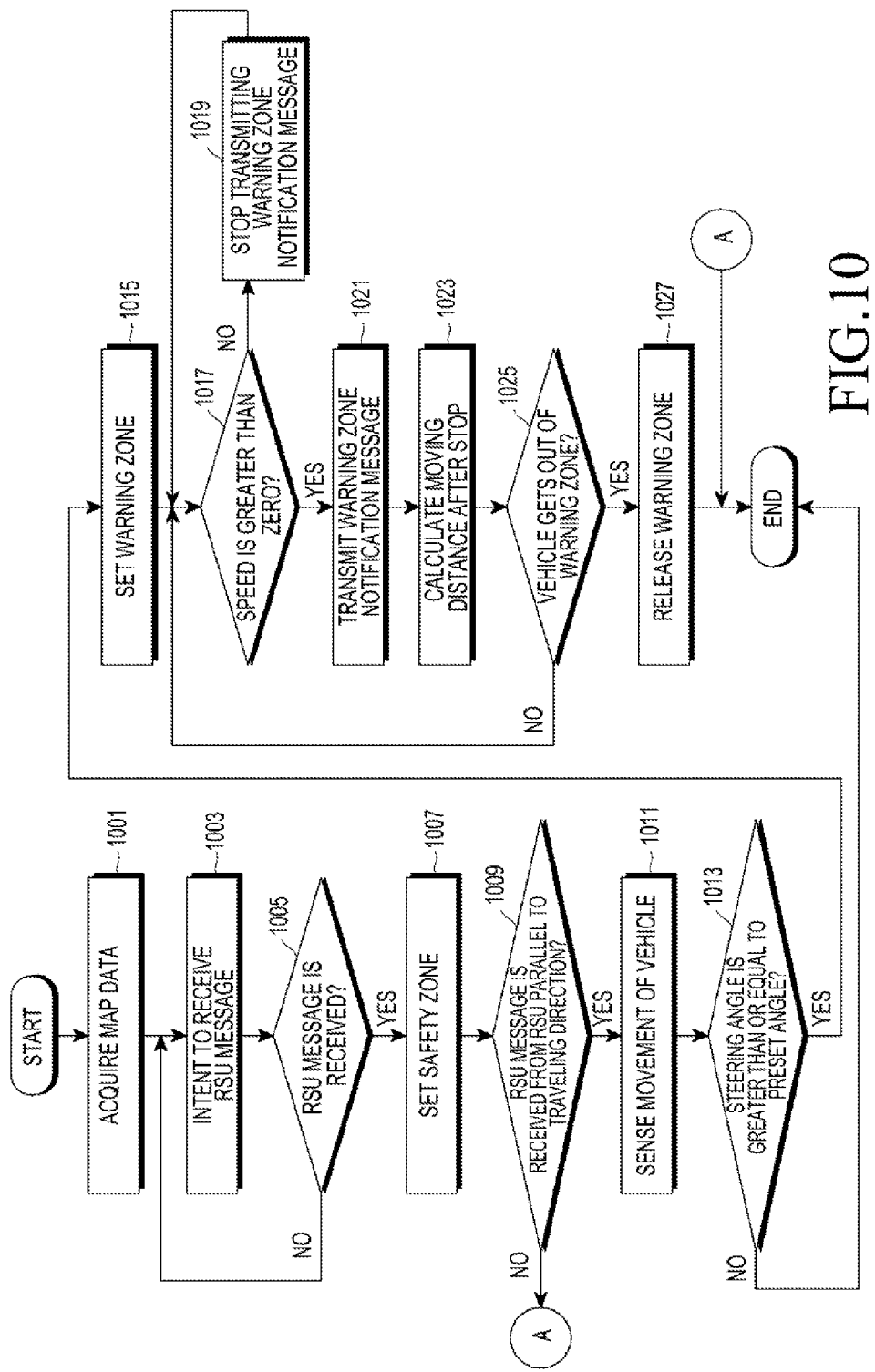
FIG. 10 illustrates an example of an operating process of a vehicle terminal (VT) in a V2X communication system according to an embodiment of the present disclosure.

FIG. 10 illustrates an example of an operating process of a VT in a V2X communication system according to an embodiment of the present disclosure.

Referring to FIG. 10, a VT acquires map information at operation 1001. For example, the VT may acquire the map information using a navigation or through other device such as a smart phone, a tablet, and/or the like.

The VT may intent to receive an RSU message transmitted by an RSU while a vehicle at which the VT is located is traveling at operation 1003. For example, the RSU message transmitted by the RSU may be beacon information. However, the RSU message may be implemented as various formats. The VT determines whether the RSU message is received at operation 1005. If the beacon signal is received, the VT sets a safety zone at operation 1007. The VT determines whether the received RSU message is transmitted by an RSU related to a crosswalk parallel to a direction of the vehicle at which the VT is located at operation 1009.

If the received RSU message is transmitted by the RSU related to the crosswalk parallel to the direction of the vehicle at which the VT is located, the VT senses movement of the vehicle based on various methods at operation 1011. The various methods may include a method of sensing movement of a vehicle using a speedometer, a method of sensing movement of a vehicle using a rotation sensor, and/or the like. The VT determines whether a steering angle of the vehicle at which the VT is located is equal to or greater than a preset angle at operation 1013. The reason why determining whether the steering angle of the vehicle is equal to or greater than the preset angle is to determine whether the vehicle travels across a crosswalk or parallel with the crosswalk. That is, the VT determines that the vehicle travels across the crosswalk if the steering angle of the vehicle is equal to or greater than the preset angle, and determines that the vehicle travels parallel with the crosswalk if the steering angle of the vehicle is less than the preset angle at operation 1013. In FIG. 10, the VT determines whether the vehicle travels across the crosswalk or parallel with the crosswalk based on the steering angle. However, the VT may determine whether the vehicle travels across the crosswalk or parallel with the crosswalk based on at least one of a blinker of the vehicle, and map information of a road where the vehicle is currently traveling, e.g., information indicating a driveway for only straight, information indicating a driveway for only right turn, and/or the like.

If the vehicle is traveling parallel with the crosswalk, the VT does not perform a safety protection procedure any more. If the vehicle is traveling across the crosswalk, for example, if the vehicle turns light, the VT sets a warning zone and performs an operation according to this at operation 1015.

The VT determines whether a speed of the vehicle is zero at operation 1017. That is, the VT determines whether the vehicle stops. If the vehicle stops, the VT does not transmit a warning zone notification message at operation 1019. If the vehicle is traveling, the VT transmits the warning zone notification message to notify a danger situation at operation 1021. The VT calculates a moving distance after stop at operation 1023. The moving distance after stop is used as a criterion for determining whether the vehicle gets out of the warning zone. In FIG. 10, the moving distance after stop is used as the criterion for determining whether the vehicle gets out of the warning zone. However, the VT may determine whether the vehicle gets out of the warning zone moving time after stop as well as the moving distance after stop.

The VT determines whether the vehicle gets out of the warning zone at operation 1025. If the vehicle gets out of the warning zone, the VT releases the warning zone and terminates the safety protection procedure at operation 1027. If the vehicle does not get out of the warning zone, the VT proceeds to operation 1017, measures a speed again, and determines whether to transmit the warning zone message based on the measured speed.

An example of an operating process of a VT in a V2X communication system according to an embodiment of the present disclosure has been described with reference to FIG. 10, and yet another example of a safety service provided in a V2X communication system according to an embodiment of the present disclosure will be described with reference to FIG. 11.

Figure 11:
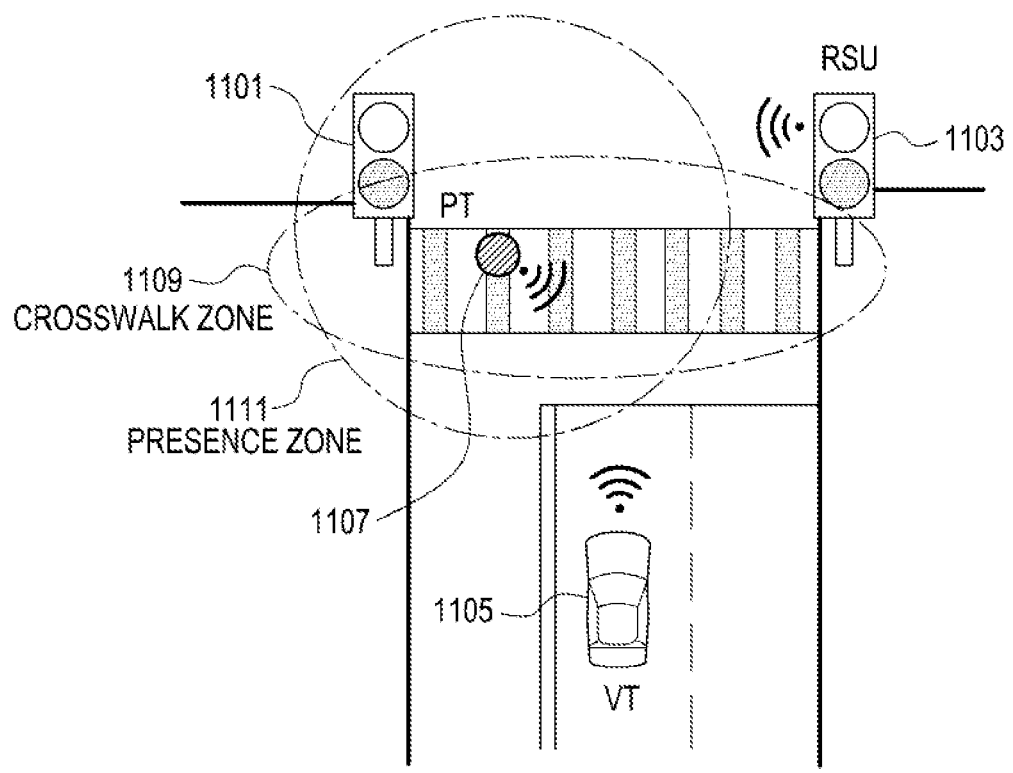
FIG. 11 illustrates yet another example of a safety service provided in a V2X communication system according to an embodiment of the present disclosure.

FIG. 11 illustrates yet another example of a safety service provided in a V2X communication system according to an embodiment of the present disclosure.

Referring to FIG. 11, an RSU 1103 may transmit a signal based on a beamforming scheme. Alternatively, the RSU 1103 may transmit a signal based on an omni scheme. For example, the RSU 1103 may set a zone within a crosswalk based on a beamforming scheme, and the zone set within the crosswalk may be referred to as crosswalk zone 1109.

If the RSU 1103 is on, for example, if the RSU 1103 is a traffic light and a pedestrian light is on, the RSU 1103 starts transmitting an RSU signal, and a range that the RSU is transmitted is a crosswalk zone 1109.

Meanwhile, each of all RSUs may transmit an RSU signal, or each of some RSUs may transmit an RSU signal. For example, if there are two RSUs, i.e., two traffic lights, related to one crosswalk, each of the two traffic lights or one traffic light may transmit an RSU signal.

Upon receiving an RSU signal, a PT 1107 transmits a PT message. The PT message is a message indicating that there is a PT. The transmission of the PT message may target a specific zone, e.g., a presence zone 1111 based on power control in the PT 1107. Here, a presence zone denotes a zone for notifying that a PT or a VT exists. So, a message transmitted in the presence zone may include at least one of an S_ID, a D_ID, and location information. Here, the location information is optional.

Upon receiving the PT message, the VT 1105 recognizes a risk based on the received PT message to transmit a danger notification message to the PT 1107.

Yet another example of a safety service provided in a V2X communication system according to an embodiment of the present disclosure has been described with reference to FIG. 11, and yet another example of a process of providing a safety service in a V2X communication system according to an embodiment of the present disclosure will be described with reference to FIG. 12.

Figure 12:
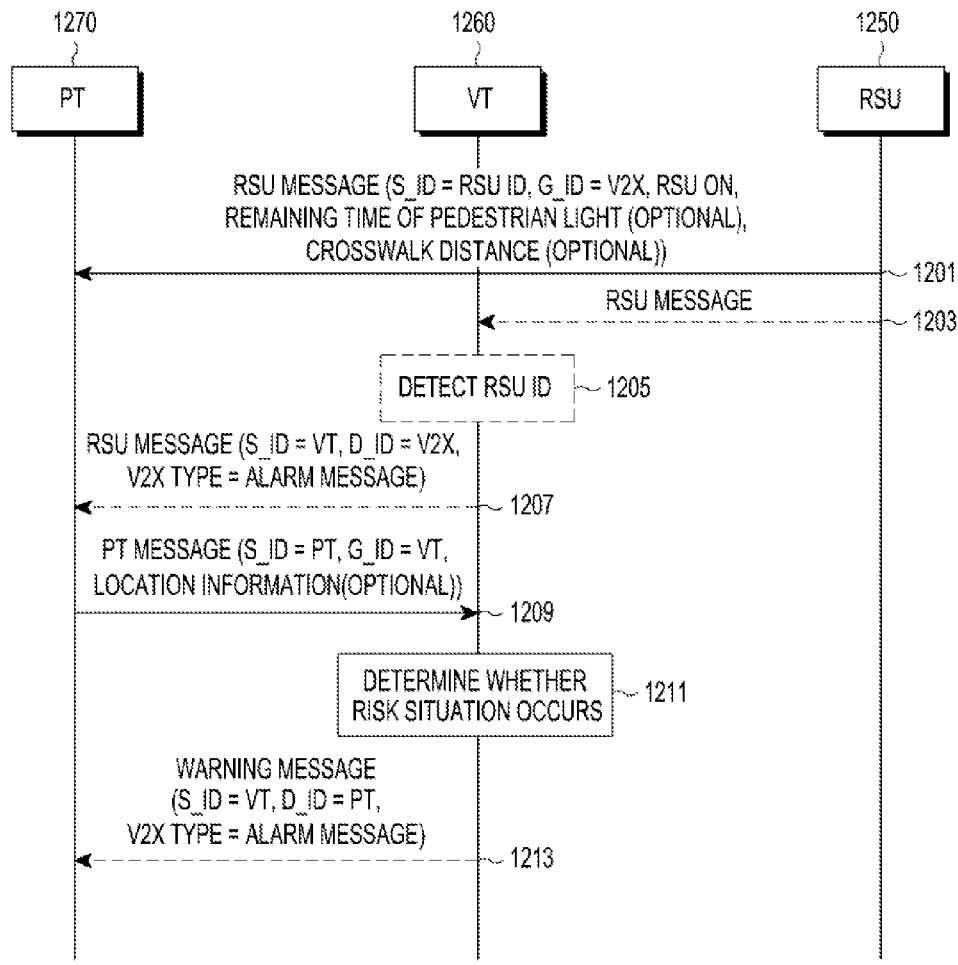
FIG. 12 illustrates yet another example of a process of providing a safety service in a V2X communication system according to an embodiment of the present disclosure.

FIG. 12 illustrates yet another example of a process of providing a safety service in a V2X communication system according to an embodiment of the present disclosure.

Referring to FIG. 12, if an RSU 1250 is on, the RSU 1250 transmits an RSU message at operation 1201. For example, in a case that the RSU 1250 is a traffic light, the RSU 1250 transmits the RSU message when a pedestrian light is on. The transmission of the RSU message may be performed as soon as the pedestrian light is on or may be performed margin time in advance before the pedestrian light is on. An S_ID included in the RSU message may be set to an identifier of the RSU 1250 which transmits the RSU message, and a D_ID included in the RSU message may be set to V2X thereby a VT and a PT may receive the RSU message. Further, the RSU message may include information indicating that the RSU 1250 is on, information about remaining time of the RSU 1250, e.g., information about remaining time for the pedestrian light, or information about a distance of a crosswalk. The RSU message may be transmitted as a form of a broadcast message or a unicast message at operation 1203.

Upon receiving the RSU message transmitted by the RSU 1250, for example, upon receiving an RSU ID, a PT 1270 starts transmitting a PT message which a VT 1260 may receive at operation 1209. The transmission of the PT message may target a specific radius, e.g., a warning zone based on power control in the PT 1270.

The PT message may include at least one of an S_ID, a G_ID, or location information of the PT 1270. The S_ID is set to a PT ID, and this may indicate that the PT message is transmitted by a PT group or a PT. The D_ID is set to a VT ID, and this may indicate that the PT message targets a VT group or a VT. The PT 1270 may detect location information of the PT 1270 based on a positioning technology, e.g., a positioning technology which uses a GPS module included in the PT 1270 to include the location information into the PT message.

Upon receiving the PT message, the VT 1260 may perform an operation of determining a risk situation based on the received PT message at operation 1211. The operation of determining the risk situation in the VT 1260 may be described below, so a detailed description thereof will be omitted herein. Upon detecting the risk situation according to the operation of determining the risk situation, the VT 1260 transmits a warning message to the PT 1270 at operation 1213.

The warning message transmitted by the VT 1260 includes at least one of an S_ID, a D_ID, and a V2X type. The S_ID is set to a VT ID, and this indicates that the warning message is transmitted by a VT group or a VT. The D_ID is set to a PT ID, and this indicates that the warning message targets a PT group or a PT. The V2X type indicates an alarm message.

Upon receiving the RSU message, e.g., a warning message, the VT 1260 may detect an RSU ID at operation 1205, and transmits the warning message to the PT 1270 at operation 1207.

Upon receiving the warning message, the PT 1270 may notify a pedestrian of a risk situation. For example, the PT 1270 may notify the risk situation based on various formats such as a sound, a message on a screen, and/or the like.

Further, an operation of terminating a message transmitting operation proposed in an embodiment of the present disclosure will be described below.

In a case that a PT transmits a PT message, the PT may terminate a message transmitting operation if the PT does not receive an RSU message during preset time.

Upon receiving an RSU message, a PT may terminate a transmission of an RSU message if the RSU message includes information indicating remaining time of a traffic light or a crosswalk distance.

If the RSU message includes the information indicating the remaining time of the traffic light, the PT may set time for transmitting a PT message based on the remaining time of the traffic light and margin time.

For example, upon detecting that the remaining time of the traffic light is 20 seconds based on the RSU message, the PT transmits the PT message during 22 (20+preset margin time (e.g., 2)) seconds and terminates the transmission of the PT message after 22 seconds has elapsed.

For another example, upon detecting that the crosswalk distance is 10 meters based on the RSU message, the PT detects the number of steps of a pedestrian which has the PT based on an acceleration sensor, a gyro sensor, and/or the like included in the PT. The PT may predict a pedestrian's moving distance based on the number of the pedestrian's steps, and terminates the transmission of the PT message after the pedestrian has moved as the crosswalk distance.

Meanwhile, a method for a VT to terminate a transmission of a warning message will be described below.

If a VT does not receive an RSU during predetermined time, the VT terminates a transmission of a warning message. If a speed of the VT is zero, the VT terminates the transmission of the warning message. Thereafter, if the speed of the VT is greater than or equal to zero, the VT restarts transmitting the warning message.

Time when a transmission of an RSU message is terminated may be time when an RSU is off. For example, in a case that the RSU is a traffic light, if a pedestrian light is off, the transmission of the RSU message is terminated.

Yet example of a process of providing a safety service in a V2X communication system according to an embodiment of the present disclosure has been described with reference to FIG. 12, and another example of an operating process of a VT in a V2X communication system according to an embodiment of the present disclosure will be described with reference to FIG. 13.

Figure 13:
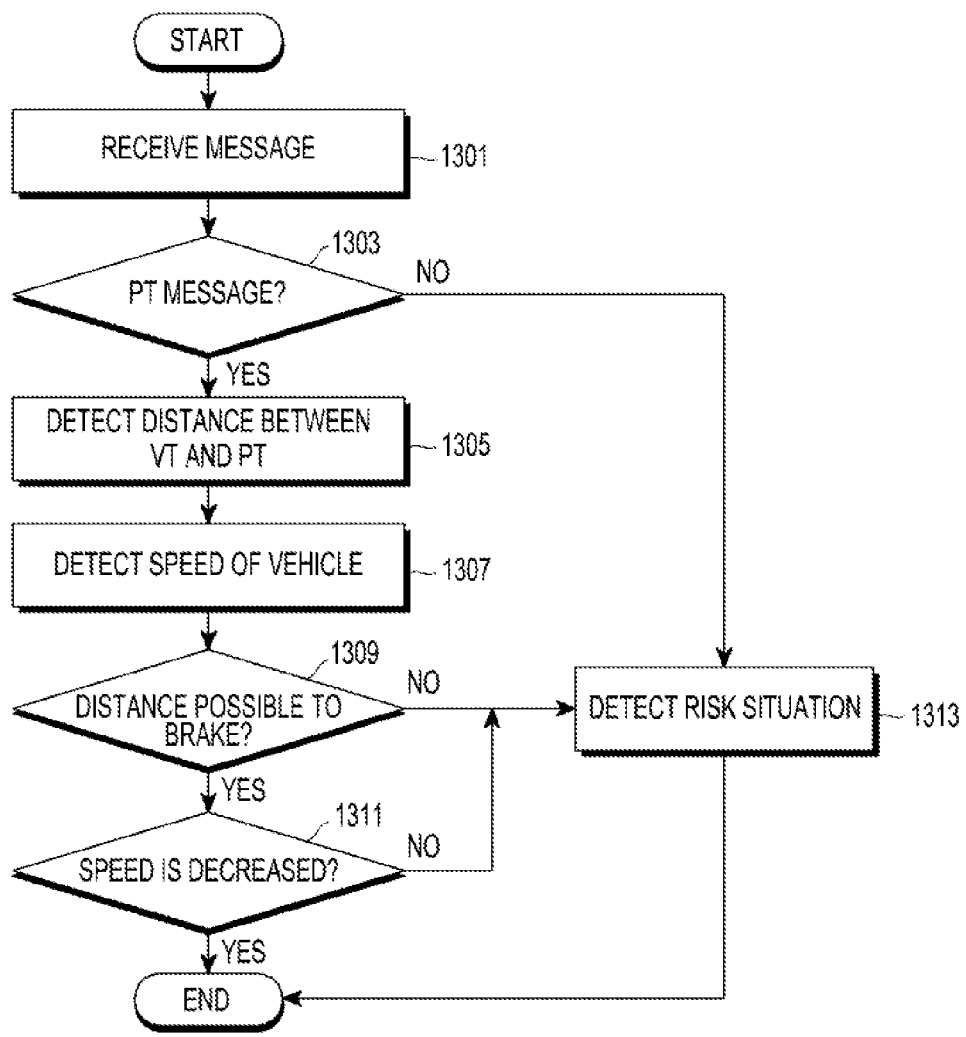
FIG. 13 illustrates another example of an operating process of a VT in a V2X communication system according to an embodiment of the present disclosure.

FIG. 13 illustrates another example of an operating process of a VT in a V2X communication system according to an embodiment of the present disclosure.

Referring to FIG. 13, a VT receives a message at operation 1301. The VT determines the received message is a PT message at operation 1303. If the received message is not the PT message, that is, if the received message is an RSU message received from an RSU, the VT determines that a risk situation occurs at operation 1313.

If the received message is a PT message received from a PT, the VT detects a distance between the VT and the PT at operation 1305. The VT detects a speed of a vehicle at which the VT is located at operation 1307. The VT determines whether the distance between the PT and the VT is a distance that a brake is possible based on the detected distance between the PT and the VR and the speed of the vehicle at operation 1309. If the distance between the PT and the VT is the distance that the brake is possible, the VT determines whether the speed of the vehicle is decreased at operation 1311. If the speed of the vehicle is decreased, the VT terminates the operation.

If the speed of the vehicle is not decreased, the VT proceeds to operation 1313.

Meanwhile, the distance between the PT and the VT may be detected based on location information of the PT included in the PT message and location information of the VT. The distance between the PT and the VT may be a specific radius, e.g., a distance that the PT message may be received.

If the PT generates a specific radius, e.g., a warning zone, the distance between the PT and the VT may be a distance which is determined based on power control.

For example, if the distance between the PT and the VT is 10 m, the speed of the vehicle is 60 km, and the braking distance of the vehicle is 15.8 m, the vehicle may endanger a pedestrian even though the vehicle stops at operation 1313. In this case, the VT detects a risk situation.

For another example, if the distance between the PT and the VT is 20 m, the speed of the vehicle is 60 km, and the braking distance of the vehicle is 15.8 m, the VT may determine that the risk situation does not occur since the vehicle may stop. However, if the speed of the vehicle is not decreased, the VT determines this case as a risk situation.

Another example of an operating process of a VT in a V2X communication system according to an embodiment of the present disclosure has been described with reference to FIG. 13, and yet another example of a safety service provided in a V2X communication system according to an embodiment of the present disclosure will be described with reference to FIG. 14.

Figure 14:
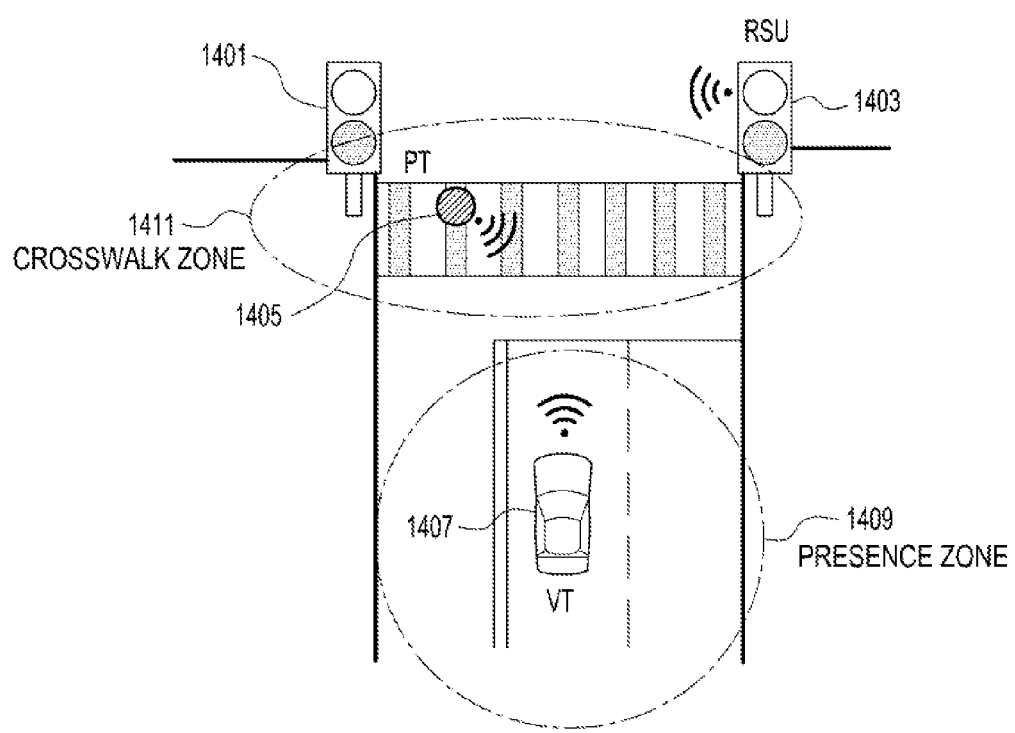
FIG. 14 illustrates yet another example of a safety service provided in a V2X communication system according to an embodiment of the present disclosure.

FIG. 14 illustrates yet another example of a safety service provided in a V2X communication system according to an embodiment of the present disclosure.

Referring to FIG. 14, an RSU 1403 may transmit a signal based on a beamforming scheme. Alternatively, the RSU 1403 may transmit a signal based on an omni-directional scheme. For example, the RSU 1403 may set a zone within a crosswalk based on the beamforming scheme, and the zone set within the crosswalk is a crosswalk zone 1411.

If the RSU 1403 is on, for example, if the RSU 1403 is a traffic light and a pedestrian light is on, the RSU 1403 may start transmitting an RSU signal. At this time, a range that the RSU signal is transmitted becomes a crosswalk zone 1411.

Each of all RSUs may transmit an RSU signal, or each of some RSUs may transmit an RSU signal. For example, if there are two RSUs, i.e., two traffic lights, related to one crosswalk, an RSU signal may be transmitted by each of the two traffic lights or one of two traffic lights.

A VT 1407 always transmits a VT message. The transmission of the VT message may be performed within a specific radius, e.g., a presence zone 1409 based on power control.

Upon receiving a VT message and an RSU message, a PT 1405 determines whether a risk situation occurs based on the VT message and the RSU message, and may output a warning message or transmit a warning message to the VT 1407 based on the determined result.

Yet another example of a safety service provided in a V2X communication system according to an embodiment of the present disclosure has been described with reference to FIG. 14, and yet another example of a process for providing a safety service in a V2X communication system according to an embodiment of the present disclosure will be described with reference to FIG. 15.

Figure 15:
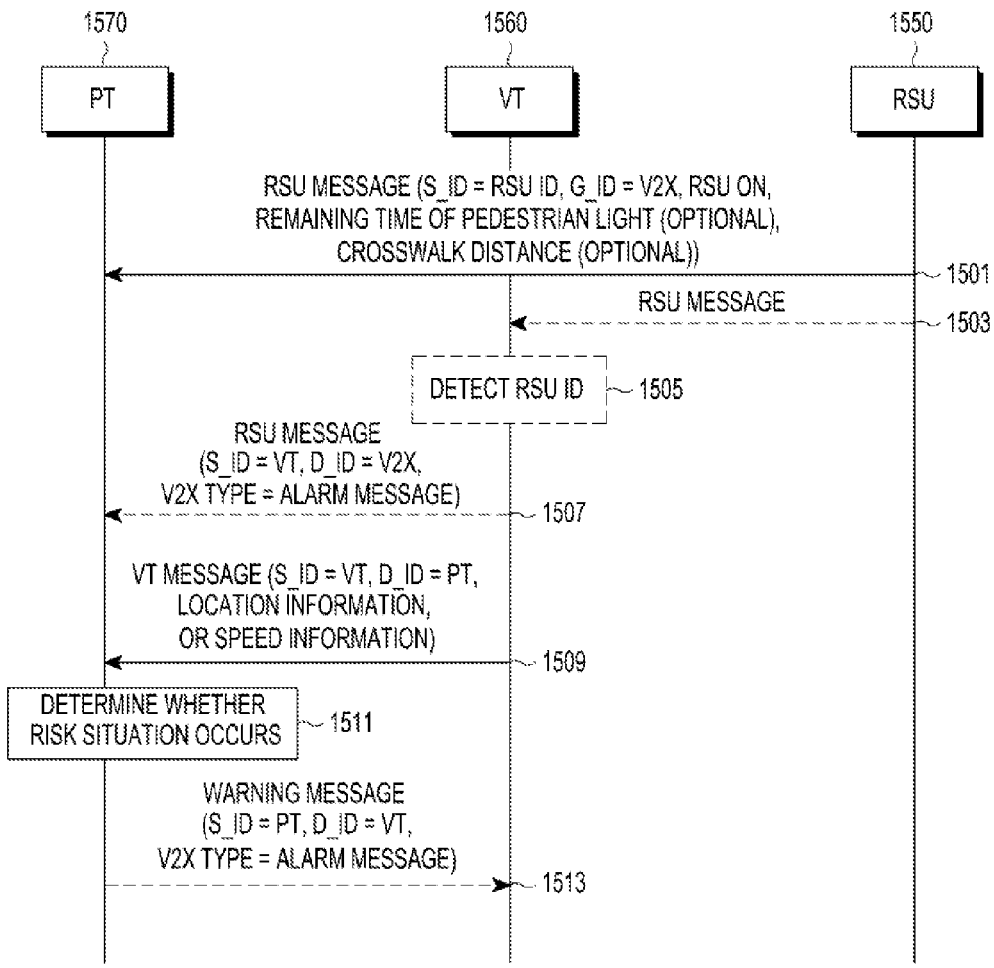
FIG. 15 illustrates yet another example of a process for providing a safety service in a V2X communication system according to an embodiment of the present disclosure.

FIG. 15 illustrates yet another example of a process for providing a safety service in a V2X communication system according to an embodiment of the present disclosure.

Referring to FIG. 15, if an RSU 1550 is on, the RSU 1550 transmits an RSU message at operation 1501. For example, in a case that the RSU 1550 is a traffic light, the RSU 1550 transmits the RSU message when a pedestrian light is on. The transmission of the RSU message may be performed as soon as the pedestrian light is on or may be performed margin time in advance before the pedestrian light is on. The RSU message includes an S_ID and a G_ID, the S_ID may be set to an RSU ID, and the G_ID may be set to V2X thereby a VT 1560 and a PT 1570 may receive the RSU message. Further, the RSU message may include information indicating that the RSU 1550 is on, information about remaining time of the RSU 1550, e.g., information about remaining time for the pedestrian light, or information about a distance of a crosswalk. The RSU message may be a broadcast message or a unicast message at operation 1503.

The VT 1560 always transmits a VT message at operation 1509, and the VT message includes an S_ID and a D_ID. The S_ID is set to a VT ID, and this indicates that the VT message is transmitted by a VT group or a VT. The D_ID is set to a PT ID, and this indicates that the VT message targets a PT group or a PT. The VT message may include location information of a VT or speed information of a vehicle at which the VT is located. The location information of the VT may be detected based on a positioning technology, e.g., a positioning technology which uses a GPS module included in the VT 1560.

The transmission of the VT message may target a specific radius, e.g., a warning zone based on power control in the VT 1560.

Upon receiving the VT message, the PT 1570 may determine whether a risk situation occurs based on the received VT message at operation 1511. This will be described with reference to FIG. 16, so a detailed description thereof will be omitted herein.

The PT 1570 may transmit a warning message to the VT 1560 at operation 1513. The warning message transmitted by the PT 1570 includes an S_ID and a D_ID. The S_ID is set to a PT ID, and this indicates that the warning message is transmitted by a PT group or a PT. The D_ID is set to a VT ID, and this indicates that the warning message targets a VT group or a VT. The warning message may further include a V2X type, and the V2X type indicates an alarm message.

Upon receiving the RSU message, e.g., the warning message, the VT 1560 may detect an RSU ID at operation 1505, and transmits the warning message to the PT 1570 at operation 1507.

Further, an operation of terminating a warning message transmitting operation proposed in an embodiment of the present disclosure will be described below.

Firstly, an operation of terminating a warning message transmitting operation in a PT will be described below.

In a case that a PT transmits a warning message, the PT may terminate an operation of transmitting the warning message if the PT does not receive an RSU message during preset time.

Upon receiving an RSU message, a PT may terminate a transmission of a warning message if the RSU message includes information indicating remaining time of a traffic light or a crosswalk distance, and this will be described below.

If the RSU message includes the information indicating the remaining time of the traffic light, the PT may set time for transmitting a warning message based on the remaining time of the traffic light and margin time.

For example, upon detecting that the remaining time of the traffic light is 20 seconds based on the RSU message, the PT determines to transmit the warning message during 22 (20+preset margin time (e.g., 2)) seconds, and detects time when the PT determines that a risk situation occurs according to reception of a PT message. The PT transmits the warning message during preset time, e.g., the remaining time of the traffic light, and terminates the transmission of the warning message after the preset time has elapsed.

For an example, upon detecting that a crosswalk distance is 10 meters based on the RSU message, the PT detects the number of steps of a pedestrian which has the PT based on an acceleration sensor, a gyro sensor, and/or the like included in the PT. The PT may predict a pedestrian's moving distance based on the number of the pedestrian's steps, and calculates the moving distance from time that the RSU message is received. So, the PT may detect a distance between the time that the RSU message is received and time that the PT detects a risk situation, calculate the remaining distance of the crosswalk using the distance, transmit the warning message corresponding to the remaining distance, and terminate the transmission of the warning message after the remaining distance.

Yet another example of a process for providing a safety service in a V2X communication system according to an embodiment of the present disclosure has been described with reference to FIG. 15, and an example of an operating process of a PT in a V2X communication system according to an embodiment of the present disclosure will be described with reference to FIG. 16.

Figure 16:
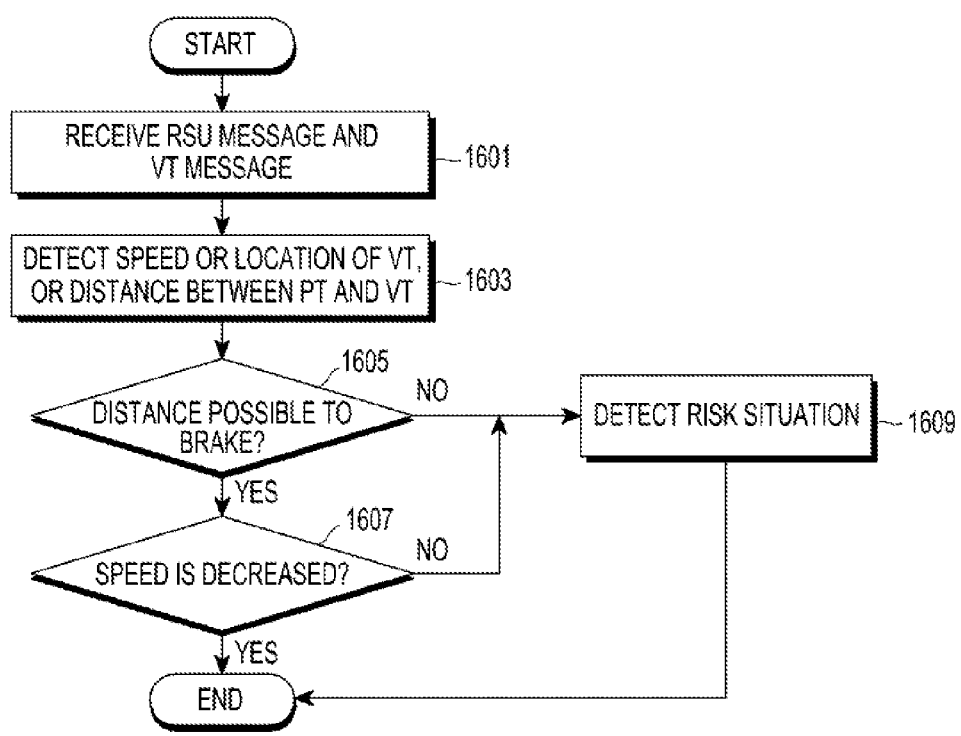
FIG. 16 illustrates an example of an operating process of a pedestrian terminal (PT) in a V2X communication system according to an embodiment of the present disclosure.

FIG. 16 illustrates an example of an operating process of a PT in a V2X communication system according to an embodiment of the present disclosure.

Referring to FIG. 16, upon receiving an RSU message and a VT message, a PT may start an operation related to the RSU message and the VT message at operation 1601. The PT determines whether a risk situation occurs based on the VT message at operations 1603 to 1609. For example, a scheme of determining whether the risk situation occurs may be a scheme of detecting a braking distance based on a distance between the PT and the VT and a speed of the VT and determining whether the risk situation occurs based on the braking distance.

Meanwhile, the PT detects the speed of the VT, a location of the VT, or the distance between the PT and the VT at operation 1603. The RT may detect the distance between the PT and the VT based on location information of the VT included in the VT message. In a case that the VT transmits the VT message within a specific radius, e.g., a warning zone, the PT detects the distance between the PT and the VT based on the specific radius upon receiving the VT message.

The PT determines whether the distance between the PT and the VT is shorter than or equal to a distance that the vehicle may stop, i.e., a distance possible to brake, at operation 1605. If the distance between the PT and the VT is shorter than or equal to the distance that the vehicle may stop, the PT determines whether the speed of the vehicle is decreased at operation 1607. If the speed of the vehicle is decreased, the PT terminates its operation.

If the distance between the PT and the VT is longer than the distance that the vehicle may stop, or the speed of the vehicle is not decreased, the PT determines that the risk situation occurs.

For example, if the distance between the PT and the VT is 10 m, the speed of the vehicle is 60 km, and the braking distance of the vehicle is 15.8 m, the vehicle may endanger a pedestrian even though the vehicle stops. In this case, the PT determines that the risk situation occurs.

For another example, if the distance between the PT and the VT is 20 m, the speed of the vehicle is 60 km, and the braking distance of the vehicle is 15.8 m, the PT may determine that the risk situation does not occur. However, even though the distance between the PT and the VT longer than the braking distance of the vehicle, the PT determines that the risk situation occurs if the speed of the vehicle is not decreased.

An example of an operating process of a PT in a V2X communication system according to an embodiment of the present disclosure has been described with reference to FIG. 16, and yet another example of a safety service provided in a V2X communication system according to an embodiment of the present disclosure will be described with reference to FIG. 17.

Figure 17:
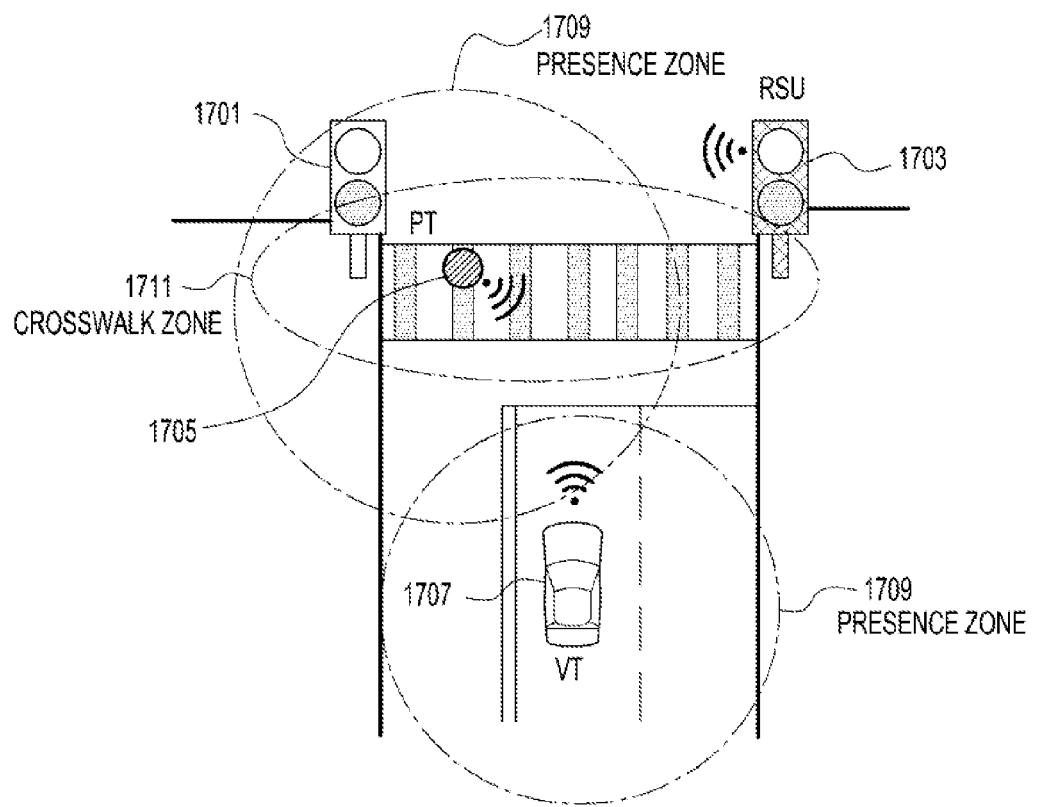
FIG. 17 illustrates yet another example of a safety service provided in a V2X communication system according to an embodiment of the present disclosure.

FIG. 17 illustrates yet another example of a safety service provided in a V2X communication system according to an embodiment of the present disclosure.

Referring to FIG. 17, an RSU 1703 may transmit a signal based on a beamforming scheme. Alternatively, the RSU 1703 may transmit a signal based on an omni-directional scheme. For example, the RSU 1703 may set a zone within a crosswalk based on the beamforming scheme, and the zone set within the crosswalk is a crosswalk zone 1711.

If the RSU 1703 is on, for example, if the RSU 1703 is a traffic light and a pedestrian light is on, the RSU 1703 may start transmitting an RSU signal. At this time, a range that the RSU signal is transmitted becomes a crosswalk zone 1711.

Each of all RSUs may transmit an RSU signal, or each of some RSUs may transmit an RSU signal. For example, if there are two RSUs, i.e., two traffic lights, related to one crosswalk, an RSU signal may be transmitted by each of the two traffic lights or one of two traffic lights.

Upon receiving an RSU message, i.e., upon entering the crosswalk zone 1711, a PT 1705 transmits a PT message to the RSU 1703. Here, the transmission of the PT message may be performed within a specific radius, e.g., a presence zone 1713 based on power control in the PT 1705.

A VT 1707 always transmits a VT message. The transmission of the VT message may be performed within a specific radius, e.g., a presence zone 1709 based on power control in the VT 1707.

Upon receiving the PT message and the VT message, the RSU 1703 determines whether a risk situation occurs based on the received PT message and VT message, and transmits a warning message to the PT 1705 based on the determined result. The PT 1705 may transmit the received warning message to the VT 1707.

Yet another example of a safety service provided in a V2X communication system according to an embodiment of the present disclosure has been described with reference to FIG. 17, and yet another example of a process of providing a safety service in a V2X communication system according to an embodiment of the present disclosure will be described with reference to FIG. 18.

Figure 18:
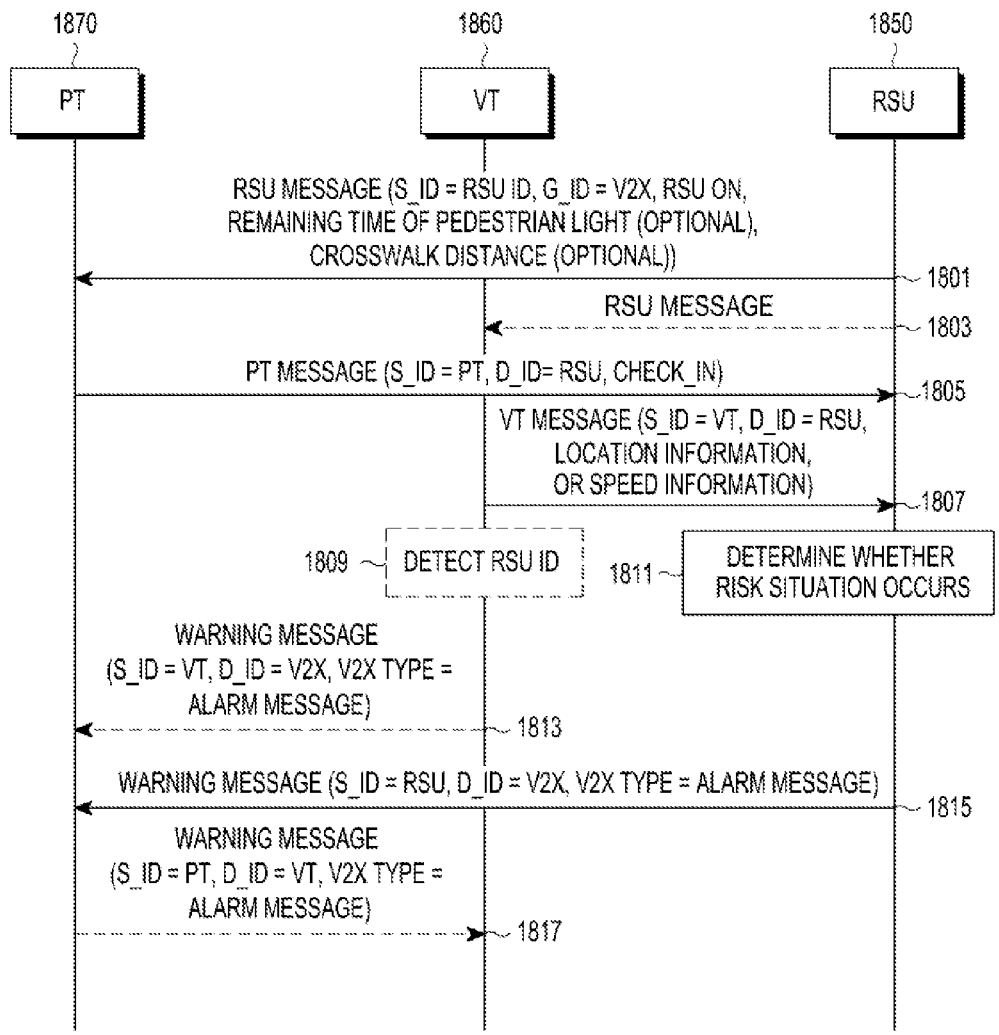
FIG. 18 illustrates yet another example of a process of providing a safety service in a V2X communication system according to an embodiment of the present disclosure.

FIG. 18 illustrates yet another example of a process of providing a safety service in a V2X communication system according to an embodiment of the present disclosure.

Referring to FIG. 18, if an RSU 1850 is on, the RSU 1850 transmits an RSU message at operation 1801. For example, in a case that the RSU 1850 is a traffic light, the RSU 1850 transmits the RSU message when a pedestrian light is on. The transmission of the RSU message may be performed as soon as the pedestrian light is on or may be performed margin time in advance before the pedestrian light is on. The RSU message includes an S_ID and a G_ID, the S_ID may be set to an RSU ID, and the G_ID may be set to V2X thereby a VT 1860 and a PT 1870 may receive the RSU message. Further, the RSU message may include information indicating that the RSU 1850 is on, information about remaining time of the RSU 1850, e.g., information about remaining time for the pedestrian light, or information about a distance of a crosswalk. The RSU message may be a broadcast message or a unicast message at operation 1803.

Upon receiving the RSU message transmitted by the RSU 1850, for example, upon receiving an identifier of the RSU 1850, the PT 1870 starts transmitting a PT message which the RSU 1850 may receive at operation 1805.

The PT message includes an S_ID, and the S_ID is set to a PT ID thereby indicating the PT message is transmitted by a PT group or a PT. The PT message includes a D_ID, and the D_ID is set to an RSU ID thereby indicating the PT message targets an RSU group or an RSU.

The VT 1860 always transmits a VT message at operation 1807. The VT message includes an S_ID, and the S_ID is set to a VT ID thereby indicating that the VT message is transmitted by a VT group or a VT. The VT message includes a D_ID, and the D_ID is set to a PT ID thereby indicating that the VT message targets a PT group or a PT. The VT message may include location information of a VT or speed information of a vehicle. The location information of the VT may be detected based on a positioning technology, e.g., a positioning technology which uses a GPS module included in the VT.

Upon receiving the PT message and the VT message, the RSU 1850 may determine whether there is the PT 1870 based on the PT message, and determine whether a risk situation due to the VT occurs based on the VT message. A method of determining whether the risk situation occurs in the RSU 1850 will be described below, so a detailed description thereof will be omitted herein. The RSU 1850 determines whether a risk situation for the PT 1870 occurs at operation 1811.

The RSU 1850 may transmit a warning message to the PT 1870 at operation 1815, and transmit the warning message received from the RSU 1850 to the VT 1860 at operation 1817.

The warning message transmitted by the RSU 1850 includes an S_ID indicating that the warning message is transmitted by an RSU group or an RSU, and a D_ID indicating that the warning message targets a PT or a VT. That is, a D_ID included in the warning message is set to V2X. The warning message includes a V2X type, and the V2X type indicates a warning message.

Upon receiving the RSU message, the VT 1860 may detect an RSU ID at operation 1809, and transmits the received warning message to the PT 1870 at operation 1813.

Upon receiving the warning message, the PT 1870 may notify to a pedestrian that a risk situation occurs. For example, the PT 1870 may notify that the risk situation occurs based on a sound or a message on a screen of the PT 1870.

The warning message transmitted by the PT 1870 to the VT 1860 at operation 1817 includes an S_ID indicating that the warning message is transmitted by a PT group or a PT, a D_ID indicating that the warning message targets a VT group or a VT, and a V2X type indicating a warning message.

Meanwhile, an operation of terminating transmission of messages includes an operation of terminating transmission of a PT message in a PT, an operation of terminating transmission of a warning message in a VT, an operation of terminating transmission of a warning message in a PT, and an operation of terminating transmission of a warning message in an RSUT, and this has been described with reference to FIGS. 12 to 15, so a detailed description thereof will be omitted herein.

Yet another example of a process of providing a safety service in a V2X communication system according to an embodiment of the present disclosure has been described with reference to FIG. 18, and an example of an operating process of an RSU in a V2X communication system according to an embodiment of the present disclosure will be described with reference to FIG. 19.

Figure 19:
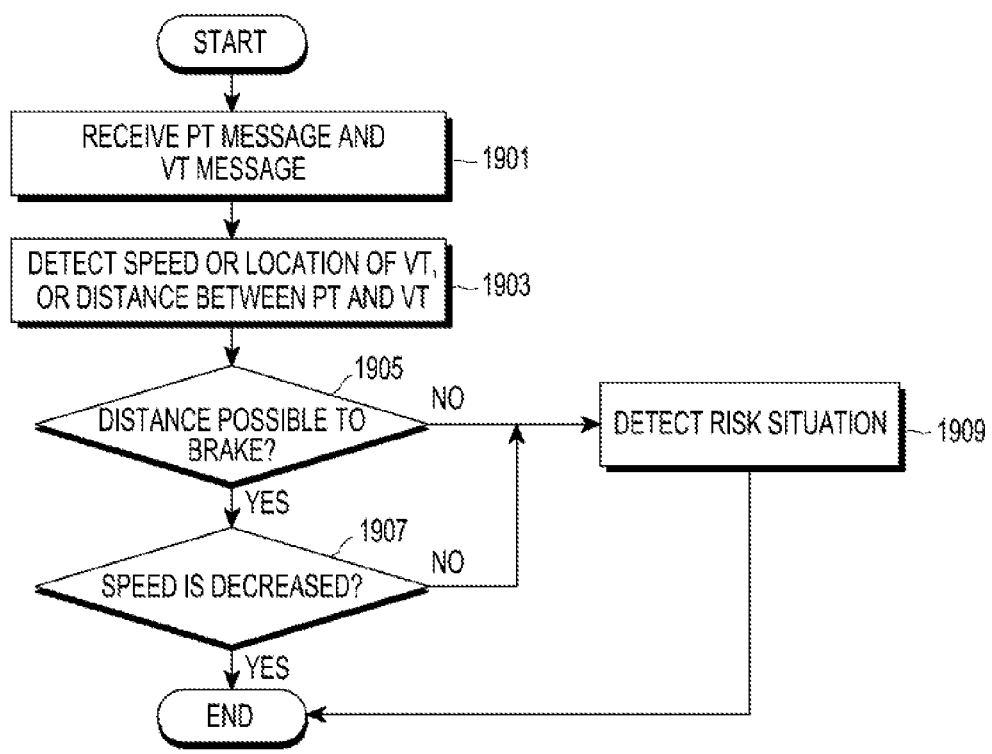
FIG. 19 illustrates an example of an operating process of a road side unit (RSU) in a V2X communication system according to an embodiment of the present disclosure.

FIG. 19 illustrates an example of an operating process of an RSU in a V2X communication system according to an embodiment of the present disclosure.

Referring to FIG. 19, an RSU receives a PT message and a VT message, and may start an operation according to the PT message and the VT message at operation 1901.

Upon receiving the VT message transmitted by a VT and the PT message transmitted by a PT, the RSU determines whether a risk situation occurs based on the PT message and the VT message at operations 1903 to 1909. For example, a scheme of determining whether the risk situation occurs may be a scheme of detecting a braking distance based on a distance between the PT and the VT and a speed of the VT and determining whether the risk situation occurs based on the braking distance.

Meanwhile, the RSU detects the speed of the VT, a location of the VT, or the distance between the PT and the VT at operation 1903. The RSU may detect the distance between the PT and the VT based on location information of the PT included in the PT message and location information of the VT included in the VT message. In a case that the VT transmits the VT message within a specific radius, e.g., a warning zone, the RSU detects the distance between the PT and the VT based on the specific radius upon receiving the VT message.

The RSU determines whether the distance between the PT and the VT is shorter than or equal to a distance that the vehicle may stop, i.e., a distance possible to brake, at operation 1905. If the distance between the PT and the VT is shorter than or equal to the distance that the vehicle may stop, the RSU determines whether the speed of the vehicle is decreased at operation 1907. If the speed of the vehicle is decreased, the RSU terminates its operation.

If the distance between the PT and the VT is longer than the distance that the vehicle may stop, or the speed of the vehicle is not decreased, the RSU determines that the risk situation occurs.

For example, if the distance between the PT and the VT is 10 m, the speed of the vehicle is 60 km, and the braking distance of the vehicle is 15.8 m, the vehicle may endanger a pedestrian even though the vehicle stops. In this case, the RSU determines that the risk situation occurs.

For another example, if the distance between the PT and the VT is 20 m, the speed of the vehicle is 60 km, and the braking distance of the vehicle is 15.8 m, the RSU may determine that the risk situation does not occur. However, even though the distance between the PT and the VT longer than the braking distance of the vehicle, the RSU determines that the risk situation occurs if the speed of the vehicle is not decreased.

An example of an operating process of an RSU in a V2X communication system according to an embodiment of the present disclosure has been described with reference to FIG. 19, and yet another example of a safety service provided in a V2X communication system according to an embodiment of the present disclosure will be described with reference to FIG. 20.

Figure 20:
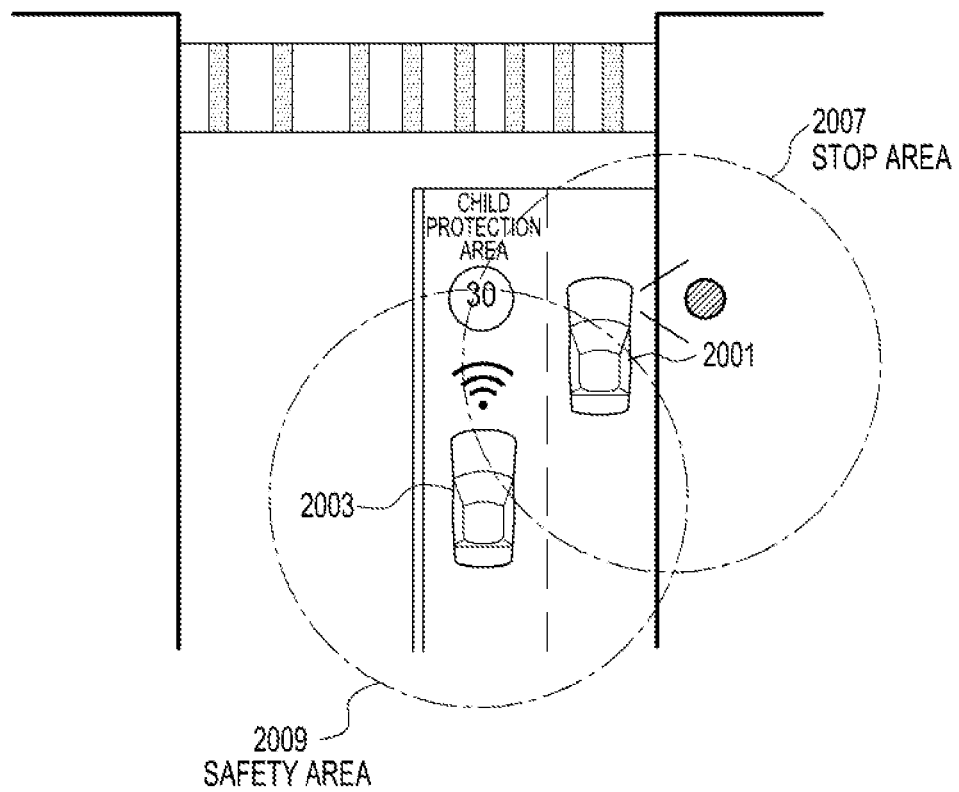
FIG. 20 illustrates yet another example of a safety service provided in a V2X communication system according to an embodiment of the present disclosure.

FIG. 20 illustrates yet another example of a safety service provided in a V2X communication system according to an embodiment of the present disclosure.

Referring to FIG. 20, it may be noted that a safety service in FIG. 20 is a safety service which is provided to a pedestrian located at a school zone.

A school bus 2001 is stopped on a road and a pedestrian 2005 is getting on or off the school bus 2001. Upon detecting that a vehicle door of the school bus 2001 is opened for the getting on/off of the pedestrian 2005, a VT which is located at school bus 2001 transmits a stop area message indicating a stop area 2007 is generated. The stop area message includes an identifier of the VT, and a stop area notification indicator. The stop area notification indicator is an indicator indicating that a stop area is generated. The stop area message is periodically transmitted, and the transmission of the stop area message is released if the vehicle door is closed and the school bus 2001 starts. In another embodiment, the stop area message is periodically transmitted, and the transmission of the stop area message is released if a predetermined time has elapsed after the vehicle door is closed and the school bus 2001 starts. In yet another embodiment, the stop area message is periodically transmitted, and the transmission of the stop area message is released if predetermined time has elapsed and a speed of the school bus 2001 is higher than or equal to a predetermined speed after the vehicle door is closed and the school bus 2001 starts. The stop area message is transmitted based on a broadcast scheme or a multicast scheme. A vehicle 2003 is traveling on the road in a direction of the school bus 2001. Upon receiving the stop area message, a VT which is located at the vehicle 2003 transmits a safety area message for notifying that the vehicle 2003 is traveling nearby the school bus 2001, that is, for notifying that a safety area 2009 is generated. Here, a safety area message is used for notifying that a vehicle is traveling, and indicates that a safety area is generated. The safety area message includes at least one of an identifier of a VT, a speed of a vehicle, a speed variation of the vehicle, and a traveling direction of the vehicle. The safety area message is periodically transmitted. The safety area message is transmitted based on a broadcast scheme or a multicast scheme. Upon receiving the stop area message, a PT of the pedestrian 2005 runs a V2X vehicle safety service application. The V2X vehicle safety service application monitors whether the safety area message transmitted by the VT which is located at the vehicle 2003 is received. Upon receiving the safety area message, the PT of the pedestrian 2005 determines whether a risk situation for the pedestrian 2005 occurs, and generates and transmits a pedestrian warning message through the V2X vehicle safety service application if the risk situation occurs. Here, a pedestrian warning message indicates that there is a pedestrian. The pedestrian warning message includes at least one of a pedestrian notification indicator notifying that there is a pedestrian, the pedestrian's location information, and the pedestrian's speed. The PT of the pedestrian 2005 periodically transmits the pedestrian warning message until it is determined that there is no risk situation for the pedestrian 2005. The pedestrian warning message is transmitted based on a broadcast scheme, a multicast scheme, or a unicast scheme. In another example, the VT receiving the stop area message may change a transmission cycle for the safety message, a priority, and/or the like.

Yet another example of a safety service provided in a V2X communication system according to an embodiment of the present disclosure has been described with reference to FIG. 20, and yet another example of a safety service provided in a V2X communication system according to an embodiment of the present disclosure will be described with reference to FIGS. 21A and 21B.

Figure 21A:
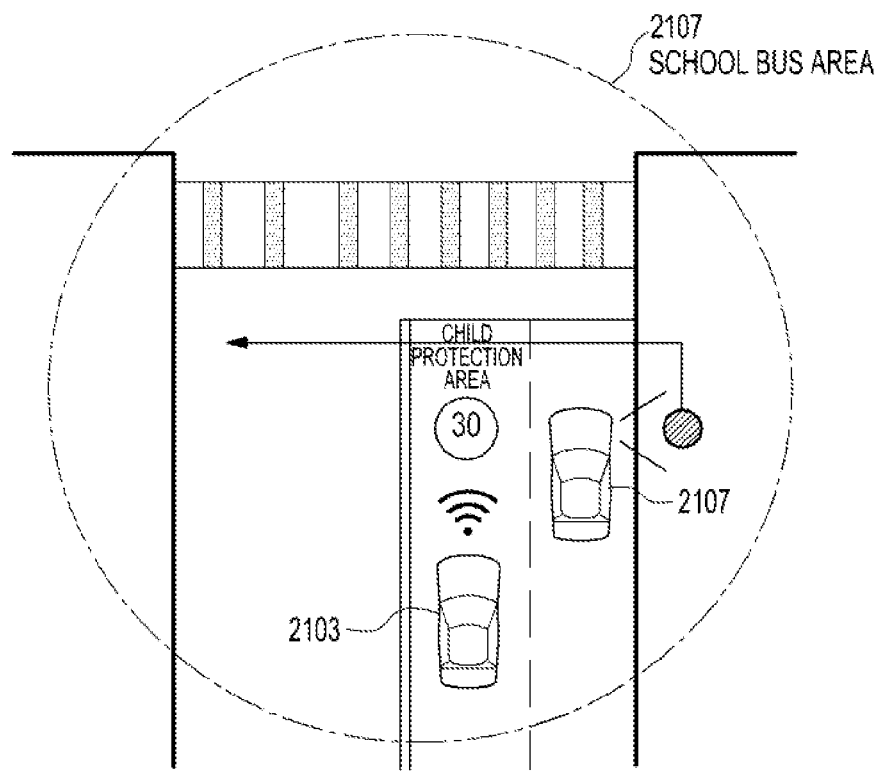
FIGS. 21A and 21B illustrate yet another example of a safety service provided in a V2X communication system according to an embodiment of the present disclosure.
Figure 21B:
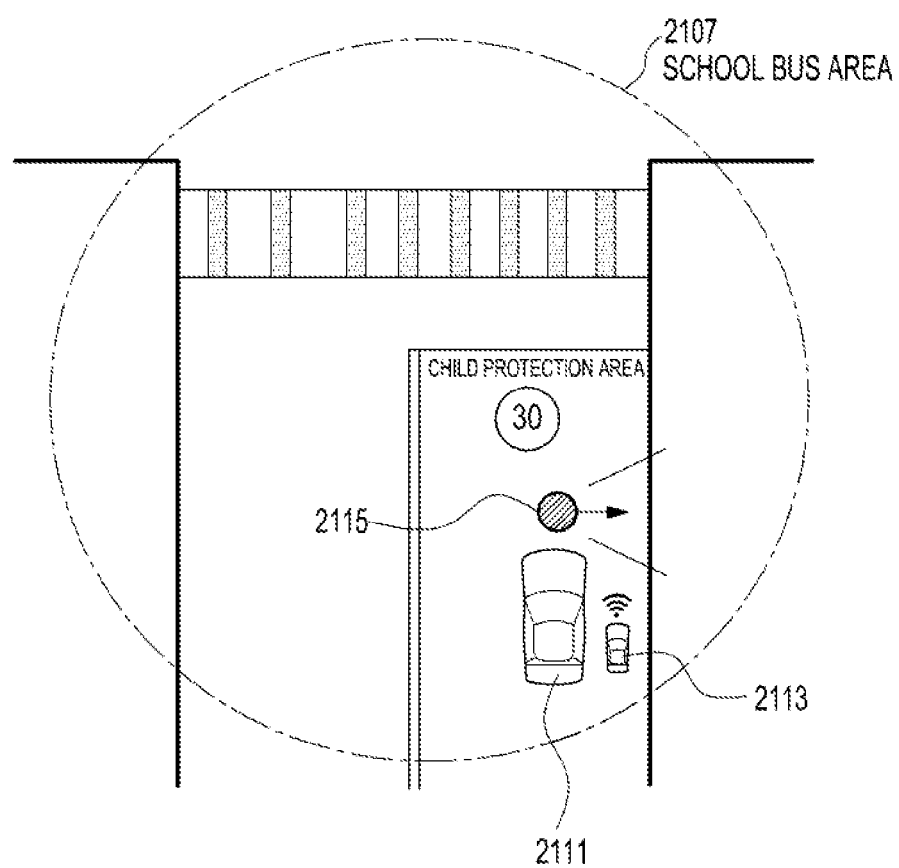

FIGS. 21A and 21B illustrate yet another example of a safety service provided in a V2X communication system according to an embodiment of the present disclosure.

Referring to FIGS. 21A and 21B, it may be noted that a safety service in FIGS. 21A and 21B is a safety service which is provided to a pedestrian located at a school zone.

If a school bus 2101 stops and a vehicle door of the school bus 2101 is opened, a school bus area 2107 is generated and a VT which is located at the school bus 2101 transmits a school bus area message which notifies that a school bus area is generated. The school bus area message is periodically transmitted. The school bus area is transmitted based on a broadcast scheme or a multicast scheme. A pedestrian 2105 gets on or off the stopped school bus 2101. Upon receiving the school bus area, a PT of the pedestrian 2105 runs a V2X vehicle safety service application. It may be assumed that the pedestrian 2105 gets off the school bus 2101 and crosses a road in front of the school bus 2101. Upon receiving the school bus area message transmitted by the VT of the school bus 2101, a VT which is located at a vehicle 2103 transmits a safety area message. The safety area message includes at least one of an identifier of the VT which is located at the vehicle 2103, a speed of the vehicle 2103, and a traveling direction of the vehicle 2103, and is periodically transmitted based on a broadcast scheme or a multicast scheme. The safety area message is transmitted to warn the pedestrian 2105 that the vehicle 2103 is traveling.

Upon receiving the school bus area message, the VT of the pedestrian 2105 may run a V2X vehicle safety service application and transmit a PT message. Otherwise, upon detecting a risk situation after receiving the safety area message, the PT of the pedestrian 205 may transmit a pedestrian warning message. The PT message or the pedestrian warning message includes at least one of an identifier of the PT, a speed of the pedestrian 2105, a location of the pedestrian 2105, or a traveling direction of the pedestrian 2105, and is periodically transmitted based on a broadcast scheme or a multicast scheme.

Upon determining that the risk situation for the pedestrian 2105 occurs, the VT of the vehicle 2103 may transmit a warning message. The determining whether the risk situation for the pedestrian 2105 occurs is performed based on the traveling direction, speed and location of the vehicle 2103. For example, the VT of the vehicle 2103 may determine the risk situation based on information acquired based on the PT message or pedestrian warning message transmitted by the PT of the pedestrian 205 after receiving the PT message or pedestrian warning message.

If the school bus area message is received, warning notification is transferred to a UI of the PT of the vehicle 2103. If the PT message or the pedestrian warning message is received, warning notification is transferred to a UI of each of the VT of the school bus 2101 and the VT of the vehicle 2103. If the safety area message or the warning message is received, warning notification is transferred to a UI of the PT of the pedestrian 2105. In another example, a VT of a vehicle receiving a stop area message may change a transmission cycle for the safety message, a priority, and/or the like.

Referring to FIG. 21B, if a school bus 2111 stops and a vehicle door of the school bus 2111 is opened, a school bus area 2117 is generated and a VT which is located at the school bus 2111 transmits a school bus area message. The school bus area message is periodically transmitted based on a broadcast scheme or a multicast scheme. A pedestrian 2115 gets on or off the stopped school bus 2111. Upon receiving the school bus area message, a PT of the pedestrian 215 runs a V2X vehicle safety service application. A vehicle 2113 travels in a direction where the pedestrian 215 gets on or off the school bus 2111. Upon receiving the school bus area message, a VT which is located at the vehicle 2113 transmits a safety area message. The safety area message includes at least one of an identifier of the VT which is located at the vehicle 2113, a speed of the vehicle 2113, or a traveling direction of the vehicle 2113, and is periodically transmitted based on a broadcast scheme or a multicast scheme. The safety area message is transmitted to warn the pedestrian 2115 that the vehicle 2113 is traveling.

Upon receiving the school bus area message, the VT of the pedestrian 2115 may transmit a PT message while running a V2X vehicle safety service application. Otherwise, upon determining that a risk situation occurs after receiving the safety area message, the PT of the pedestrian 2115 may transmit a pedestrian warning message. The PT message or the pedestrian warning message includes at least one of an identifier of the PT, a speed of the pedestrian 2115, a location of the pedestrian 2115, and a traveling direction of the pedestrian 2115, and is periodically transmitted based on a broadcast scheme or a multicast scheme.

Upon determining that the risk situation for the pedestrian 2115 occurs, the VT of the vehicle 2113 may transmit a warning message. The determining whether the risk situation occurs may be performed based on a traveling direction, speed and location of the vehicle 2113. As an example, the VT located at the vehicle 2113 may determine whether the risk situation occurs based on information acquired based on the PT message or the pedestrian warning message transmitted by the PT of the pedestrian 215 after receiving the PT message or the pedestrian warning message.

If the school bus area message is received, warning notification is transferred to a UI of the VT of the vehicle 2113. If the PT message or the pedestrian warning message is received, warning notification is transferred to a UI of a VT of each of the school bus 2111 and the vehicle 2113. If the safety area message or the warning message is received, warning notification is transferred to a UI of the VT of the pedestrian 2115. In another example, a VT receiving a stop area message may change a transmission cycle for the safety message, a priority, and/or the like.

Yet another example of a safety service provided in a V2X communication system according to an embodiment of the present disclosure has been described with reference to FIGS. 21A and 21B, and yet another example of a process of providing a safety service in a V2X communication system according to an embodiment of the present disclosure will be described with reference to FIG. 22.

Figure 22:
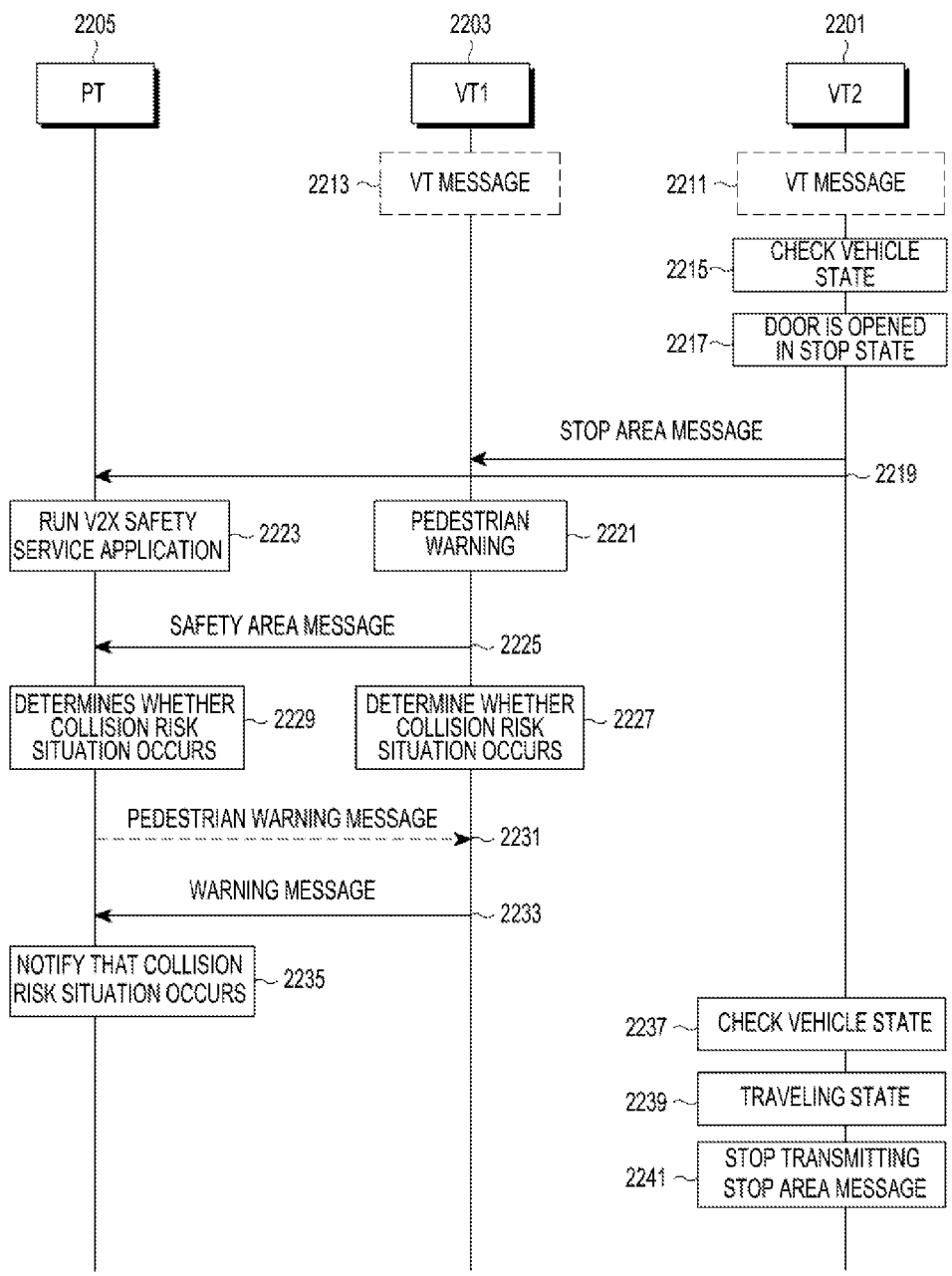
FIG. 22 illustrates yet another example of a process of providing a safety service in a V2X communication system according to an embodiment of the present disclosure.

FIG. 22 illustrates yet another example of a process of providing a safety service in a V2X communication system according to an embodiment of the present disclosure.

Referring to FIG. 22, a VT1 2201 transmits a VT message while a vehicle is traveling at operation 2211. For example, the VT1 2201 may be a VT located at a school bus. Here, a VT message is a message indicating that a vehicle exists, includes at least one of an identifier of the VT, a location of a vehicle at which the VT is located, a traveling direction of the vehicle, and a speed of the vehicle, and is periodically transmitted based on a broadcast scheme or a multicast scheme. In FIG. 22, operation 2211 is optional. The VT 2201 determines whether the vehicle at which the VT is located is stopped and a vehicle door of the vehicle is opened by checking a state of the vehicle at operations 2215 and 2217. If it is determined that the vehicle door is opened while the vehicle is stopped, the VT1 2201 transmits a stop area message at operation 2219. The stop area message includes at least one of the identifier of the VT1 2201, a stop area indicator, a location of the vehicle at which the VT1 2201 is located, and a traveling direction of the vehicle. The stop area indicator is an indicator indicating a stop area. The stop area message is periodically transmitted based on a broadcast scheme or a multicast scheme.

A VT2 2203 transmits a VT message while a vehicle is traveling at operation 2213. Operation 2213 is optional. Upon receiving the stop area message, the VT2 2203 generates pedestrian warning through a UI of the VT2 2203 at operation 2221. The VT2 2203 transmits a safety area message indicating that the vehicle at which the VT2 2203 is located is traveling in the stop area direction at operation 2225. The safety area message includes at least one of an identifier of the VT2 2203, a safety area indicator, and a speed, speed variation, a location, and a traveling direction of the vehicle at which the VT2 2203 is located. The safety area message is periodically transmitted based on a broadcast scheme or a multicast scheme. The VT2 2203 determines whether a collision risk situation occurs at operation 2227. The determining whether the collision risk situation occurs may be performed based on at least one of the traveling direction, the speed, the location, and a driver's state of the vehicle. For example, the VT2 2203 determines that a case where the driver of the vehicle is careless, or a case where the speed of the vehicle is not decreased as the collision risk situation. Upon determining that the collision risk situation occurs, the VT2 2203 transmits a warning message at operation 2233. As another example, the VT2 2203 may determine whether the collision risk situation occurs based on pedestrian information included in a PT message or a pedestrian warning message transmitted by a PT 2205 after receiving the PT message or the pedestrian warning message. The warning message includes at least one of the identifier of the VT2 2203, and the location, the traveling direction, and the speed of the vehicle at which the VT2 2203 is located, and is periodically transmitted based on a broadcast scheme, a multicast scheme, or a unicast scheme. A transmission cycle for the warning message may be shorter than a transmission cycle for the safety area message. While transmitting the warning message, the VT2 2203 generates strengthened warning notification through a UI. Here, strengthened warning notification denotes notification indicating that a risk situation of which a degree or a level is higher than a risk situation indicated by warning notification occurs.

Upon receiving the stop area message transmitted by the VT1 2201, the PT 2205 runs a V2X vehicle safety service application to monitor whether a vehicle warning message is received from a VT which is located at a vehicle traveling around a stop area at operation 2223. As another example, in addition to the operation of monitoring the reception of the vehicle warning message, the PT 2205 receiving the stop area message may start transmitting a PT message. The PT message includes at least one of an identifier of the PT 2205, and a speed, a location, and a moving direction of a pedestrian which has the PT 2205. The PT message is periodically transmitted based on a broadcast scheme or a multicast scheme. The PT 2205 determines whether a collision risk situation occurs upon receiving the safety area message transmitted by the VT2 2203 at operation 2229. Whether the collision risk situation occurs is determined based on at least one of the location, the moving direction, and the speed of the pedestrian, and the location, the traveling direction, and the speed of the VT2 2203. The PT 2205 transmits a pedestrian warning message upon determining that the collision risk situation occurs at operation 2231. The pedestrian warning message includes at least one of the identifier, the speed, the location, and the moving direction of the PT 2205, and is periodically transmitted based on a broadcast scheme, a multicast scheme, or a unicast scheme. The transmission cycle for the pedestrian warning message is set shorter than the PT message. While transmitting the pedestrian warning message, the PT 2205 notifies that a collision risk situation occurs through a UI at operation 2235. The UI may be implemented with various formats such as a message, a sound, vibration, a shock, and/or the like. Upon receiving the warning message transmitted by the VT2 2203, the PT 2205 notifies that a collision risk situation occurs through the UI.

If the vehicle door is closed and the vehicle speed is not zero (0), the VT1 2201 stops transmitting the stop area message at operation 2241. Otherwise, the VT1 2201 may stop transmitting the stop area message after a predetermined time has elapsed while the vehicle door is closed and the vehicle speed is not zero. If the stop area message is not received, the VT2 2203 stops transmitting the safety area message and the warning message. If the stop area message is not received, the PT 2205 stops transmitting the PT message or the pedestrian warning message. As another example, the PT 2205 stops transmitting the pedestrian warning message if the situation of determining whether the collision risk situation occurs is released, that is, if there is no need for performing operation 2229.

Yet another example of a process of providing a safety service in a V2X communication system according to an embodiment of the present disclosure has been described with reference to FIG. 22, and yet another example of a safety service provided in a V2X communication system according to an embodiment of the present disclosure will be described with reference to FIGS. 23A and 23B.

Figure 23A:
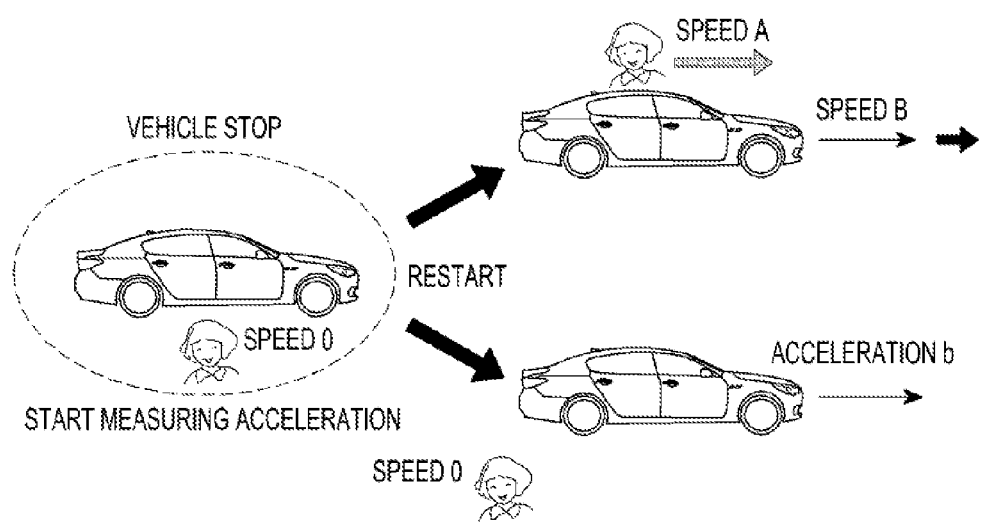
FIGS. 23A and 23B illustrate yet another example of a safety service provided in a V2X communication system according to an embodiment of the present disclosure.
Figure 23B:
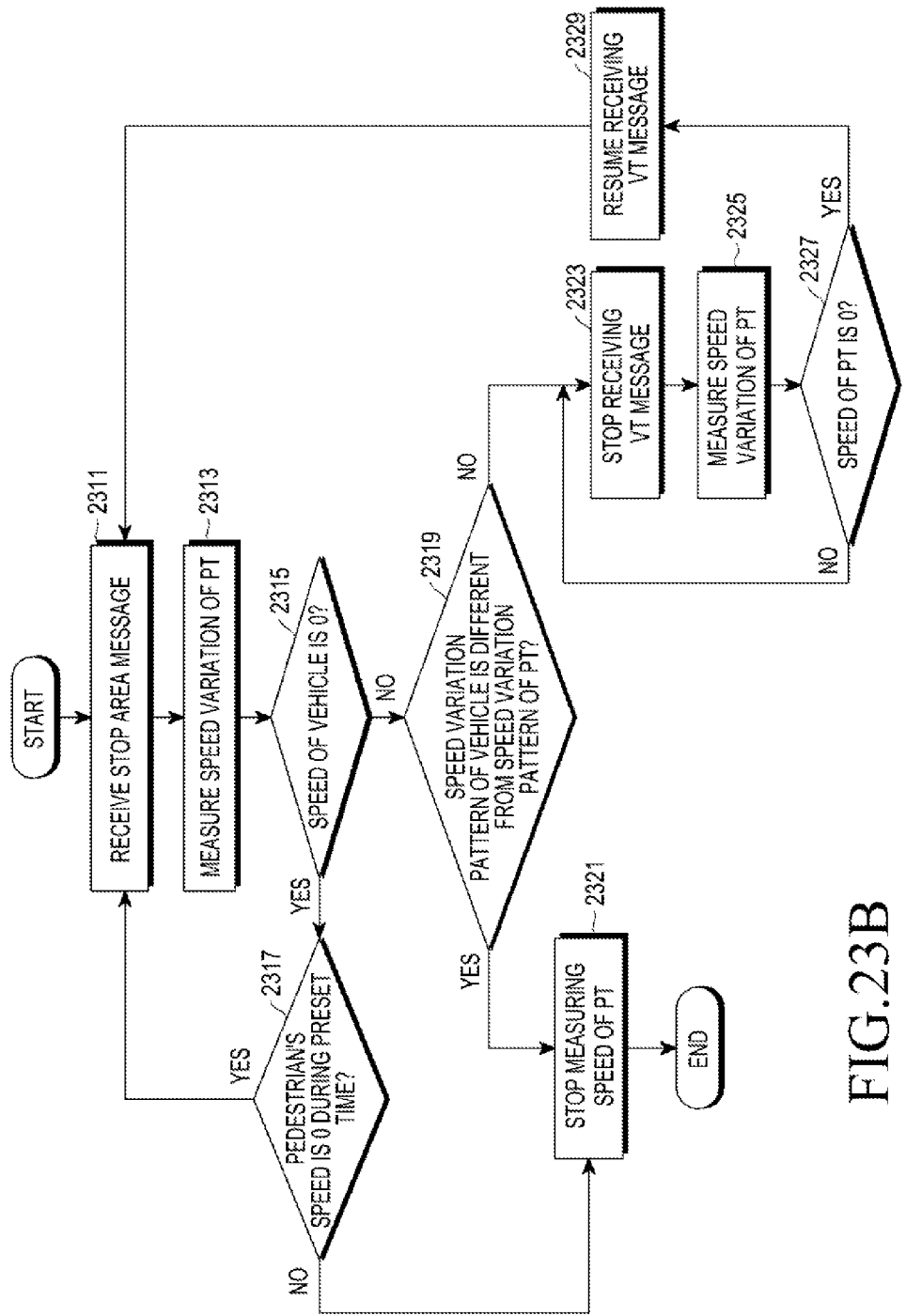

FIGS. 23A and 23B illustrate yet another example of a safety service provided in a V2X communication system according to an embodiment of the present disclosure.

Referring to FIGS. 23A and 23B, it may be noted that a safety service in FIGS. 23A and 23B is a safety service providing message filtering which is based on whether a PT is located inside or outside a vehicle.

The PT may determine whether a location of the PT is the inside or outside of the vehicle, to effectively filter safety messages transmitted by a nearby vehicle, thereby decreasing battery consumption. For example, in FIG. 23A, a speed variation pattern between a VT and a PT is acquired based on an inertial sensor, a GPS module, and/or the like, a safety area message is filtered based on the speed variation pattern, and this will be described below. A VT which is at a stopped vehicle transmits a stop area message, and a PT receiving the stop area message starts monitoring a change in the speed of the VT. There is no change in the speed of the VT which is located at the stopped vehicle. If a pedestrian moves, the speed variation pattern between the PT and the VT changes, so the PT may determine that the PT is outside the vehicle. On the other hand, if the pedestrian is in a stationary state, the speed variation pattern between the PT and the VT does not change, so the PT may determine that the PT is located inside the vehicle or that the PT is stopped outside the vehicle.

Thereafter, if the vehicle restarts, the speed variation pattern between the PT and the VT changes. A message which is periodically transmitted by the PT may include at least one of a current speed measured by the PT, time information, the speed variation pattern, and acceleration. If there is no speed variation of the PT, the PT may determine that the PT is outside a vehicle. On the other hand, if the speed variation of the PT is the same as a speed of the vehicle for preset time, the PT may determine that the PT is inside the vehicle. If the speed variation of the PT is different from the speed variation of the vehicle for the preset time, the PT may determine that the PT is outside the vehicle. In another example, if the speed of the PT arrives at a speed (e.g., 40 km/h) at which the PT may not arrive, the PT may determine that the PT is inside the vehicle.

Upon determining that the PT is inside the vehicle, the PT temporarily disables an operation of a communication module and stops monitoring a speed variation of the VT. However, an operation of the inertial module or the GPS module for measuring the speed of the PT is kept turned on. Thereafter, if the speed of the PT becomes zero back, the PT restarts the operation of the communication module and repeats the above process. A PT which is determined to be inside a vehicle, ignores a safety message received from a nearby VT before until a speed of the PT becomes zero. On the other hand, upon determining that the PT is outside the vehicle, the PT receives the safety area message from the nearby VT and performs an operation according to the safety area message, i.e., a pedestrian protection operation such as an operation of determining that a collision risk situation occurs.

An operation of a PT may be described with reference to FIG. 23B. A VT periodically transmits a vehicle message while moving. The vehicle message includes at least one of an identifier of the VT and speed information. If a vehicle decreases its speed and stops, the VT transmits a stop area message. The PT receives the stop area message, and measures speed variation of the PT. The PT receives a stop area message that is periodically received while measuring an acceleration pattern, and acquires speed variation information, e.g., speed information or a speed variation pattern included the stop area message. The PT compares the speed variation information with the speed variation of the PT. If a speed of the vehicle and a speed of the PT do not change, the PT keeps repeating the process of acquiring the speed information of the vehicle, measuring the speed of the PT, and comparing the speed of the vehicle with the speed of the PT. If the speed of the vehicle does not change and the speed of the PT changes, it is determined that an acceleration pattern of the VT is different from an acceleration pattern of the PT, so the PT determines that the PT is outside the vehicle. So, the PT keeps measuring/comparing the acceleration patterns until a stop message is not received from a nearby VT, and receives a safety message from the nearby VT. Upon receiving a stop area message including information indicating speed variation of a VT after receiving the first stop area message, the PT compares an acceleration of the PT with a value included in the stop area message received, for preset time. The preset time, as one example, may be determined as a value acquired by dividing a length of the vehicle by the typical slow vehicle speed of 30 km/h, and may vary according to a value and a criterion set by a system. If the two speed variation patterns are different for the preset time, the PT determines that the PT is outside the vehicle. On the other hand, if the two speed variation patterns are the same for the preset time, the PT determines that the PT is inside the vehicle, and temporarily stops receiving a vehicle message. The PT keeps measuring the speed variation with a device included in the PT.

Thereafter, if the speed of the PT is not zero, the PT does not keep receiving the vehicle message. On the other hand, if the speed of the PT is zero, the PT restarts the communication module and receives information from the surroundings. The PT repeats the above process once again, if the PT receives a stop area message from a vehicle.

More detailed description for this will be described below.

Firstly, A PT receives a stop area message from a VT at operation 2311. The PT measures speed variation of the PT at operation 2313. The PT determines whether a speed of a vehicle at which the VT is located is zero at operation 2315. If the speed of the vehicle is zero, the PT determines whether a speed of a pedestrian which carries the PT is zero during preset time at operation 2317. If the pedestrian's speed is zero during the preset time, the PT proceeds to operation 2311.

If the speed of the vehicle is not zero, the PT determines whether a speed variation pattern of the vehicle is different from a speed variation pattern of the PT at operation 2319. The speed variation pattern of the vehicle and the speed variation pattern of the PT are measured during preset time. If the speed variation pattern of the vehicle is different from the speed variation pattern of the PT, the PT stops measuring the speed of the PT at operation 2321.

If the speed variation pattern of the vehicle is identical to the speed variation pattern of the PT, the PT stops receiving a VT message at operation 2323. The PT measures speed variation of the PT at operation 2325. The PT determines whether a speed of the VT is zero at operation 2327. If the speed of the VT is not zero, the PT proceeds to operation 2323.

If the speed of the VT is zero, the PT resumes receiving the VT message at operation 2329, and proceeds to operation 2311.

Yet another example of a safety service provided in a V2X communication system according to an embodiment of the present disclosure has been described with reference to FIGS. 23A and 23B, and yet another example of a safety service provided in a V2X communication system according to an embodiment of the present disclosure will be described with reference to FIGS. 24A and 24B.

Figure 24A:
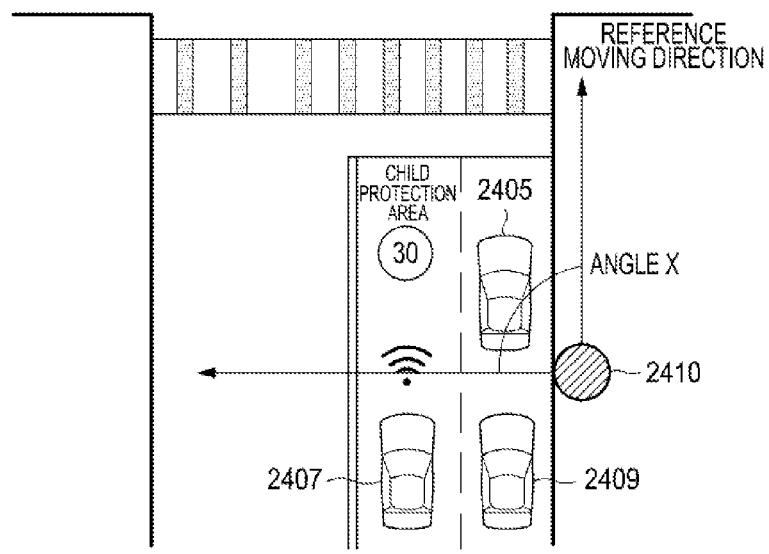
FIGS. 24A and 24B illustrate yet another example of a safety service provided in a V2X communication system according to an embodiment of the present disclosure.
Figure 24B:
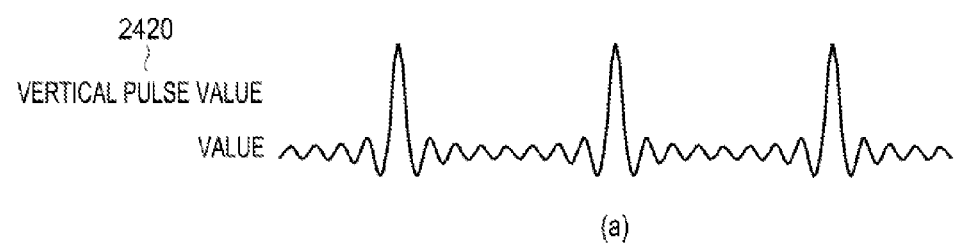
Figure 24B:
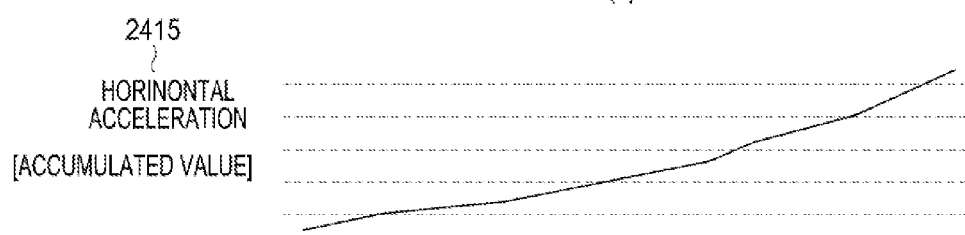

FIGS. 24A and 24B illustrate yet another example of a safety service provided in a V2X communication system according to an embodiment of the present disclosure.

Referring to FIGS. 24A and 24B, it may be assumed that a safety service in FIGS. 24A and 24B is a safety service provided in an environment that boundaries between sidewalks and driveways are identified. Firstly, boundaries between sidewalks and driveways are clearly identified, and a plurality of vehicles 2405, 2407, and 2409 is traveling. Further, vehicles may be stopped on the road.

A VT may acquire road map information in real time through a server, pre-download, or a cloud server. Further, the VT may determine information about a moving direction by mapping location information of the VT to the road map information through a GPS module, and/or the like. Further, the VT may identify sidewalks and driveways by distinguishing lanes and curbs with a vision device such as a stereo camera, and/or the like.

The VT periodically transmits a safety area (e.g., child protection area) message while a vehicle is traveling. The safety area message includes at least one of an identifier of the VT, a speed, and a vehicle traveling direction, and is periodically transmitted based on a broadcast scheme or a multicast scheme. The safety area message is transmitted to warn a pedestrian that the vehicle is traveling.

A PT 2410 may acquire road map information in real time through a server, pre-download, or a cloud server. Further, the PT 2410 may determine a location of the PT 2410 by mapping location information of the PT 2410 to the road map information through a GPS module, and/or the like. The PT 2410 may measure an azimuth using a geomagnetic sensor, and may determine and cope with variation in a pedestrian's movement since an inertial sensor is mounted therein. So, the PT 2410 may determine the pedestrian's moving orientation and speed.

For example, the PT 2410 triggers an operation for providing a safety service if an angle, i.e., an angle X, between the moving direction of the PT 2410 and a driveway is tilted to the driveway by an angle greater than or equal to a preset angle. For example, the PT 2410 acquires a pedestrian's step based on a vertical pulse value 2420, and collects X-accel variation (e.g., horizontal acceleration) 2415 for the angle X during a preset steps. If an absolute value of the X-accel is greater than or equal to a preset threshold, the PT 2410 determines that the pedestrian turns a direction and quickly moves, and may generate a warning alarm if the direction is a direction towards the driveway.

Yet another example of a safety service provided in a V2X communication system according to an embodiment of the present disclosure has been described with reference to FIGS. 24A and 24B, and another example of an operating process of a PT in a V2X communication system according to an embodiment of the present disclosure will be described with reference to FIG. 25.

Figure 25:
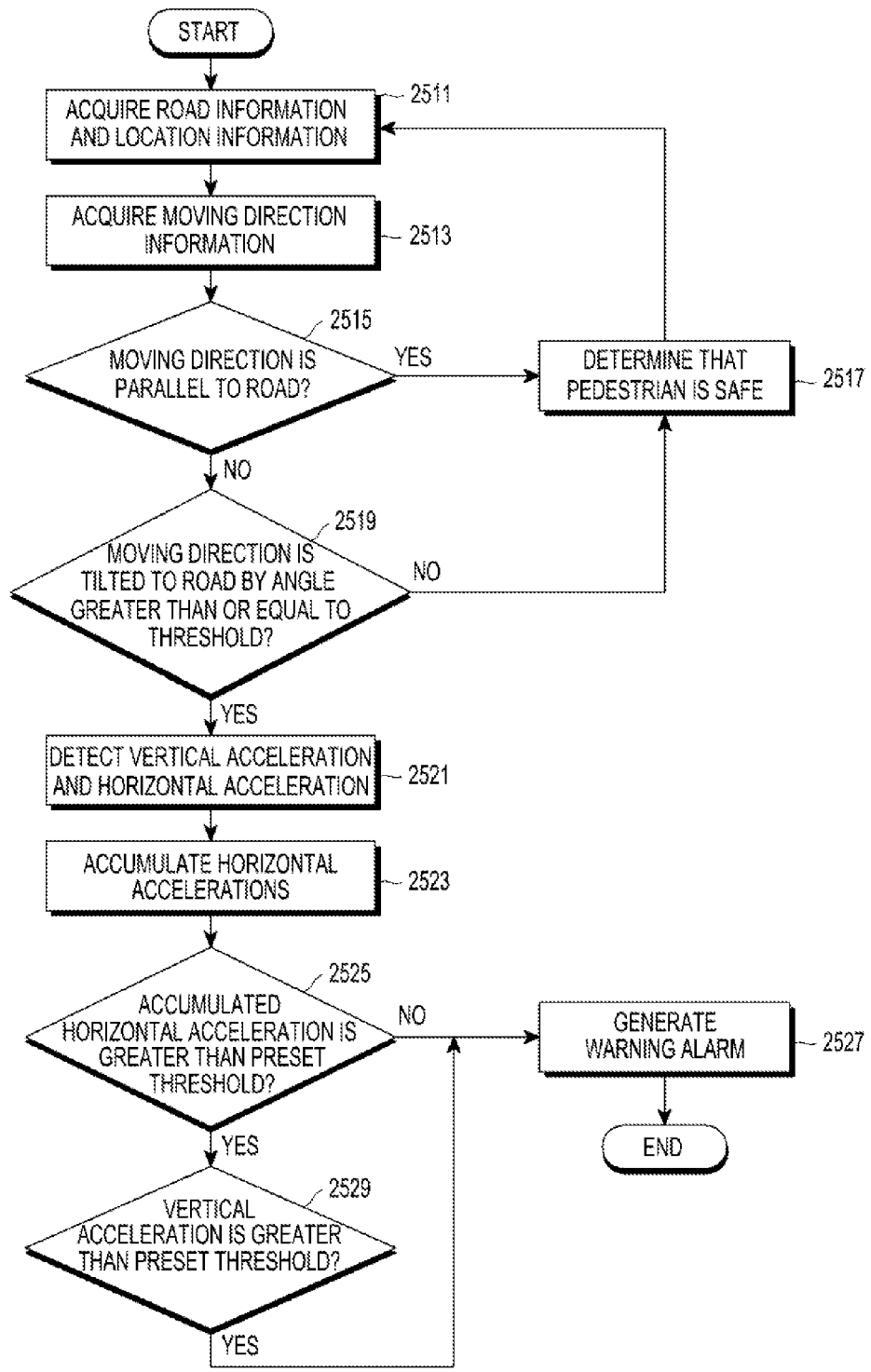
FIG. 25 illustrates another example of an operating process of a PT in a V2X communication system according to an embodiment of the present disclosure.

FIG. 25 illustrates another example of an operating process of a PT in a V2X communication system according to an embodiment of the present disclosure.

Referring to FIG. 25, it may be noted that an operating process of a PT in FIG. 25 is a process of determining whether a risk situation occurs based on a moving direction of the PT.

The PT may determine whether there is a risk in the moving direction of the PT using known road information, compass information, inertial sensor information, and/or the like. It may be assumed that the PT detects that a walkway at which the PT is located is a road leading from the south to the north using the road information. The PT may determine that a pedestrian is safe using the compass information if the PT moves from south to north, or from the north to the south. As another example, in a case where the PT moves from east to west, or from the west to the east, it may be determined through the map information that the moving direction of the PT is dangerous because the pedestrian is highly likely to cross the driveway through the sidewalk. At this time, a criterion for determining whether the moving direction of the PT is dangerous may vary depending on a walking rule, e.g., walking on the right side.

It may be assumed that the walking rule is walking on the right side, and the PT is moving on the right-side sidewalk from the south to the north. In this case, a geomagnetic sensor included in the PT senses that the PT moves from the south to the north, and a vertical acceleration sensor among inertial sensors included in the PT senses speed of pedestrian's steps by sensing vertical movements and shocks, which occur according to the pedestrian's steps. The PT may determine an increment in the speed compared with the number of steps by accumulating sensing values of a horizontal acceleration sensor among the inertial sensors.

If a pedestrian has turned his/her body in the road direction, i.e., the west, a gyro sensor among the inertial sensors senses the pedestrian's turning and a geomagnetic sensor senses the north-to-west turning. Upon detecting that a moving direction of the PT is changed to a road direction according to the pedestrian's turning, the PT compares a sensing value of a vertical acceleration sensor with a sensing value of a horizontal acceleration sensor, calculates an absolute value of accumulated sensing value of the horizontal acceleration sensor measured during a preset number of steps, and determines whether the absolute value is equal to or greater than a preset threshold. If the absolute value is equal to or greater than the preset threshold, the PT determines that the moving direction of the PT is dangerous. In other words, the PT determines that a risk situation occurs if the pedestrian approaches the road at a high speed.

Further, a PT runs a V2X vehicle safety service application upon receiving a safety area message, and generates risk warning notifying that a risk situation occurs, i.e., that there is a possibility that the risk situation occurs through a UI based on a risk determining method proposed in an embodiment of the present disclosure. The UI may be implemented with various formations such as a message, a sound, vibration, a shock, and/or the like. The PT may output a sound or a pedestrian warning message thereby the pedestrian may know that the risk situation occurs. The PT may notify the risk situation for the PT by transmitting a PT message or a pedestrian warning message. The PT message or the pedestrian warning message includes at least one of an identifier of a PT, and a speed, a location, and a moving direction of the PT, and is periodically transmitted based on a broadcast scheme or a multicast scheme. After receiving the PT message or the pedestrian warning message, a VT generates warning notification through a UI.

A PT acquires road information and location information at operation 2511. The PT acquires moving direction information of the PT at operation 2513. The PT determines whether the moving direction of the PT is parallel to a road at operation 2515. If the moving direction of the PT is parallel to the road, the PT determines that a pedestrian is safe at operation 2517, and proceeds to operation 2511.

If the moving direction of the PT is not parallel to the road, the PT determines whether the moving direction of the PT is tilted to the road by an angle greater than or equal to a threshold at operation 2519. If the moving direction of the PT is not tilted to the road by the angle greater than or equal to the threshold, the PT proceeds to operation 2517.

If the moving direction of the PT is tilted to the road by the angle greater than or equal to the threshold, the PT detects a vertical acceleration and a horizontal acceleration at operation 2521. The PT accumulates horizontal accelerations during a preset number of steps at operation 2523. The PT determines whether the accumulated horizontal acceleration is greater than a preset threshold at operation 2525. If the accumulated horizontal acceleration is greater than the preset threshold, the PT generates a warning alarm through a UI at operation 2527.

If the accumulated horizontal acceleration is not greater than the preset threshold, the PT determines whether the vertical acceleration is greater than a preset threshold at operation 2529. If the vertical acceleration is greater than the preset threshold, the PT proceeds to at operation 2527. If the vertical acceleration is not greater than the preset threshold, the PT proceeds to at operation 2521.

Another example of an operating process of a PT in a V2X communication system according to an embodiment of the present disclosure has been described with reference to FIG. 25, and yet another example of a safety service provided in a V2X communication system according to an embodiment of the present disclosure will be described with reference to FIGS. 26A and 26B.

Figure 26A:
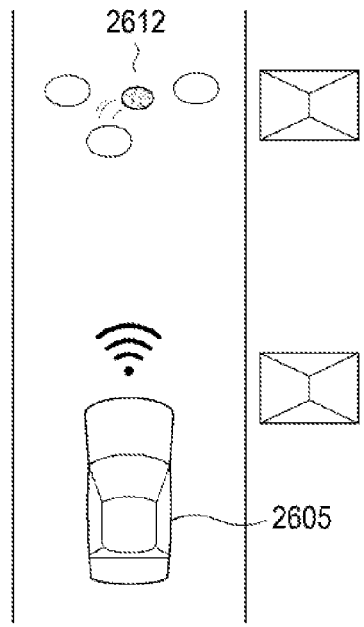
FIGS. 26A and 26B illustrate yet another example of a safety service provided in a V2X communication system according to an embodiment of the present disclosure.
Figure 26B:
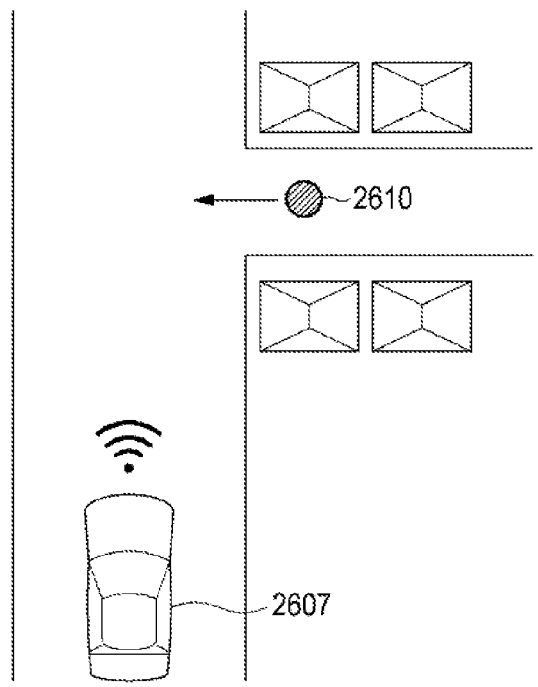

FIGS. 26A and 26B illustrate yet another example of a safety service provided in a V2X communication system according to an embodiment of the present disclosure.

Referring to FIGS. 26A and 26B, it may be noted that a safety service in FIGS. 26A and 26B is a safety service provided in an environment where there is no distinction between sidewalks and driveways.

Firstly, a boundary between a sidewalk and a driveway is uncertain, and a vehicle 2607 and a pedestrian 2610 are moving. As shown in FIG. 26B, there may exist, from place to place, an intersection where a road meets another road, like a specific road, e.g., an alleyway, and a building like a house may be located around the road, so blind spots are highly likely to exist in the intersection.

Further, a vehicle 2605 and a pedestrian 2612 may exist on the same road as shown in FIG. 26A, so there is a risk of accident.

A VT (e.g., 2605 or 2607) may acquire road map information in real time through a server, pre-download, or a cloud server. Further, the VT may acquire information of a moving direction by mapping location information of the VT to the road map information through a GPS module, and/or the like included in the VT. Alternatively, the VT may measure a distance between the VT and an object based on a vision device such as a stereo camera included in the VT, and/or the like.

The VT periodically transmits a safety area message while a vehicle is traveling. The safety area message includes at least one of an identifier of the VT, and a speed and a moving direction of the VT, and is periodically transmitted based on a broadcast scheme or a multicast scheme. The safety area message is transmitted to warn a PT (e.g., 2610 or 2612) that the vehicle is traveling.

The PT may acquire road map information in real time through a server, pre-download, or a cloud server. Further, the PT may acquire a location of the PT by mapping location information of the PT to the road map information through a GPS module included in the PT, and/or the like. Further, the PT may acquire azimuth information using a geomagnetic sensor, and may acquire a movement and speed variation of the PT based on an inertial sensor. So, the PT may determine the pedestrian's moving orientation and speed.

The PT runs a V2X vehicle safety service application upon receiving a safety area message from a VT, and detects a location, a moving direction, and a speed of the PT. As shown in FIG. 26A, based on the safety area message, the PT determines that a risk situation occurs if a moving direction of the VT is the same as the PT, and a speed of a vehicle is greater than a preset speed or speed variation of the vehicle does not converge to zero. Further, as shown in FIG. 26B, based on the safety area message and the map information, the PT determines a possibility that the pedestrian intersects with the vehicle at an intersection where a road that the vehicle travels intersects with a road that the pedestrian walks, calculates a possibility that the vehicle and the pedestrian collide by comparing a speed of the vehicle and a speed of the PT, and determines whether a risk situation occurs based on the possibility of collision.

Upon determining that a risk situation occurs based on a risk determination method proposed in an embodiment of the present disclosure, the PT generates a vehicle collision risk warning alarm through a UI. The vehicle collision risk warning alarm is an alarm warning that there is a vehicle collision risk. The UI may be implemented with a message, a sound, vibration, a shock, and/or the like. The PT may output a sound and a pedestrian warning message to warn the pedestrian that that there is a vehicle collision risk. The PT transmits a PT message or a pedestrian warning message. The PT message or the pedestrian warning message includes at least one of an identifier of a PT, a pedestrian's speed, a pedestrian's location, and a pedestrian's moving direction, and is periodically transmitted based on a broadcast scheme or a multicast scheme. Upon receiving the PT message or the pedestrian warning message, a VT may generate a warning alarm through a UI.

Yet another example of a safety service provided in a V2X communication system according to an embodiment of the present disclosure has been described with reference to FIGS. 26A and 26B, and yet another example of a safety service provided in a V2X communication system according to an embodiment of the present disclosure will be described with reference to FIG. 27.

Figure 27:
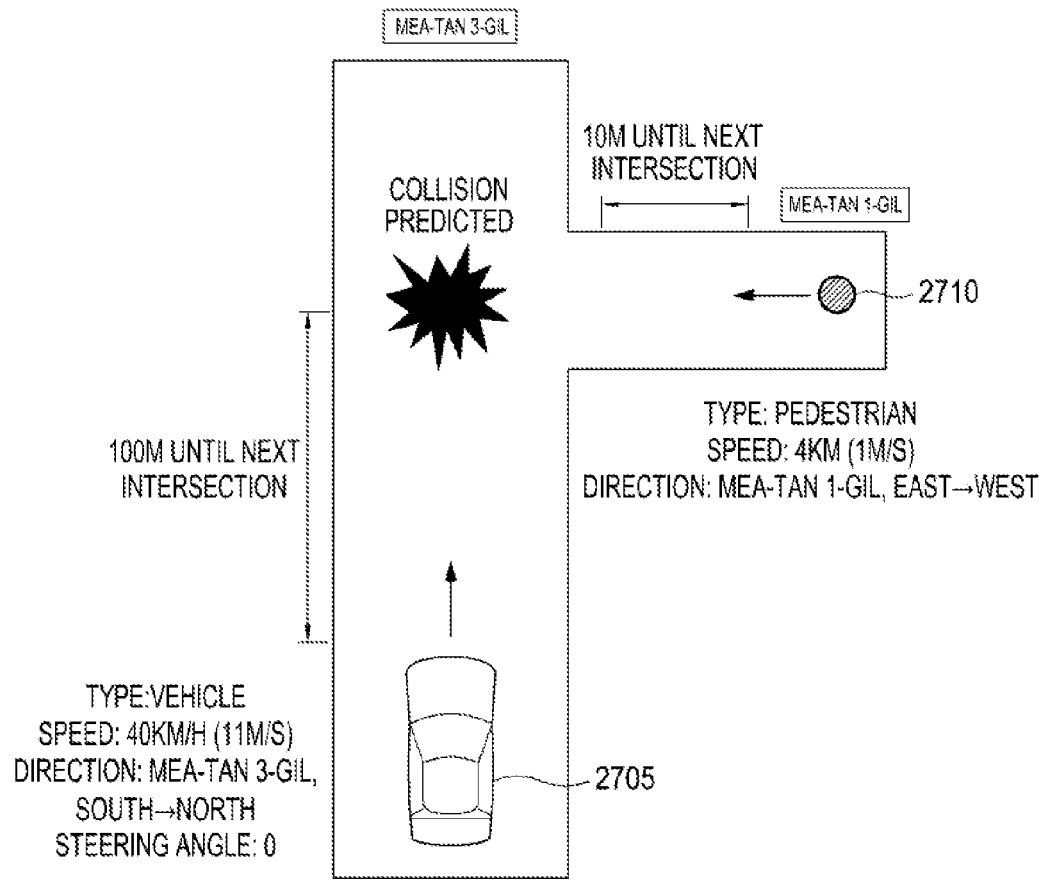
FIG. 27 illustrates yet another example of a safety service provided in a V2X communication system according to an embodiment of the present disclosure.

FIG. 27 illustrates yet another example of a safety service provided in a V2X communication system according to an embodiment of the present disclosure.

Referring to FIG. 27, a safety service in FIG. 27 is a safety service provided in an environment where there is no distinction between sidewalks and driveways, and predicts a collision between a vehicle 2705 and a pedestrian 2710.

Referring to FIG. 27, a VT (e.g., 2705) periodically transmits a VT message while a vehicle is traveling. The VT message includes at least one of an identifier of a VT, a location of a vehicle, a traveling direction (or, information about a road where the vehicle is traveling) of the vehicle, a speed of the vehicle, and steering information. The VT message is periodically transmitted based on a broadcast scheme or a multicast scheme. As one example, the identifier of the vehicle may be a predetermined unique identifier, or an identifier temporarily allocated by a central network. The location and traveling direction of the vehicle are mapped to a name (e.g., Mea-tan 1-gil) of the road where the vehicle is now traveling based on a GPS module and map information. Further, the location information of the vehicle may be absolute coordinates, or a remaining distance up to the next intersection, which is detected based on the map information. The speed of the vehicle may include a speed or speed variation at the measurement time.

Upon receiving the safety area message transmitted by the VT, a PT (e.g., 2710) monitors whether a risk situation occurs by running a V2X vehicle safety service application. Further, in addition to the operation of monitoring whether the vehicle warning message is received, the PT starts transmitting a PT message after the safety area message. The PT message includes at least one of an identifier of a PT, a speed of the PT, a pedestrian's location, or a pedestrian's moving direction. The PT message is periodically transmitted based on a broadcast scheme or a multicast scheme.

The PT determines whether there is a collision risk between the PT and the VT upon receiving the safety area message transmitted by the VT. The determining whether there is the collision risk between the PT and the VT is performed based on at least one of the pedestrian's location, the pedestrian's moving direction, a pedestrian's speed, a location of the VT, a moving direction of the VT, and a speed of the VT. For example, in a case that a road whether a vehicle is traveling, e.g., Mea-tan 3-gil intersects with a road where a pedestrian is moving, e.g., Mea-tan 1-gil at the next intersection based on map information, the PT determines that a vehicle may meet a pedestrian based on the location information and the moving direction information of the vehicle included in the safety area message. Further, the PT calculates time required for the vehicle to approach an intersection where the vehicle and the pedestrian may meet, i.e., the next intersection based on a remaining distance up to the next intersection and the speed information. The PT calculates time required for the pedestrian to approach the next intersection using the pedestrian's speed and location. If a difference between the time required for the vehicle to approach the next intersection and the time required for the pedestrian to approach the next intersection is less than preset time, the PT determines that the vehicle and the pedestrian may arrive at around the intersection at the similar time. So, the PT determines that a risk situation for the pedestrian occurs, and generates vehicle collision risk warning through a UI. The PT transmits a pedestrian warning message upon determining the risk situation for the pedestrian occurs. On the other hand, if the traveling direction of the vehicle does not intersect with the pedestrian's moving direction in the intersection, the PT determines that the risk situation does not occur, so the PT does not perform the above operation.

The VT also determines whether the collision risk for the pedestrian. The determining whether the collision risk occurs is determined based on at least one of a traveling direction of a vehicle, a speed of the vehicle, a location of the vehicle, and a vehicle driver's state. For example, in a case that a road where a vehicle is traveling, e.g., Mea-tan 3-gil intersects with a road where a pedestrian is moving, e.g., Mea-tan 11-gil in the next intersection based on map information, the VT determines that the vehicle may meet the pedestrian in the next intersection, based on the pedestrian's location and moving information included in the pedestrian message. Further, the VT calculates time required for the vehicle to approach an intersection where the vehicle may intersect with the pedestrian, i.e., the next intersection based on the remaining distance up to the next intersection and the speed information. The VT calculates time required for the pedestrian to approach the intersection based on the pedestrian's speed and location. If a difference between the time required for the vehicle to approach the next intersection and the time required for the pedestrian to approach the next intersection is less than preset time, the VT determines that the vehicle and the pedestrian may arrive at around the intersection at the similar time. So, the VT generates a vehicle collision risk warning through a UI. On the other hand, if the traveling direction of the vehicle does not intersect with the pedestrian's moving direction in the intersection, the VT determines that the risk situation does not occur, so the VT does not perform the above operation.

Yet another example of a safety service provided in a V2X communication system according to an embodiment of the present disclosure has been described with reference to FIG. 27, and yet another example of a safety service provided in a V2X communication system according to an embodiment of the present disclosure will be described with reference to FIG. 28.

Figure 28:
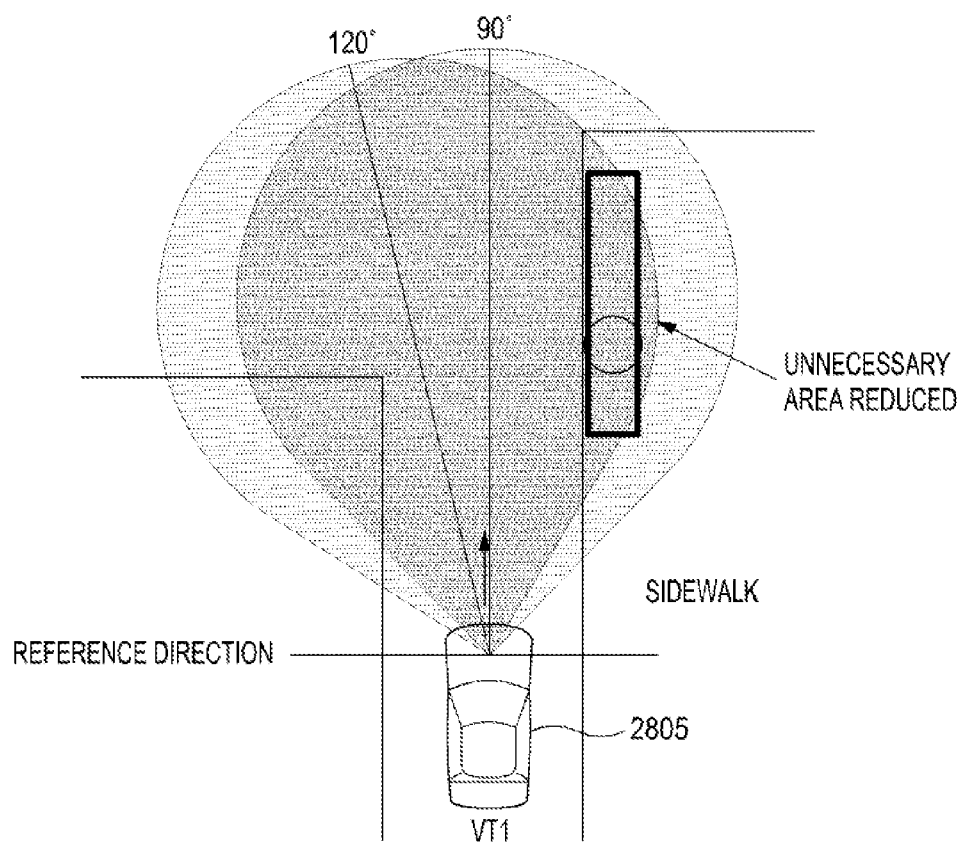
FIG. 28 illustrates yet another example of a safety service provided in a V2X communication system according to an embodiment of the present disclosure.

FIG. 28 illustrates yet another example of a safety service provided in a V2X communication system according to an embodiment of the present disclosure.

Referring to FIG. 28, it may be noted that a safety service in FIG. 28 is a safety service that low-power filtering may be implemented by adjusting a transmission beam of a VT 2805.

As described in FIG. 21A, which is located at a school bus 2101, i.e., a VT1 transmits a school bus area message, and a VT which is located at a vehicle 203, i.e., a VT2 transmits a safety area message upon receiving the school bus area message transmitted by the VT1. At this time, the safety area message is transmitted to warn a pedestrian 2105 that the vehicle 2103 is traveling. However, for a pedestrian walking a sidewalk without boarding the school bus 2101, since the vehicle 2103 passes by the pedestrian even though the vehicle 2103 is near the pedestrian, a PT of the pedestrian does not need to response to the safe area message transmitted by the VT2. In particular, if the vehicle 2103 travels on an edge of a road, this issue may occur. So, an embodiment of the present disclosure proposes a scheme of adjusting a direction of a beam which is applied to a safety area message depending on a location of the vehicle, e.g., a driving lane.

A beam adjustment method proposed in an embodiment of the present disclosure is a method for adjusting a beam direction according to a location of a vehicle in order to prevent a pedestrian walking a sidewalk from receiving a safety area message. Based on the beam adjustment method proposed in an embodiment of the present disclosure, power consumption required for a PT to receive unnecessary safety area message may be decreased. For example, in FIG. 28, a beam 1 represents a transmission beam in a case where a transmission direction for the safety area message transmitted by a VT is 90 degree from a reference direction, and a beam 2 represents a transmission beam in a case where a transmission direction of the safety area message transmitted by the VT is 120 degree from the reference direction. In FIG. 28, as to the impacts on the sidewalk, which is caused by the beam 1 and the beam 2, it can be known that an area overlapped with the sidewalk among a transmission area of the beam 2 is less than an area overlapped with the sidewalk among a transmission area of the beam 1. Therefore, a vehicle traveling on an edge of a road forms a beam towards a driveway not the sidewalk, to prevent a PT of a pedestrian walking on the sidewalk from receiving the unnecessary messages. In addition, a vehicle traveling in an inner side of a road, e.g., lane 1 sets a direction of a beam to a direction towards a driveway. This is to prevent a pedestrian walking on the opposite sidewalk from receiving a safety area message transmitted by the vehicle.

Yet another example of a safety service provided in a V2X communication system according to an embodiment of the present disclosure has been described with reference to FIG. 28, and yet another example of a safety service provided in a V2X communication system according to an embodiment of the present disclosure will be described with reference to FIG. 29.

Figure 29:
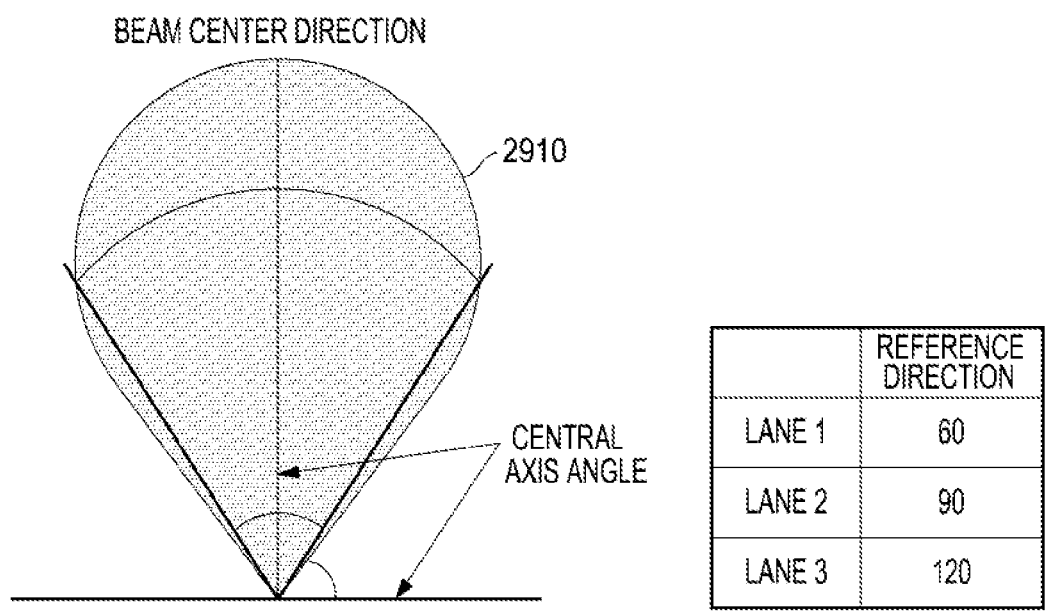
FIG. 29 illustrates yet another example of a safety service provided in a V2X communication system according to an embodiment of the present disclosure.

FIG. 29 illustrates yet another example of a safety service provided in a V2X communication system according to an embodiment of the present disclosure.

Referring to FIG. 29, it may be noted that a safety service in FIG. 29 is a safety service that a transmission beam 2910 is differently set per lane.

Measurement for a reference direction may be performed based on various devices such as a GPS module, a gyro sensor, a compass, and/or the like. A VT sets a reference direction based on the measured direction. In FIG. 29, it may be assumed that a reference direction is a direction perpendicular to a traveling direction of a vehicle. In FIG. 29, a central axis angle denotes an angle between the reference direction and a beam center direction of the vehicle. If the central axis angle is 90 degree, it means that the beam center direction is perpendicular to the reference direction, and it may be known that the beam center direction is in parallel to the traveling direction of the vehicle. If the central axis angle is 60 degree, it means that the beam center direction of the VT is tilted to the right compared with the traveling direction of the vehicle, and if the central axis angle is 120☐, it means that the beam center direction of the VT is tilted to the left compared with the traveling direction of the vehicle. The table in FIG. 29 represents central axis angles of a transmission beams according to traveling lanes of a vehicle. Therefore, in an embodiment of the present disclosure, a lane in which a vehicle is traveling is detected, and a central axis angle of a transmission beam for each lane is adjusted thereby preventing a PT from receiving unnecessary messages.

Yet another example of a safety service provided in a V2X communication system according to an embodiment of the present disclosure has been described with reference to FIG. 29, and another example of an operating process of a VT in a V2X communication system according to an embodiment of the present disclosure will be described with reference to FIG. 30.

Figure 30:
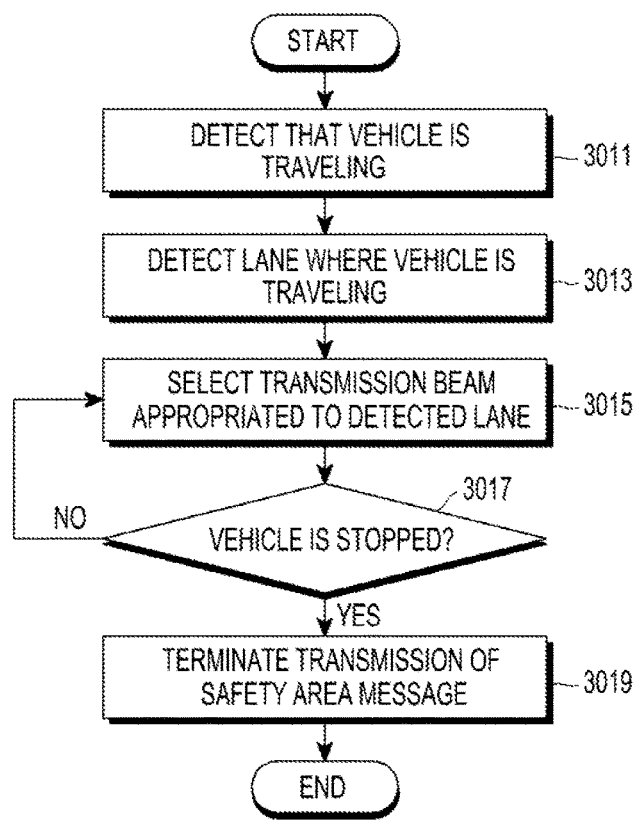
FIG. 30 illustrates another example of an operating process of a VT in a V2X communication system according to an embodiment of the present disclosure.

FIG. 30 illustrates another example of an operating process of a VT in a V2X communication system according to an embodiment of the present disclosure.

Referring to FIG. 30, it may be noted that an operating process in FIG. 30 is a process of selecting a transmission beam based on a location of a vehicle. For example, the location of the vehicle may be a lane. Firstly, a VT detects that a vehicle is traveling at operation 3011. The VT detects that a lane where the vehicle is traveling at operation 3013. The VT may detect the lane where the vehicle is currently traveling using various devices such as a sensor, a camera, and/or the like. The VT selects a transmission beam appropriate to the detected lane, and transmits a safety area message using the selected transmission beam at operation 3015. For example, if the lane where the vehicle is traveling is a lane 1, the VT transmits the safety area message using a transmission beam 1 as a transmission beam of a beam angle 1. If the lane where the vehicle is traveling is a lane 2, the VT transmits the safety area message using a transmission beam 2 as a transmission beam of a beam angle 2. In this way, if the lane where the vehicle is traveling is a lane n as the last lane, the VT transmits the safety area message using a transmission beam n as a transmission beam of a beam angle n. The VT determines whether the vehicle stops while transmitting the safety area message at operation 3017. If the vehicle does not stop, the VT proceeds to operation 3013. If the vehicle stops, the VT terminates the transmission of the safety area message at operation 3019.

Another example of an operating process of a VT in a V2X communication system according to an embodiment of the present disclosure has been described with reference to FIG. 30, and yet another example of a safety service provided in a V2X communication system according to an embodiment of the present disclosure may be described with reference to FIG. 31.

Figure 31:
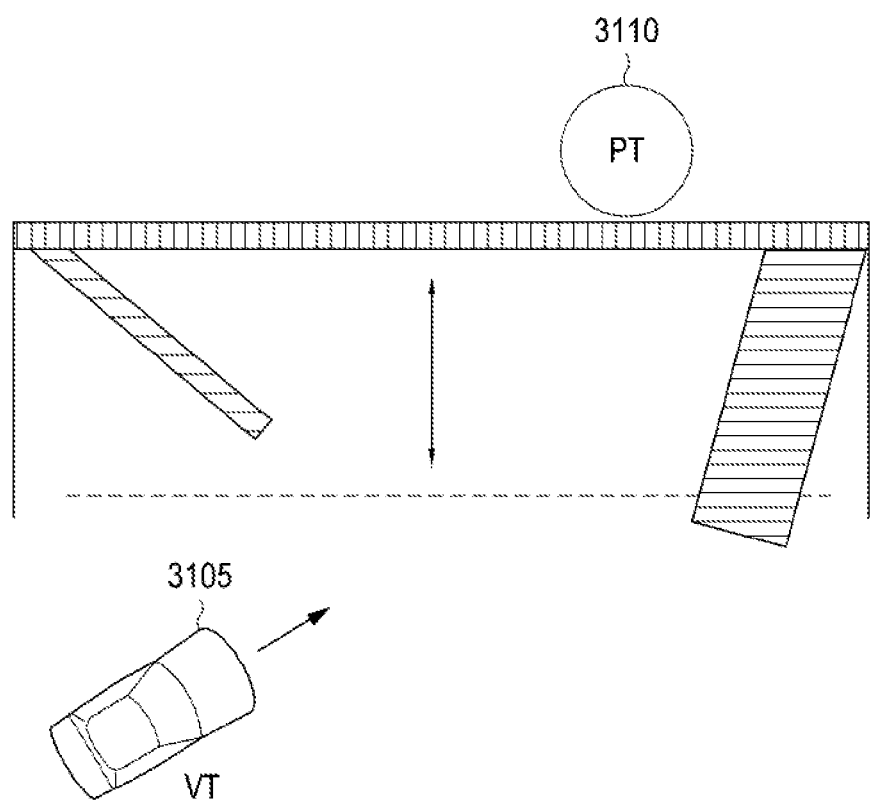
FIG. 31 illustrates yet another example of a safety service provided in a V2X communication system according to an embodiment of the present disclosure.

FIG. 31 illustrates yet another example of a safety service provided in a V2X communication system according to an embodiment of the present disclosure.

Referring to FIG. 31, it may be noted that a safety service in FIG. 31 is a safety service that low-power filtering may be implemented by adjusting a transmission beam of a VT 3105 in a case that there is an altitude difference between a pedestrian's location and a location of a vehicle. In FIG. 31, it may be assumed that a case that there is the altitude difference between the pedestrian's location and the location of the vehicle is a case that a pedestrian passes over an overpass and a vehicle passes under the overpass, or a case that the vehicle enters through the high-level road.

As an example, in a case that a pedestrian passes over the overpass, since a vehicle does not operate as a risk for the pedestrian, a PT 3110 of the pedestrian requires a method that needs to selectively receive VT messages, i.e., a method that needs to filter the VT messages.

In an embodiment of the present disclosure, a VT 3105 detects a reference altitude of a vehicle, and transmits a VT message including the reference altitude, and a PT 3110 compares the reference altitude included in the VT message with a pedestrian's reference altitude to detect an amplitude difference h, and determines that the pedestrian is at an amplitude different from an amplitude of the vehicle, for example, that the pedestrian is over the overpass, based on the amplitude difference h thereby filtering VT messages.

Yet another example of a safety service provided in a V2X communication system according to an embodiment of the present disclosure has been described with reference to FIG. 31, and yet another example of an operating process of a VT in a V2X communication system according to an embodiment of the present disclosure will be described with reference to FIG. 32.

Figure 32:
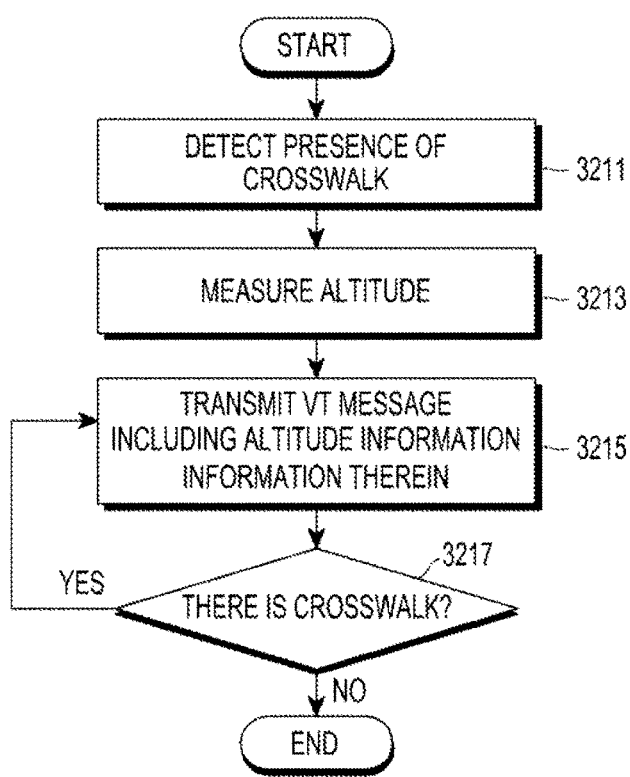
FIG. 32 illustrates yet another example of an operating process of a VT in a V2X communication system according to an embodiment of the present disclosure.

FIG. 32 illustrates yet another example of an operating process of a VT in a V2X communication system according to an embodiment of the present disclosure.

Referring to FIG. 32, it may be noted that an operating process of a VT in FIG. 32 is an operating process of a VT in a case that low-power filtering may be implemented by adjusting a transmission beam of a VT if there is an altitude difference between a pedestrian's location and a location of a vehicle.

A VT detects presence of an overpass in front of a vehicle through an image processing device existing inside or outside the vehicle, or detects the presence of the overpass based on map information and GPS information stored in the VT.

Since the VT detects that the overpass exists, so the VT measures an altitude of the vehicle using an altitude measurement device, e.g., a barometer, a GPS module, and/or the like mounted inside or outside the vehicle at operation 3213.

The VT transmits a VT message including altitude information indicating the measured altitude at operation 3215.

The VT determines whether there is an overpass at operation 3217. Here, the VT may determine whether there is the overpass based on an image processing device, or map information and GPS information. If there is no overpass, the VT terminates the transmission of the VT message including the altitude information.

Yet another example of an operating process of a VT in a V2X communication system according to an embodiment of the present disclosure has been described with reference to FIG. 32, and yet another example of an operating process of a PT in a V2X communication system according to an embodiment of the present disclosure will be described with reference to FIG. 33.

Figure 33:
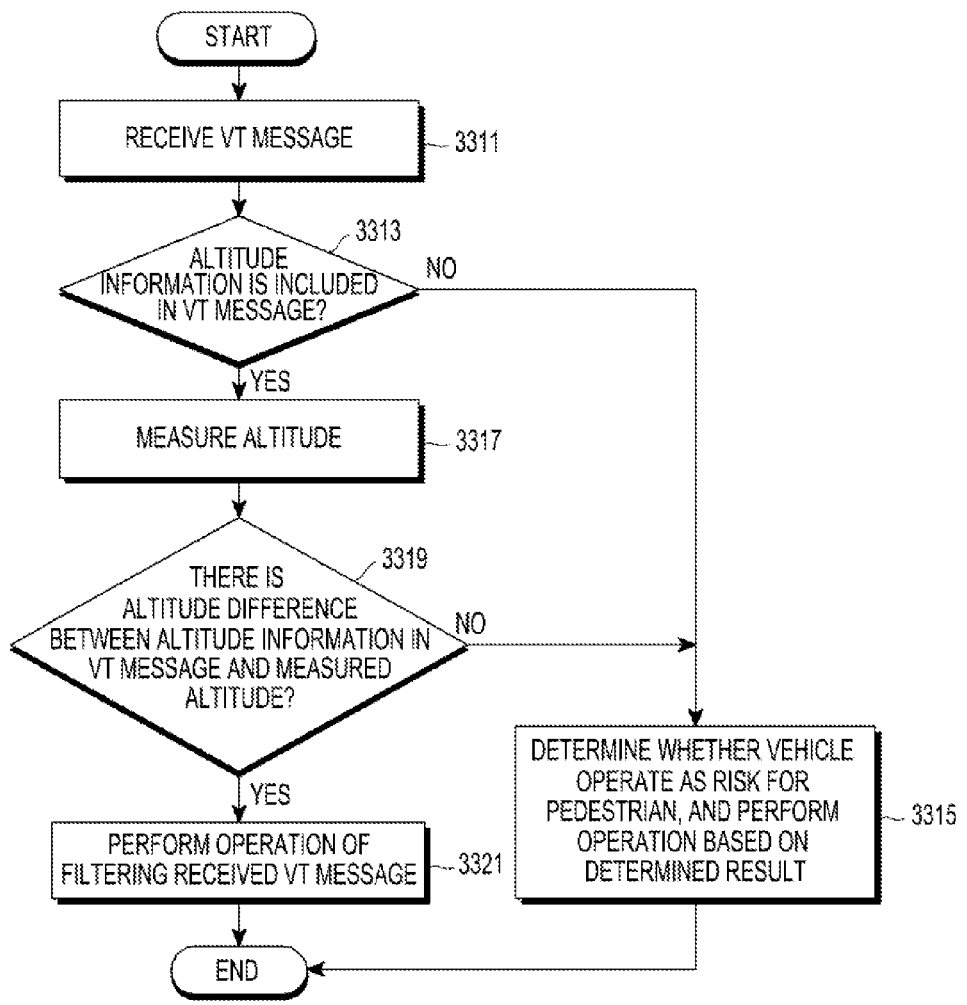
FIG. 33 illustrates yet another example of an operating process of a PT in a V2X communication system according to an embodiment of the present disclosure.

FIG. 33 illustrates yet another example of an operating process of a PT in a V2X communication system according to an embodiment of the present disclosure.

Referring to FIG. 33, it may be noted that an operating process of a PT in FIG. 33 is an operating process of a PT in a case that low-power filtering may be implemented by adjusting a transmission beam of a VT if there is an altitude difference between a pedestrian's location and a location of a vehicle.

A PT receives a VT message at operation 3311. The PT determines whether there is altitude information included in the received VT message at operation 3313.

If no altitude information is included in the VT message, the PT determines whether a vehicle operates as a risk for a pedestrian based on the PT message, and performs an operation corresponding to this at operation 3315.

If the altitude information is included in the VT message, the PT receives measures an altitude of the PT using an altitude measurement device, e.g., a barometer, a GPS module, and/or the like included in the PT at operation 3317.

The PT determines whether there is an altitude difference between the vehicle and the pedestrian based on the altitude information included in the VE message and the altitude measured by the PT at operation 3319. If there is no altitude difference, the PT proceeds to operation 3315.

If there is the altitude difference, the PT performs an operation of filtering the received VT message at operation 3321.

For example, the filtering operation may be an operation of discarding the VT message.

In FIG. 31, in a case that a pedestrian goes up an overpass, a PT may know that the pedestrian has entered the overpass through an RSU such as a Bluetooth device, a near field communication (NFC) device, and/or the like installed at the overpass. In this case, the PT may filter VT messages until the pedestrian leaves the overpass.

For example, in a case that NFC devices are installed at the start and end points of the overpass, a PT may be tagged on the NFC devices. In this case, the PT knows that the pedestrian has entered the overpass at the start point of the overpass, so the PT may filter VT messages while the pedestrian is in the overpass.

, the PT may be tagged on the NFC device at the end point of the overpass, so the PT may detect that the PT has left the overpass, and in this case, the PT does not filter VT messages.

In an embodiment of the present disclosure, whether the PT enters the overpass may be determined using an NFC device, a Bluetooth beacon, and/or the like.

Yet another example of a safety service provided in a V2X communication system according to an embodiment of the present disclosure will be described with reference to FIG. 34.

Figure 34:
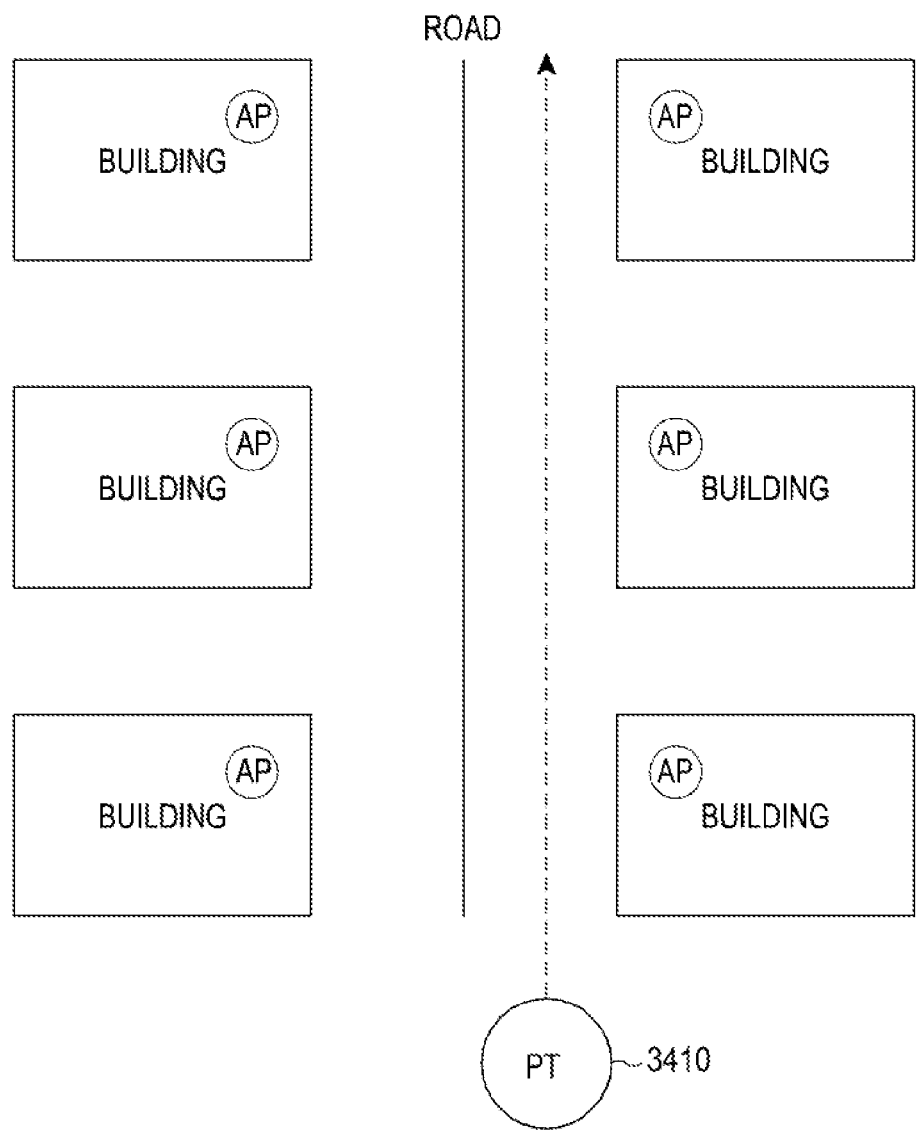
FIG. 34 illustrates yet another example of a safety service provided in a V2X communication system according to an embodiment of the present disclosure.

FIG. 34 illustrates yet another example of a safety service provided in a V2X communication system according to an embodiment of the present disclosure.

Referring to FIG. 34, it may be noted that a safety service in FIG. 34 is a safety service in a case that a VT message is filtered based on a pedestrian's location. In a case that a pedestrian 3410 is in a building, since a VT message may be information unnecessary for a PT (e.g., 3410), a method for selectively filtering VT messages in the PT is required.

Basically, even though the PT may receive a GPS signal and detect a location of the PT, if the GPS signal is not received or strength of the GPS signal is weak, the location of the PT may be determined using a wireless fidelity (WiFi) access point (AP), and/or the like.

In an embodiment of the present disclosure, the PT may determine whether the PT is inside or outside the building using the AP.

For example, if the PT continuously receives signals transmitted by the same AP for preset time, the PT may detect that the pedestrian is inside the building.

On the other hand, if the PT receives signals transmitted by different APs for the preset time, the PT may detect that the pedestrian is outside the building.

Further, if the PT keeps the same WiFi connection, the PT may detect that the pedestrian is inside the building.

In an embodiment of the present disclosure, an AP may be a WiFi AP, a Bluetooth AP, and/or the like.

Yet another example of a safety service provided in a V2X communication system according to an embodiment of the present disclosure has been described with reference to FIG. 34, and yet another example of a safety service provided in a V2X communication system according to an embodiment of the present disclosure will be described with reference to FIG. 35.

Figure 35:
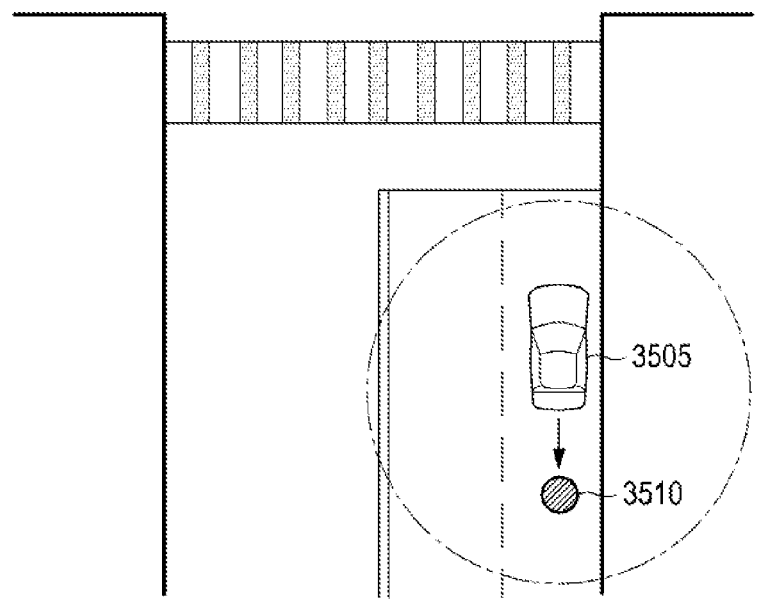
FIG. 35 illustrates yet another example of a safety service provided in a V2X communication system according to an embodiment of the present disclosure.

FIG. 35 illustrates yet another example of a safety service provided in a V2X communication system according to an embodiment of the present disclosure.

Referring to FIG. 35, it may be noted that a safety service in FIG. 35 is a safety service in a case that a vehicle 3505 is reversing to a PT 3510. Firstly, an operation of a VT in a case that the vehicle 3505 includes a device, e.g., a rear sensor, and/or the like for giving a help when the vehicle is reversing is different from an operation of a VT in a case that the vehicle does not include the device for giving the help when the vehicle is reversing.

In the case that the vehicle does not include the device for giving the help when the vehicle is reversing, the VT detects a reversing state, such as a gear is R, of the VT, and transmits a warning message if the vehicle is reversing.

In the case that the vehicle includes the device for giving the help when the vehicle is reversing, the VT transmits a VT message upon detecting that there is no object on the rear based on a detected result of the device. If there is an object on the rear, the VT 3505 transmits a warning message. In this case, a reversing state of the vehicle may be detected based on a gear state of the vehicle.

In an embodiment of the present disclosure, a V2P safety service message transmitted and received in a VT and a PT may be a layer 2 (L2) message or an application message. The V2P safety service message may be one of "stop area message", "safety area message", "warning message", "PT message", "VT message", "pedestrian warning message", "school bus area message", "safety message", "vehicle warning message", "vehicle message", and/or the like, and the V2P safety service message is transmitted by a VT or a PT. The VT or the PT selects resources for transmitting and receiving the V2P safety service message, and the resources may be resources that are set in advance for the purpose of the V2P service or V2P safety service. In an embodiment of the present disclosure, the resources may be resources that are set in advance for the purpose of the normal V2X service. In an embodiment of the present disclosure, the VT or the PT is allocated, from a base station, resources for transmitting and receiving the V2P safety service message, and transmits and receives the V2P safety service message using the allocated resources. The procedure in which the VT or the PT acquires the preset resources or the VT or the PT is allocated the resources from the base station may follow a scheme defined in various communication schemes, a detailed description thereof will be omitted therein.

Further, various changes could be made to a process of each of FIGS. 4, 6, 8A and 8B, 10, 12, 13, 15, 16, 18, 19, 22, 23B, 25, 30, 32, and 33. For example, although shown as a series of operations, various operations in each of FIGS. 4, 6, 8A and 8B, 10, 12, 13, 15, 16, 18, 19, 22, 23B, 25, 30, 32, and 33 could overlap, occur in parallel, occur in a different order, or occur multiple times.

An inner structure of a PT in a V2X communication system according to an embodiment of the present disclosure will be described with reference to FIG. 36.

Figure 36:
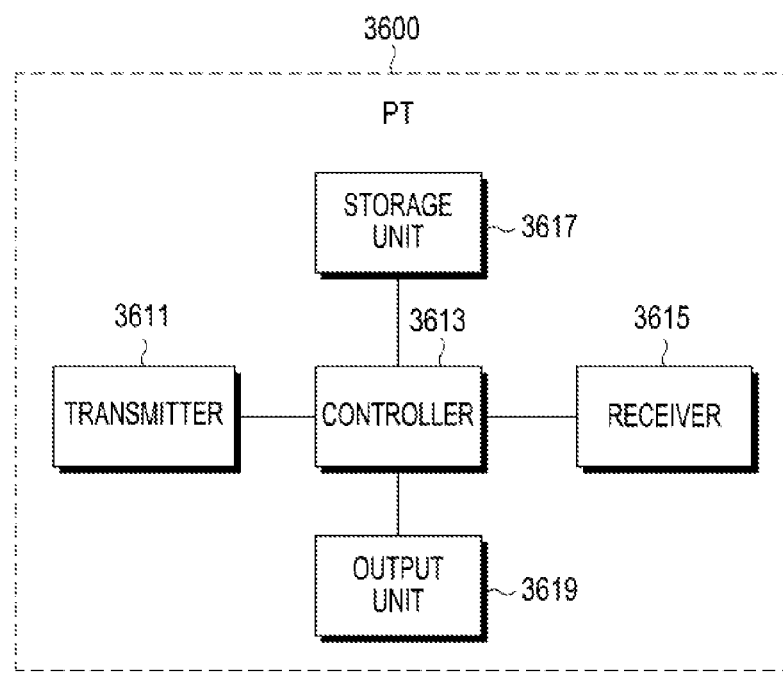
FIG. 36 illustrates an inner structure of a PT in a V2X communication system according to an embodiment of the present disclosure.

FIG. 36 illustrates an inner structure of a PT in a V2X communication system according to an embodiment of the present disclosure.

Referring to FIG. 36, a PT 3600 includes a transmitter 3611, a controller 3613, a receiver 3615, a storage unit 3617, and an output unit 3619.

The controller 3613 controls the overall operation of the PT 3600. More particularly, the controller 3613 controls an operation related to an operation of providing a safety service in a V2X communication system according to an embodiment of the present disclosure. The operation related to the operation of providing the safety service in the V2X communication system according to an embodiment of the present disclosure has been described with reference to FIGS. 1 to 35, and a detailed description thereof will be omitted herein.

The transmitter 3611 transmits various signals and various messages to other entities, e.g., an RSU, a VT, and/or the like included in the V2X communication system under a control of the controller 3613. The various signals and various messages transmitted in the transmitter 3611 have been described with reference to FIGS. 1 to 35, and a detailed description thereof will be omitted herein.

The receiver 3615 receives various signals and various messages from other entities, e.g., an RSU, a VT, and/or the like included in the V2X communication system under a control of the controller 3613. The various signals and various messages received in the receiver 3615 have been described with reference to FIGS. 1 to 35, and a detailed description thereof will be omitted herein.

The storage unit 3617 stores various programs, various data, and the like related to the operation related to the operation of providing the safety service in the V2X communication system according to an embodiment of the present disclosure under a control of the controller 3613. The storage unit 3617 stores various signals and various messages which are received by the receiver 3615 from the other entities.

The output unit 3619 outputs various signals and various messages related to the operation related to the operation of providing the safety service in the V2X communication system according to an embodiment of the present disclosure under a control of the controller 3613. The various signals and various messages output by the output unit 3619 have been described with reference to FIGS. 1 to 35, and a detailed description thereof will be omitted herein.

While the transmitter 3611, the controller 3613, the receiver 3615, the storage unit 3617, and the output unit 3619 are described in the PT 3600 as separate units, it is to be understood that this is merely for convenience of description. In other words, two or more of the transmitter 3611, the controller 3613, the receiver 3615, the storage unit 3617, and the output unit 3619 may be incorporated into a single unit.

The PT 3600 may be implemented with one processor.

An inner structure of a PT in a V2X communication system according to an embodiment of the present disclosure has been described with reference to FIG. 36, and an inner structure of a VT in a V2X communication system according to an embodiment of the present disclosure will be described with reference to FIG. 37.

Figure 37:
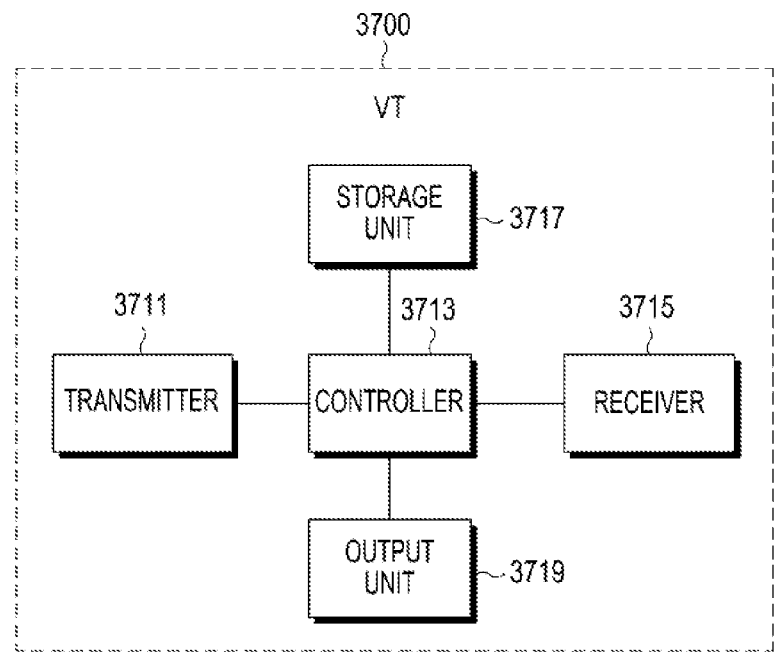
FIG. 37 illustrates an inner structure of a VT in a V2X communication system according to an embodiment of the present disclosure.

FIG. 37 illustrates an inner structure of a VT in a V2X communication system according to an embodiment of the present disclosure.

Referring to FIG. 37, a VT 3700 includes a transmitter 3711, a controller 3713, a receiver 3715, a storage unit 3717, and an output unit 3719.

The controller 3713 controls the overall operation of the VT 3700. More particularly, the controller 3713 controls an operation related to an operation of providing a safety service in a V2X communication system according to an embodiment of the present disclosure. The operation related to the operation of providing the safety service in the V2X communication system according to an embodiment of the present disclosure has been described with reference to FIGS. 1 to 35, and a detailed description thereof will be omitted herein.

The transmitter 3711 transmits various signals and various messages to other entities, e.g., an RSU, a PT, and/or the like included in the V2X communication system under a control of the controller 3713. The various signals and various messages transmitted in the transmitter 3711 have been described with reference to FIGS. 1 to 35, and a detailed description thereof will be omitted herein.

The receiver 3715 receives various signals and various messages from other entities, e.g., an RSU, a PT, and/or the like included in the V2X communication system under a control of the controller 3713. The various signals and various messages received in the receiver 3715 have been described with reference to FIGS. 1 to 35, and a detailed description thereof will be omitted herein.

The storage unit 3717 stores various programs, various data, and the like related to the operation related to the operation of providing the safety service in the V2X communication system according to an embodiment of the present disclosure under a control of the controller 3713. The storage unit 3717 stores various signals and various messages which are received by the receiver 3715 from the other entities.

The output unit 3719 outputs various signals and various messages related to the operation related to the operation of providing the safety service in the V2X communication system according to an embodiment of the present disclosure under a control of the controller 3713. The various signals and various messages output by the output unit 3719 have been described with reference to FIGS. 1 to 35, and a detailed description thereof will be omitted herein.

While the transmitter 3711, the controller 3713, the receiver 3715, the storage unit 3717, and the output unit 3719 are described in the VT 3700 as separate units, it is to be understood that this is merely for convenience of description. In other words, two or more of the transmitter 3711, the controller 3713, the receiver 3715, the storage unit 3717, and the output unit 3719 may be incorporated into a single unit.

The VT 3700 may be implemented with one processor.

An inner structure of a VT in a V2X communication system according to an embodiment of the present disclosure has been described with reference to FIG. 37, and an inner structure of an RSU in a V2X communication system according to an embodiment of the present disclosure will be described with reference to FIG. 38.

Figure 38:
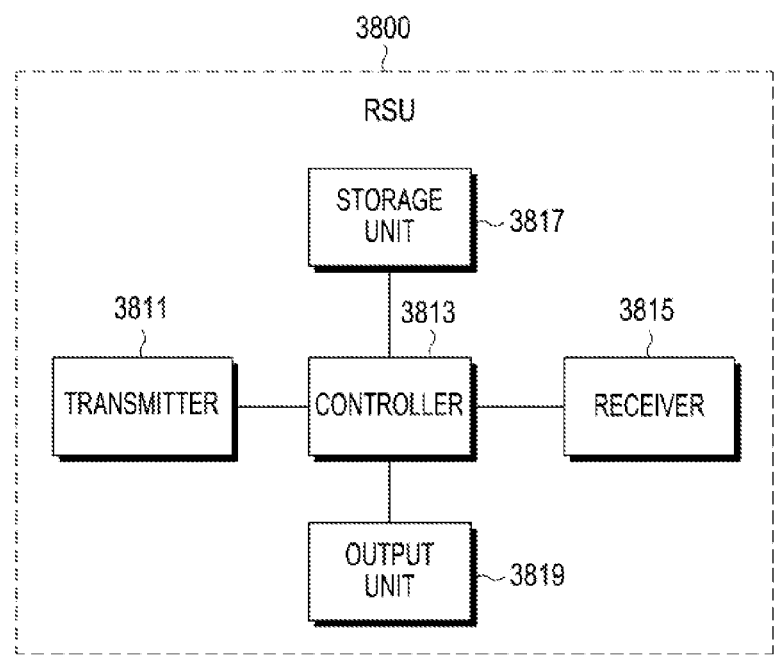
FIG. 38 illustrates an inner structure of an RSU in a V2X communication system according to an embodiment of the present disclosure.

FIG. 38 illustrates an inner structure of an RSU in a V2X communication system according to an embodiment of the present disclosure.

Referring to FIG. 38, an RSU 3800 includes a transmitter 3811, a controller 3813, a receiver 3815, a storage unit 3817, and an output unit 3819.

The controller 3813 controls the overall operation of the RSU 3800. More particularly, the controller 3813 controls an operation related to an operation of providing a safety service in a V2X communication system according to an embodiment of the present disclosure. The operation related to the operation of providing the safety service in the V2X communication system according to an embodiment of the present disclosure has been described with reference to FIGS. 1 to 35, and a detailed description thereof will be omitted herein.

The transmitter 3811 transmits various signals and various messages to other entities, e.g., a PT, a VT, and/or the like included in the V2X communication system under a control of the controller 3813. The various signals and various messages transmitted in the transmitter 3811 have been described with reference to FIGS. 1 to 35, and a detailed description thereof will be omitted herein.

The receiver 3815 receives various signals and various messages from other entities, e.g., a PT, a VT, and/or the like included in the V2X communication system under a control of the controller 3813. The various signals and various messages received in the receiver 3815 have been described with reference to FIGS. 1 to 35, and a detailed description thereof will be omitted herein.

The storage unit 3817 stores various programs, various data, and the like related to the operation related to the operation of providing the safety service in the V2X communication system according to an embodiment of the present disclosure under a control of the controller 3813. The storage unit 3817 stores various signals and various messages which are received by the receiver 3815 from the other entities.

The output unit 3819 outputs various signals and various messages related to the operation related to the operation of providing the safety service in the V2X communication system according to an embodiment of the present disclosure under a control of the controller 3813. The various signals and various messages output by the output unit 3819 have been described with reference to FIGS. 1 to 35, and a detailed description thereof will be omitted herein.

While the transmitter 3811, the controller 3813, the receiver 3815, the storage 3817, and the output unit 3819 are described in the RSU 3800 as separate units, it is to be understood that this is merely for convenience of description. In other words, two or more of the transmitter 3811, the controller 3813, the receiver 3815, the storage unit 3817, and the output unit 3819 may be incorporated into a single unit.

The RSU 3800 may be implemented with one processor.

As is apparent from the foregoing description, an embodiment of the present disclosure enables to provide a service in a V2X communication system.

An embodiment of the present disclosure enables to provide a service thereby filtering terminals to which the service is provided in a V2X communication system.

An embodiment of the present disclosure enables to provide a providing a service based on a beamforming scheme in a V2X communication system.

An embodiment of the present disclosure enables to provide a service thereby decreasing power consumption in a V2X communication system.

An embodiment of the present disclosure enables to provide reliability to a pedestrian crossing a crosswalk by supporting various services such as vehicle access notification, vehicle risk warning, and/or the like in a V2X communication system.

An embodiment of the present disclosure enables to provide a safety service to a pedestrian walking a crosswalk, a school zone, an alleyway, a road without a sidewalk, a road with a sidewalk, a pedestrian traffic accident risk area, and/or the like in a V2X communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication interface for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a service related to pedestrian safety in a radio communication system, the method comprising:
   transmitting, by a road side unit (RSU), a first message indicating that a pedestrian light is on;
   receiving, by the RSU, from a vehicle terminal that has received the first message, a second message notifying that the vehicle terminal is located in a zone related to the service; and
   transmitting, to the vehicle terminal, a third message instructing the vehicle terminal to broadcast a warning for the pedestrian safety.

2. The method of claim 1, wherein the third message further includes instruction that the vehicle terminal to transmit a fourth message notifying that the vehicle terminal is in the zone to a pedestrian terminal.

3. The method of claim 2, wherein the third message is transmitted, if the second message is received from the vehicle terminal firstly.

4. A method for providing a service related to pedestrian safety in a radio communication system, the method comprising:
   receiving, by a vehicle terminal, from a road side unit (RSU), a first message indicating that a pedestrian light is on;
   transmitting, by the vehicle terminal, to the RSU, a second message notifying that the vehicle terminal is located in a first zone related to the service; and
   receiving, from the RSU, a third message instructing the vehicle terminal to broadcast a warning for the pedestrian safety.

5. The method of claim 4, wherein the third message further includes information instruction that the vehicle terminal to transmit a fourth message notifying that the vehicle terminal is in the first zone to a pedestrian terminal.

6. The method of claim 5, wherein the third message is transmitted, if the second message is received from the vehicle terminal firstly.

7. A method of claim 5, further comprising:
   transmitting the fourth message to a pedestrian terminal if the third message indicates that the vehicle terminal needs to transmit the fourth message.

8. The method of claim 7, wherein transmitting the fourth message to the pedestrian terminal comprises transmitting the fourth message to the pedestrian terminal based on a transmission beam selected for the pedestrian terminal.

9. The method of claim 4, further comprising:
   identifying a second zone related to the service upon satisfying a preset criterion; and
   transmitting, to a pedestrian terminal, a fifth message notifying that the vehicle terminal exists in the second zone.

10. The method of claim 9, wherein the second zone is a part of the first zone.

11. The method of claim 9, further comprising receiving, from the pedestrian terminal, a sixth message notifying that the pedestrian terminal has received the third message.

12. A method for providing a service related to pedestrian safety in a radio communication system, the method comprising:
   receiving, by a pedestrian terminal, from a road side unit (RSU), a first message indicating that a pedestrian light is on;
   receiving, by the pedestrian terminal, from a vehicle terminal, a second message notifying that the vehicle terminal is in a first zone related to the service; and
   running a safety service application for generating a warning.

13. The method of claim 12, wherein the vehicle terminal transmits the second message, if the vehicle terminal firstly transmits a third message notifying that the vehicle terminal is in the first zone.

14. The method of claim 12, further comprising:
   receiving, from the vehicle terminal, a fourth message notifying that a second zone related to the service exists.

15. The method of claim 14, wherein the fourth message is transmitted based on a transmission beam selected for the pedestrian terminal.

16. The method of claim 14, wherein the second zone is a part of the first zone.

17. The method of claim 14, further comprising:
   transmitting, to the vehicle terminal, a fourth message notifying that the pedestrian terminal exists.

18. The method of claim 17, further comprising:
   outputting a warning by the safety service application.

19. The method of claim 1, wherein the second message comprises at least one of:
   identification information of the vehicle terminal;
   identification information of the RSU;
   location information of the vehicle terminal; and
   speed information of the vehicle terminal.

20. The method of claim 4, wherein the second message comprises at least one of:
   identification information of the vehicle terminal;
   identification information of the RSU;
   location information of the vehicle terminal; and
   speed information of the vehicle terminal.

21. A road side unit (RSU) for providing a service related to pedestrian safety in a radio communication system, the RSU comprising:
   a transceiver; and
   a controller configured to:
   transmit, a first message indicating that a pedestrian light is on;
   receive, from a vehicle terminal that has received the first message, a second message notifying that the vehicle terminal is located in a zone related to the service; and
   transmit, to the vehicle terminal, a third message instructing the vehicle terminal to broadcast a warning for the pedestrian safety.

22. A vehicle terminal for providing a service related to pedestrian safety in a radio communication system, the vehicle terminal comprising:
a transceiver; and
a controller configured to:
receive, from a road side unit (RSU), a first message indicating that a pedestrian light is on;
transmit, to the RSU, a second message notifying that the vehicle terminal is located in a first zone related to the service; and
receive, from the RSU, a third message instructing the vehicle terminal to broadcast a warning for the pedestrian safety.

23. A pedestrian terminal for providing a service related to pedestrian safety in a radio communication system, the pedestrian terminal comprising:
a transceiver; and
a controller configured to:
receive, from a road side unit (RSU), a first message indicating that a pedestrian light is on;
receive, from a vehicle terminal, a second message notifying that the vehicle terminal is in a first zone related to the service, and
run a safety service application for generating a warning.

* * * * *